United States Patent
Abedini et al.

(10) Patent No.: US 11,184,869 B2
(45) Date of Patent: Nov. 23, 2021

(54) TIMING ALIGNMENT TIMER IN A WIRELESS COMMUNICATION NETWORK

(71) Applicant: QUALCOMM Incorporated, San Diego, CA (US)

(72) Inventors: Navid Abedini, Somerset, NJ (US); Muhammad Nazmul Islam, Littleton, MA (US); Jianghong Luo, Skillman, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/447,681

(22) Filed: Jun. 20, 2019

(65) Prior Publication Data

US 2019/0394738 A1 Dec. 26, 2019

Related U.S. Application Data

(60) Provisional application No. 62/690,263, filed on Jun. 26, 2018.

(51) Int. Cl.
*H04W 56/00* (2009.01)
*H04W 74/08* (2009.01)

(52) U.S. Cl.
CPC ... *H04W 56/0015* (2013.01); *H04W 74/0833* (2013.01)

(58) Field of Classification Search
CPC ............ H04W 56/0015; H04W 74/0833
(Continued)

(56) References Cited

U.S. PATENT DOCUMENTS

| 9,094,904 B2* | 7/2015 | Ramkumar ....... H04W 56/0045 |
| 9,215,678 B2 | 12/2015 | Dinan |
| 9,247,406 B2* | 1/2016 | Lorenz ............... H04W 4/90 |

FOREIGN PATENT DOCUMENTS

| EP | 3157282 A1 | 4/2017 |
| WO | WO-2014154246 A1 | 10/2014 |
| WO | WO-2017111987 A1 * | 6/2017 .......... H04W 74/004 |

OTHER PUBLICATIONS

3GPP TS 38.300 V1.3.0 (Dec. 2017) (Year: 2017).*
(Continued)

*Primary Examiner* — Yemane Mesfin
*Assistant Examiner* — Intekhaab A Siddiquee
(74) *Attorney, Agent, or Firm* — Holland & Hart LLP

(57) ABSTRACT

An intermediary base station supporting mobile terminal (MT) functionality and/or a user equipment (UE) may receive a time alignment (TA) command and associated timer value from one or more distributed units (DUs) and/or a central unit (CU) of a parent base station. The TA command and timer value may be based on an experienced or potential timer expiration associated with a TA of a communication link. The TA command may specify an updated TA value and a timer reset for scheduling communications on the communication link. In some examples, the TA command may be in response to a TA command request provided by the MT or UE on allocated resources or configurations indicated by the parent base station. In other cases, the TA command may be in response to a random access procedure on allocated resources or configurations indicated by the parent base station.

30 Claims, 29 Drawing Sheets

(58) Field of Classification Search
USPC .......................................................... 370/350
See application file for complete search history.

(56) References Cited

OTHER PUBLICATIONS

International Search Report and Written Opinion—PCT/US2019/038513—ISA/EPO—dated Sep. 10, 2019.
Lenovo et al., "Maintenance of Timing Advance at TA Timer Expiry", 3GPP Draft; R2-1800678, 3rd Generation Partnership Project (3GPP), Mobile Competence Centre; 650, Route Des Lucioles; F-06921 Sophia-Antipolis Cedex; France, vol. RAN WG2, No. Vancouver, Canada; 20180122-20180126 Jan. 11, 2018, XP051385801, Retrieved from the Internet: URL:http://www.3gpp.org/ftp/tsg%5Fran/WG2%5FRL2/TSGR2%5FAHs/2018%5F01%5FNR/Docs [retrieved on Jan. 11, 2018], 2 pages.

* cited by examiner

TIMING ALIGNMENT TIMER IN A WIRELESS COMMUNICATION NETWORK

CROSS REFERENCE

The present Application for Patent claims the benefit of U.S. Provisional Patent Application No. 62/690,263 by ABEDINI, et al., entitled "TIMING ALIGNMENT TIMER IN A WIRELESS COMMUNICATION NETWORK," filed Jun. 26, 2018, assigned to the assignee hereof, and expressly incorporated by reference herein.

BACKGROUND

The present disclosure relates to wireless communications, and to timing alignment timer in a wireless communication network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor. In addition, the IAB nodes may include DUs that support communication links with additional entities (e.g., IAB nodes, UEs, etc.) within the relay chain or configuration of the access network (e.g., downstream).

Due to propagation delays associated with data transmission across network resources, intermediary devices (e.g., IAB nodes) and/or terminal devices (e.g., UEs) within the relay chain may attempt to compensate for delays in uplink transmission scheduling on a communication link. Compensation may be based on an estimated timing advance (TA) provided by an antecedent (e.g., parent) device, such as an IAB donor or parent IAB node relative to the intermediate or terminal devices (e.g., upstream), and support the alignment of uplink transmissions with subframe timing at the network. A TA value may by dynamically implemented according to a configured timer (e.g., timeAlignmentTimer) where the IAB node or UE may be considered uplink time aligned. However, in some cases, a timer may expire without renewal and an IAB node or UE may consider the timer expiration as an indication of a loss of uplink synchronization. As a consequence, the IAB node or UE may clear configured downlink assignments or configured uplink grants, resulting in undesired service interruptions at the IAB node or UE, as well as at downstream entities within the relay chain.

SUMMARY

The described techniques relate to improved methods, systems, devices, or apparatuses that support a timing alignment (TA) timer in a wireless communication network. The described techniques provide for enhanced service resolution mechanisms to address timer expiration for a TA associated with one or more communication (e.g., access, wireless, or wired backhaul) links of the network. The network may include one or more connected base stations and UEs supporting multiple communication links within a relay chain. A core network may be associated with one or more access networks (ANs). In networks employing distributed node techniques, each AN may include a centralized unit (CU) (e.g., associated with a donor base station) and one or more distributed units (DUs) (e.g. also associated with the donor base station) for scheduling communications with mobile terminals (MTs) (e.g., associated with an intermediary base station) or with UEs of the network. As described, mechanisms for performing the described techniques may be performed by an MT entity of a base station. Additionally or alternatively, the following examples or features may be performed by one or more UEs or other descendant devices within a network according to an established communication link.

In some examples, a MT of a base station or a UE may allow for receiving a new TA command from an antecedent (i.e., parent) node (e.g., alternative intermediary base station, donor base station, etc.), prior to initiating a RACH procedure. In some cases, the MT of the base station or the UE may receive control information from a parent node of the network, the control information providing indication of a TA command in subsequent signaling. Based on the received control information, the MT of the base station or the UE may postpone the potential clearing of buffers and the potential clearing of configured downlink assignments or uplink grants within the connection. The MT of the base station or the UE may receive the TA command and process the contained TA value and associated timer for communication on the communication link. Based on the received TA value, the MT of the base station or the UE may update configured scheduling for uplink transmission and reset the timer.

In some examples, a MT of a base station or a UE may proactively request an updated TA value prior to expiration of an associated timer of the TA, for the communication link. The request may be delivered on resources pre-configured by a parent node (e.g., alternative intermediary base station, donor base station, etc.), of the network for periodic TA request transmission. The MT of the base station or the UE may receive the resource configuration and establish a secondary timing indication linked to the timer associated with the TA of the communication link. For example, the secondary timing may be established at the MT of the base station or the UE, and oriented according to a plurality of subframes or seconds prior to the configured timer. Upon expiration of the secondary timer, the MT of the base station or the UE may transmit the TA request on the pre-configured periodic resources. The MT may then receive a response to the TA request, and proceed with updating the TA value resetting the timer of the communication link prior to expiration.

In some examples, a MT of a base station or a UE may perform a contention-free random access (CFRA) procedure following expiration of a timer associated with a TA of an established communication link. The CFRA procedure may include transmission of a CFRA preamble by the MT of the base station or the UE on resources pre-configured by a parent node (e.g., alternative intermediary base station, donor base station, etc.) The pre-configured CFRA resources may be allocated by the parent node of the network and delivered to the MT of the base station or the UE via RRC signaling prior to the timer expiration. The configured CFRA resources may be based on any combination of reference signaling provided by the MT of the base station or the UE through uplink grants on the communication link. Based on the allocated resources, the MT of the base station or the UE may perform CFRA preamble transmission without potential service delays (e.g., waiting for DCI scheduling of CFRA).

In some examples, a base station or a UE may be supported in a network by a plurality of parent nodes (e.g., alternative intermediary base stations, donor base stations, etc.) via multiple communication (e.g., access, wired or wireless backhaul) links. Additionally or alternatively, each of the multiple communication links may support multiple radio access technologies (RATs). Based on a configured timer (e.g., timeAlignmentTimer) expiration for a first connection, the MT of the base station or the UE may transmit a TA request for the first connection on a secondary communication link (e.g., backhaul link, RAT). The TA request may include a request for an updated TA command and/or timer reset, or a request for configured resource allocation to perform CFRA on the first (e.g., target) link. In response to the request, the base station or the UE may receive a response, the response including one or more of a configuration to perform CFRA, a TA command, or indication that the base station may continue communication on the target link with a timer reset.

A method of wireless communication at a first wireless node of a wireless communications network is described. The method may include receiving, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receiving the indicated TA command from the second wireless node, and determining a timing advance for the communication link based on the received TA command.

An apparatus for wireless communication at a first wireless node of a wireless communications network is described. The apparatus may include a processor, memory coupled with the processor, and instructions stored in the memory. The instructions may be executable by the processor to cause the apparatus to receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receive the indicated TA command from the second wireless node, and determine a timing advance for the communication link based on the received TA command.

Another apparatus for wireless communication at a first wireless node of a wireless communications network is described. The apparatus may include means for receiving, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receiving the indicated TA command from the second wireless node, and determining a timing advance for the communication link based on the received TA command.

A non-transitory computer-readable medium storing code for wireless communication at a first wireless node of a wireless communications network is described. The code may include instructions executable by a processor to receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receive the indicated TA command from the second wireless node, and determine a timing advance for the communication link based on the received TA command.

Some examples of the method, apparatuses, and non-transitory computer-readable medium described herein may further include operations, features, means, or instructions for identifying that the timing alignment timer for the first wireless node may have expired and listening for the indication that the TA command will be transmitted based on the identification.

Some examples of the method, apparatuses, and non-transitory computer-readable medium described herein may further include operations, features, means, or instructions for setting a second timer indicating a time for which the first wireless node may be to refrain from transmitting the RACH transmission.

In some examples of the method, apparatuses, and non-transitory computer-readable medium described herein, the indication may be included in downlink control information.

In some examples of the method, apparatuses, and non-transitory computer-readable medium described herein, the downlink control information schedules a downlink data channel that carries the TA command.

In some examples of the method, apparatuses, and non-transitory computer-readable medium described herein, the TA command may be received in a MAC control element (CE).

In some examples of the method, apparatuses, and non-transitory computer-readable medium described herein, the communication link may be a wireless backhaul link between a mobile termination (MT) of the first wireless node and a distributed unit (DU) of the second wireless node.

Some examples of the method, apparatuses, and non-transitory computer-readable medium described herein may further include operations, features, means, or instructions for resetting the timing alignment timer in response to receiving the TA command.

A method of wireless communication at a first wireless node of a wireless communications network is described.

The method may include identifying that a timing alignment timer for a communication link between the first wireless node and a second wireless node of the wireless communications network has expired, transmitting, to the second wireless node, an indication that a timing advance (TA) command for the communication link will be transmitted after expiration of the timing alignment timer, and transmitting the indicated TA command to the second wireless node before receiving a RACH transmission from the second wireless device in response to expiration of the timing alignment timer.

An apparatus for wireless communication at a first wireless node of a wireless communications network is described. The apparatus may include a processor, memory coupled with the processor, and instructions stored in the memory. The instructions may be executable by the processor to cause the apparatus to identify that a timing alignment timer for a communication link between the first wireless node and a second wireless node of the wireless communications network has expired, transmit, to the second wireless node, an indication that a timing advance (TA) command for the communication link will be transmitted after expiration of the timing alignment timer, and transmit the indicated TA command to the second wireless node before receiving a RACH transmission from the second wireless device in response to expiration of the timing alignment timer.

Another apparatus for wireless communication at a first wireless node of a wireless communications network is described. The apparatus may include means for identifying that a timing alignment timer for a communication link between the first wireless node and a second wireless node of the wireless communications network has expired, transmitting, to the second wireless node, an indication that a timing advance (TA) command for the communication link will be transmitted after expiration of the timing alignment timer, and transmitting the indicated TA command to the second wireless node before receiving a RACH transmission from the second wireless device in response to expiration of the timing alignment timer.

A non-transitory computer-readable medium storing code for wireless communication at a first wireless node of a wireless communications network is described. The code may include instructions executable by a processor to identify that a timing alignment timer for a communication link between the first wireless node and a second wireless node of the wireless communications network has expired, transmit, to the second wireless node, an indication that a timing advance (TA) command for the communication link will be transmitted after expiration of the timing alignment timer, and transmit the indicated TA command to the second wireless node before receiving a RACH transmission from the second wireless device in response to expiration of the timing alignment timer.

In some examples of the method, apparatuses, and non-transitory computer-readable medium described herein, the indication may be transmitted in downlink control information.

In some examples of the method, apparatuses, and non-transitory computer-readable medium described herein, the downlink control information schedules a downlink data channel that carries the TA command.

In some examples of the method, apparatuses, and non-transitory computer-readable medium described herein, the TA command may be transmitted in a MAC control element (CE).

In some examples of the method, apparatuses, and non-transitory computer-readable medium described herein, the communication link may be a wireless backhaul link between a distributed unit (DU) of the first wireless node and a mobile termination (MT) of the second wireless node.

Some examples of the method, apparatuses, and non-transitory computer-readable medium described herein may further include operations, features, means, or instructions for resetting the timing alignment timer in response to transmitting the TA command.

A method of wireless communication at a first wireless node of a wireless communications network is described. The method may include receiving, from a second wireless node of the wireless communications network, an indication of resources and configurations for the first wireless node to use to transmit a request for a timing advance (TA) command for a communication link between the first wireless node and a second wireless node and transmitting the request for the TA command to the second wireless node using at least one of the indicated resources and configurations.

An apparatus for wireless communication at a first wireless node of a wireless communications network is described. The apparatus may include a processor, memory coupled with the processor, and instructions stored in the memory. The instructions may be executable by the processor to cause the apparatus to receive, from a second wireless node of the wireless communications network, an indication of resources and configurations for the first wireless node to use to transmit a request for a timing advance (TA) command for a communication link between the first wireless node and a second wireless node and transmit the request for the TA command to the second wireless node using at least one of the indicated resources and configurations.

Another apparatus for wireless communication at a first wireless node of a wireless communications network is described. The apparatus may include means for receiving, from a second wireless node of the wireless communications network, an indication of resources and configurations for the first wireless node to use to transmit a request for a timing advance (TA) command for a communication link between the first wireless node and a second wireless node and transmitting the request for the TA command to the second wireless node using at least one of the indicated resources and configurations.

A non-transitory computer-readable medium storing code for wireless communication at a first wireless node of a wireless communications network is described. The code may include instructions executable by a processor to receive, from a second wireless node of the wireless communications network, an indication of resources and configurations for the first wireless node to use to transmit a request for a timing advance (TA) command for a communication link between the first wireless node and a second wireless node and transmit the request for the TA command to the second wireless node using at least one of the indicated resources and configurations.

Some examples of the method, apparatuses, and non-transitory computer-readable medium described herein may further include operations, features, means, or instructions for receiving at least one TA command in response to the transmitted request for the TA command and determining a timing advance for the communication link based on the at least one received TA command.

In some examples of the method, apparatuses, and non-transitory computer-readable medium described herein, receiving the indication of resources and configurations may include operations, features, means, or instructions for receiving a periodic contention free random access (CFRA)

resource and configuration, or a PUCCH resource and configuration, or a combination thereof.

In some examples of the method, apparatuses, and non-transitory computer-readable medium described herein, the request for the TA command may be transmitted before expiration of a timing alignment timer for the communication link.

In some examples of the method, apparatuses, and non-transitory computer-readable medium described herein, the indication of resources and configurations may be received before expiration of a timing alignment timer for the communication link.

In some examples of the method, apparatuses, and non-transitory computer-readable medium described herein, the request for the TA command includes a contention free random access (CFRA), a MAC control element (CE), or physical uplink control channel signaling, or RRC signaling, or a combination thereof.

Some examples of the method, apparatuses, and non-transitory computer-readable medium described herein may further include operations, features, means, or instructions for identifying that a second timer may have expired, the second timer set to expire before the timing alignment timer, where the request for the TA command may be transmitted based on the expiration of the second timer.

Some examples of the method, apparatuses, and non-transitory computer-readable medium described herein may further include operations, features, means, or instructions for identifying that a timing alignment timer for the communication link may have expired and transmitting a random access communication to the second wireless node based on the expiration of the timing alignment timer, where the random access communication includes the request for the TA command.

A method of wireless communication at a first wireless node of a wireless communications network is described. The method may include transmitting, to a second wireless node of the wireless communications network, an indication of resources and configurations for the second wireless node to use to transmit a request for a timing advance (TA) command for a communication link between the first wireless node and a second wireless node and receiving the request for the TA command from the second wireless node using at least one of the indicated resources and configurations.

An apparatus for wireless communication at a first wireless node of a wireless communications network is described. The apparatus may include a processor, memory coupled with the processor, and instructions stored in the memory. The instructions may be executable by the processor to cause the apparatus to transmit, to a second wireless node of the wireless communications network, an indication of resources and configurations for the second wireless node to use to transmit a request for a timing advance (TA) command for a communication link between the first wireless node and a second wireless node and receive the request for the TA command from the second wireless node using at least one of the indicated resources and configurations.

Another apparatus for wireless communication at a first wireless node of a wireless communications network is described. The apparatus may include means for transmitting, to a second wireless node of the wireless communications network, an indication of resources and configurations for the second wireless node to use to transmit a request for a timing advance (TA) command for a communication link between the first wireless node and a second wireless node and receiving the request for the TA command from the second wireless node using at least one of the indicated resources and configurations.

A non-transitory computer-readable medium storing code for wireless communication at a first wireless node of a wireless communications network is described. The code may include instructions executable by a processor to transmit, to a second wireless node of the wireless communications network, an indication of resources and configurations for the second wireless node to use to transmit a request for a timing advance (TA) command for a communication link between the first wireless node and a second wireless node and receive the request for the TA command from the second wireless node using at least one of the indicated resources and configurations.

Some examples of the method, apparatuses, and non-transitory computer-readable medium described herein may further include operations, features, means, or instructions for transmitting at least one TA command in response to the received request for the TA command.

In some examples of the method, apparatuses, and non-transitory computer-readable medium described herein, the indicated resources and configurations include periodic contention free random access (CFRA) resources and configurations, or PUCCH resources and configurations, or a combination thereof.

In some examples of the method, apparatuses, and non-transitory computer-readable medium described herein, the request for the TA command may be received before expiration of a timing alignment timer for the communication link.

In some examples of the method, apparatuses, and non-transitory computer-readable medium described herein, receiving the request for the TA command may include operations, features, means, or instructions for receiving a random access communication from the second wireless node after expiration of the timing alignment timer, where the random access communication includes the received request for the TA command.

A method of wireless communication at a first wireless node of a wireless communications network is described. The method may include receiving, over a first communication link of the wireless communications network, an indication of resources and configurations for the first wireless node to use to transmit, a request for a timing advance (TA) command for communication over a second communication link of the wireless communications network with a second wireless node and transmitting, over the first communication link or the second communication link of the wireless communications network, the request for the TA command using at least one of the indicated resources and configurations.

An apparatus for wireless communication at a first wireless node of a wireless communications network is described. The apparatus may include a processor, memory coupled with the processor, and instructions stored in the memory. The instructions may be executable by the processor to cause the apparatus to receive, over a first communication link of the wireless communications network, an indication of resources and configurations for the first wireless node to use to transmit, a request for a timing advance (TA) command for communication over a second communication link of the wireless communications network with a second wireless node and transmit, over the first communication link or the second communication link of the wireless communications network, the request for the TA command using at least one of the indicated resources and configurations.

Another apparatus for wireless communication at a first wireless node of a wireless communications network is described. The apparatus may include means for receiving, over a first communication link of the wireless communications network, an indication of resources and configurations for the first wireless node to use to transmit, a request for a timing advance (TA) command for communication over a second communication link of the wireless communications network with a second wireless node and transmitting, over the first communication link or the second communication link of the wireless communications network, the request for the TA command using at least one of the indicated resources and configurations.

A non-transitory computer-readable medium storing code for wireless communication at a first wireless node of a wireless communications network is described. The code may include instructions executable by a processor to receive, over a first communication link of the wireless communications network, an indication of resources and configurations for the first wireless node to use to transmit, a request for a timing advance (TA) command for communication over a second communication link of the wireless communications network with a second wireless node and transmit, over the first communication link or the second communication link of the wireless communications network, the request for the TA command using at least one of the indicated resources and configurations.

In some examples of the method, apparatuses, and non-transitory computer-readable medium described herein, the indication of the resources and configurations may be received over the first communication link from a third wireless node of the wireless communications network.

In some examples of the method, apparatuses, and non-transitory computer-readable medium described herein, the first communication link uses a first RAT, and the second communication link uses a second RAT different from the first RAT.

Some examples of the method, apparatuses, and non-transitory computer-readable medium described herein may further include operations, features, means, or instructions for receiving, over the first communication link or the second communication link, a response to the request for the TA command, where the response includes the TA command in response to the request for the TA command, or an indication that the first wireless node may be to continue to communicate with the second wireless node using the second communication link.

In some examples of the method, apparatuses, and non-transitory computer-readable medium described herein, the indicated resources and configurations include periodic contention free random access (CFRA) resources, or a MAC control element (CE), or PUCCH resources, or RRC signaling, or a combination thereof.

Some examples of the method, apparatuses, and non-transitory computer-readable medium described herein may further include operations, features, means, or instructions for receiving the indication of resources and configurations may be in response to a request transmitted over the first communication link by the first wireless node.

A method of wireless communication at a first wireless node of a wireless communications network is described. The method may include receiving, from a second wireless node on resources of a first communication link of the wireless backhaul communications network, a request for a timing advance (TA) command, the resources indicated to the second wireless node over a second communication link of the wireless communications network and transmitting, to the second wireless node, a response to the request for the TA command.

An apparatus for wireless communication at a first wireless node of a wireless communications network is described. The apparatus may include a processor, memory coupled with the processor, and instructions stored in the memory. The instructions may be executable by the processor to cause the apparatus to receive, from a second wireless node on resources of a first communication link of the wireless backhaul communications network, a request for a timing advance (TA) command, the resources indicated to the second wireless node over a second communication link of the wireless communications network and transmit, to the second wireless node, a response to the request for the TA command.

Another apparatus for wireless communication at a first wireless node of a wireless communications network is described. The apparatus may include means for receiving, from a second wireless node on resources of a first communication link of the wireless backhaul communications network, a request for a timing advance (TA) command, the resources indicated to the second wireless node over a second communication link of the wireless communications network and transmitting, to the second wireless node, a response to the request for the TA command.

A non-transitory computer-readable medium storing code for wireless communication at a first wireless node of a wireless communications network is described. The code may include instructions executable by a processor to receive, from a second wireless node on resources of a first communication link of the wireless backhaul communications network, a request for a timing advance (TA) command, the resources indicated to the second wireless node over a second communication link of the wireless communications network and transmit, to the second wireless node, a response to the request for the TA command.

In some examples of the method, apparatuses, and non-transitory computer-readable medium described herein, the first communication link uses a first RAT, and the second communication link uses a second RAT different from the first RAT.

Some examples of the method, apparatuses, and non-transitory computer-readable medium described herein may further include operations, features, means, or instructions for transmitting, by the first wireless node to the second wireless node, the indication of the resources over the first communication link using the first RAT, where the request for the TA command may be received using the second RAT.

In some examples of the method, apparatuses, and non-transitory computer-readable medium described herein, transmitting the response to the request for the TA command may include operations, features, means, or instructions for transmitting the TA command in response to the request for the TA command over the first communication link or the second communication link.

In some examples of the method, apparatuses, and non-transitory computer-readable medium described herein, transmitting the response to the request for the TA command may include operations, features, means, or instructions for transmitting, over the first communication link or the second communication link, an indication that the first wireless node may be to continue to communicate with the second wireless node using the second communication link.

In some examples of the method, apparatuses, and non-transitory computer-readable medium described herein, the indicated resources include periodic contention free random access (CFRA) resources, or a MAC control element (CE), or PUCCH resources, or RRC signaling, or a combination thereof.

A method of wireless communication at a first wireless node of a wireless communications network is described. The method may include identifying resources and configurations for a second wireless node of the wireless communications network to use to transmit, over a first communication link, a request for a timing advance (TA) command and transmitting an indication of the identified resources and configurations to the second wireless node over a second communication link.

An apparatus for wireless communication at a first wireless node of a wireless communications network is described. The apparatus may include a processor, memory coupled with the processor, and instructions stored in the memory. The instructions may be executable by the processor to cause the apparatus to identify resources and configurations for a second wireless node of the wireless communications network to use to transmit, over a first communication link, a request for a timing advance (TA) command and transmit an indication of the identified resources and configurations to the second wireless node over a second communication link.

Another apparatus for wireless communication at a first wireless node of a wireless communications network is described. The apparatus may include means for identifying resources and configurations for a second wireless node of the wireless communications network to use to transmit, over a first communication link, a request for a timing advance (TA) command and transmitting an indication of the identified resources and configurations to the second wireless node over a second communication link.

A non-transitory computer-readable medium storing code for wireless communication at a first wireless node of a wireless communications network is described. The code may include instructions executable by a processor to identify resources and configurations for a second wireless node of the wireless communications network to use to transmit, over a first communication link, a request for a timing advance (TA) command and transmit an indication of the identified resources and configurations to the second wireless node over a second communication link.

In some examples of the method, apparatuses, and non-transitory computer-readable medium described herein, the identified resources and configurations may be for the second wireless node to transmit the request for the TA command over the first communication link to a third wireless node of the wireless communications network.

In some examples of the method, apparatuses, and non-transitory computer-readable medium described herein, the first communication link uses a first RAT, and the second communication link uses a second RAT different from the first RAT.

In some examples of the method, apparatuses, and non-transitory computer-readable medium described herein, the identified resources and configurations may be for the second wireless node to transmit the request for the TA command over the first communication link to the first wireless node.

In some examples of the method, apparatuses, and non-transitory computer-readable medium described herein, the indicated resources and configurations include periodic contention free random access (CFRA) resources, or a MAC control element (CE), or PUCCH resources, or RRC signaling, or a combination thereof.

DETAILED DESCRIPTION

Figure 1:
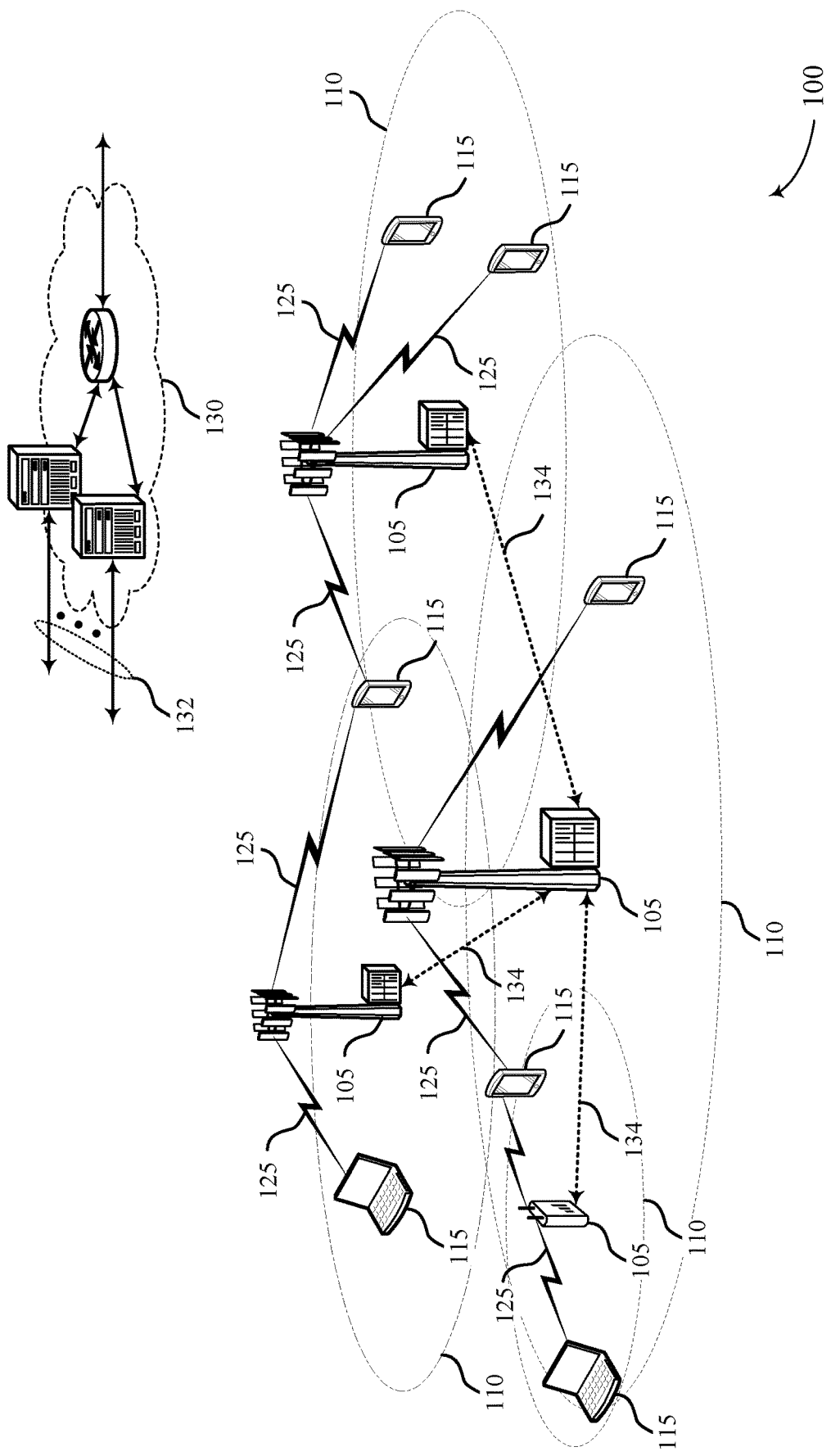
FIG. 1 illustrates an example of a system for wireless communications that supports a timing alignment timer in a wireless communication network in accordance with aspects of the present disclosure.

In wireless communications systems, devices supporting UE functionality (UE-F) (e.g., UEs, and other devices supporting UE-F or mobile terminal (MT) functionality) may communicate with one or more base stations or antecedent (i.e., parent) devices or nodes using a timing configuration for a wireless communication link. The timing configuration may be predetermined by the parent devices or nodes based on various network parameters (e.g., cell size, channel configuration, etc.). The timing configuration may be coordinated according to the UE-F of a device, and include an uplink timing advance (TA) value employed by the device. Accordingly, a parent node may report an estimated TA value and associated timing configuration to the device for performing scheduling for uplink signaling.

A TA value may correspond to a negative offset in uplink transmission scheduling to compensate for propagation delay between downlink data reception and uplink transmission (i.e., round trip timing (RTT)) on resources of the communication link. The TA value may correspond to a fractional component, an integer component, or a combination in relation to a subframe or temporal duration. Based on the TA value, the device may adjust the time to initiate wireless uplink transmission such that the transmission is synchronized with network subframe timing. A UE-F of a device may implement the TA value according to the configured timer, where communication on the communication link may be considered uplink time aligned. In some cases, a configured timer associated with a TA value may be configured to infinity, allowing for a maintained TA throughout service connection. Such a configuration may be particularly suitable for fixed UEs and/or fixed relays within a network configuration (i.e., a relay chain of a network). In other cases, the configured timer associated with a TA may be configured to a fixed duration.

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations (e.g., or IAB donor). One or more DUs associated with a donor base station may be partially controlled by CUs associated with the donor base station. A base station CU may be a component of a database, data center, core network, or network cloud. A network node associated with a radio access technology (RAT) may communicate with a donor base station CU via a backhaul link (e.g., wireline backhaul or wireless backhaul). The one or more donor base stations (e.g., IAB donors) may be in communication with one or more additional base stations (e.g., IAB nodes) and user equipment (UEs). IAB nodes may support mobile terminal (MT) functionality that is controlled and scheduled by an IAB donor and/or parent IAB nodes (i.e., upstream relative to the MT supported IAB nodes), as well as DU operability that supports control and scheduling of additional entities (e.g., IAB nodes, UEs, etc.) within the relay chain or configuration of the access network (e.g., downstream relative to the DU supported IAB nodes). For example, an IAB network architecture may include a chain of connected wireless devices (e.g., starting with a donor base station and ending with a user equipment (UE), with any number of IAB nodes in between) via link resources that support NR access and backhaul capabilities (e.g., a wireline backhaul or wireless backhaul).

The IAB network architecture may support increased backhaul density within the relay chain, to compensate for mobile capacity density within the one or more service cells corresponding to base stations (e.g., IAB donors, IAB nodes) supported on the network. For example, several IAB nodes may each be in communication with one or more UEs, the IAB nodes may be controlled and scheduled by one or more DUs via backhaul links. In some cases, a single backhaul connection may support multiple radio access technologies (RATs) and aid in improving spectral gains. For each intermediary or terminal device within the relay chain or configuration of the access network (i.e., IAB nodes and/or UEs downstream from IAB donors directly interfacing with the network), uplink service capabilities at the devices may support mechanisms for promoting alignment of uplink transmissions with subframe timing at the network. For example, an intermediary device (e.g., an IAB node) may attempt to compensate for data signaling propagation delays via uplink transmission scheduling. Compensation may be based on an estimated timing advance (TA) provided by an antecedent (e.g., parent) node relative to the intermediary device, and may support uplink transmission alignment with subframe timing at the network.

Due to increased spectral capabilities associated with NR technology and resource deployments, devices of an IAB network may support carrier aggregation (CA) with multiple component carriers (CCs) spanning non-collocated cell coverage areas. In some cases, disparate cell deployments may include different propagation delays associated with data communication and therefore may require different uplink TAs. Therefore, one or more serving cells with the same estimated uplink TA and downlink timing reference cell may correspond to a timing advance group (TAG). TA values for each TAG may by dynamically implemented according to a configured timer (e.g., timeAlignmentTimer) where the intermediary or terminal devices (e.g., UEs or IAB nodes, including a UE functions (UE-F) of an IAB node or a MT of an IAB node) supporting communication links of the serving cells may be considered uplink time aligned.

However, in some cases, a timer may expire prior to a renewal indication by a parent device or node. A UE-F supported device (e.g., an IAB node or UE) of the IAB network may consider the timer expiration an indication of a loss of uplink synchronization with the parent device or node. In current systems, a UE-F supported device may flush all Hybrid Automatic Repeat-Request (HARM) buffers, notify release of configured Physical Uplink Control Channel (PUCCH) and/or Sounding Reference Signal (SRS) mechanisms, and clear configured downlink assignments or configured uplink grants based on the considered loss of uplink synchronization. In consequence, the UE-F supported device may suspend data transmission and reception over the communication link, resulting in undesired service interruptions. Additionally, for a UE-F supported device that also supports a DU for command and/or scheduling of supported descendent (e.g., downstream) entities relative to the device (e.g., child nodes), suspension of data transmission according to a configured timer expiration may propagate service interruptions throughout the relay chain.

The techniques described herein provide for enhanced service resolution mechanisms at intermediary or terminal devices of a network. The resolution mechanisms may obviate service interruption or signaling delay activity following an implied loss of uplink synchronization due to timer expiration. The described techniques provide for data channel information reception following a TA timer expiration and configuration for resource allocation to support connectivity and/or TA command requests. The described techniques support UL synchronization continuity or re-establishment with antecedent devices as a means to promote access to network resources. As described, mechanisms for performing the described techniques may be performed by an MT entity of an IAB node. Additionally or alternatively, the following examples or features may be performed by one or more UEs or descendant devices within a relay chain of the IAB network.

In some examples, a MT of an IAB node or a UE may identify that a configured timer for serving cells of a TAG has expired, and uplink synchronization may be lost. The MT functionality may allow for receiving a new TA command from a parent node of the TAG (e.g., from an IAB node and/or IAB donor), prior to initiating a RACH procedure. In some cases, the IAB node may receive control information from a parent node of the IAB network, the control information providing indication of a TA command in subsequent signaling. For example, the IAB node may receive downlink control information (DCI) signaling for scheduling a physical downlink shared channel (PDSCH). The received DCI may further include a resource indication that the scheduled PDSCH is carrying a TA value within a medium access control (MAC) control element (CE), and to proceed with receiving and processing the MAC CE. Based on the received control information, the IAB node may postpone the clearing or flushing of buffers and clearing configured downlink assignments or uplink grants within the connection. The IAB node may receive the MAC CE over PDSCH and process the contained payload, including the TA value (e.g., which may be a 6-bit index value). Based on the received TA value, the IAB node may update configured scheduling for uplink transmission and reset the configured timer for the TAG. The IAB node may then continue data transmission and reception with parent nodes associated with the TAG, as well as communication with descendent (e.g., child) nodes of the IAB network scheduled and controlled by one or more DUs of the IAB node. In some cases, the IAB node may receive control information from a parent node of the IAB network, where the control information itself provides a TA command.

In some examples, a MT of an IAB node or a UE may proactively request an updated TA value prior to expiration of a configured timer for an associated TAG. The request may be delivered on resources and configurations pre-configured by a parent node of the network for periodic TA request transmission. For example, in some cases, a parent node of the IAB node may pre-configure a resource allocation for performing periodic contention free random access (CFRA). In other cases, a parent node of the IAB node may pre-configure physical uplink control channel (PUCCH) resources and configurations for performing TA request transmissions. In some cases, the periodic resources may include a new resource format design (e.g., new PUCCH format). In other cases, the periodic resources may include a modified format of configured resources (e.g., modified PUCCH resource format) to send the TA request. The IAB node may receive the resource configuration and establish a secondary timing indication linked to the configured timer (e.g., timeAlignmentTimer) for the TAG. For example, the secondary timing may be established at the MT of the IAB node, and oriented according to a plurality of subframes or seconds prior to the configured timer. Upon expiration of the secondary timer (e.g., and before expiration of the first timer), the IAB node may transmit the TA request on the pre-configured periodic resources. The request may be transmitted via one or more of a MAC CE, PUCCH, radio resource control (RRC) signaling, upper layer or backhaul signaling (e.g., via F1-AP), or on resources of a CFRA procedure. The IAB node may then receive a response to the TA request, such as a TA command, and proceed with updating the TA value of the TAG and resetting the configured timer, as well as the secondary timer, prior to expiration.

In some examples, a MT of an IAB node or a UE may perform procedures for CFRA, including transmission of a CFRA preamble on pre-configured resources, following expiration of a configured timer for an associated TAG. The pre-configured CFRA resources may be allocated by a parent node of the IAB network and delivered to the IAB node via RRC signaling prior to the timer expiration. The configured CFRA resources may be based on any combination of reference signaling provided by the IAB node through uplink grants on the communication link. In some cases, the CFRA resources may be based on synchronization signal transmission over all beams associated with the IAB node. In other cases, the CFRA resources may be based on a subset of beam directions determined by at least one of the IAB node's beam reports, location, mobility state, or scheduling state. Based on the allocated resources, the IAB node may perform CFRA preamble transmission without potential service delays (e.g., without waiting for DCI scheduling of CFRA).

In some examples, an IAB node or a UE may be supported by a plurality of parent nodes via multiple communication (e.g., access, wired or wireless backhaul) links. Additionally or alternatively, each of the multiple communication links may support multiple radio access technologies (RATs) (e.g., channels in one or more of millimeter wave (mmW) bands (e.g., above 6 GHz, for example in the range of 30 to 300 GHz) and sub-6 bands (e.g., below 6 GHz, for example in the range of 1 to 6 GHz) for communication on a backhaul or access connection. Based on a configured timer (e.g., timeAlignmentTimer) expiration for a first connection, the IAB node may transmit a TA request for the associated TAG on a secondary backhaul link, or using a second RAT. The TA request may include a request for an updated TA command and/or timer reset, or a request for configured resource allocation to perform CFRA on the first (e.g., target) link. In response to the request, the IAB node may receive a response, the response including one or more of a configuration to perform CFRA, a TA command, or indication that the IAB node may continue communication on the target link with a timer reset. In some cases, the IAB node may receive the response indication on resources of the secondary communication link (e.g., secondary backhaul link, secondary RAT). In other cases, the IAB node may receive the response indication on the target link based on coordination between the parent node of the target link and the parent node of the secondary link.

Beneficially, the aforementioned techniques may provide for enhanced service resolution mechanisms. The resolution mechanisms may obviate service interruption or signaling delay activity following an implied loss of uplink synchronization due to timer expiration.

Aspects of the disclosure are initially described in the context of a wireless communications system. Example wireless communications systems and process flows supporting the described techniques are then described. Aspects of the disclosure are further illustrated by and described with reference to apparatus diagrams, system diagrams, and flowcharts that relate to timing alignment timer in a wireless communication network.

FIG. 1 illustrates an example of a wireless communications system 100 that supports a timing alignment timer in a wireless communication network in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support high priority or low latency functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Base stations 105 may support functionality for operations on an IAB network. For example, base stations 105 may be split into support entities (i.e., functionalities) for promoting wireless backhaul density in collaboration with NR communication access. In some cases, one or more base stations 105 may be split into associated base station CU and DU entities, where one or more DUs may be partially controlled by an associated CU. The CU entities of the one or more base stations 105 may facilitate connection between the core network 130 and the AN (e.g., via a wireline or wireless connection to the core network). The DUs of the one or more base stations 105-b may control and/or schedule functionality for additional devices (e.g., one or more alternative base stations 105, UEs 115) according to configured access and backhaul links. Based on the supported entities at the one or more base stations 105, the one or more base stations 105 may be referred to as donor base stations (i.e., or IAB donors).

Additionally, in some cases, one or more base stations 105 may be split into associated MT and base station DU entities, where MT functionality of the one or more base stations 105 may be controlled and/or scheduled by the DU entities of the one or more donor base stations (i.e., via a Uu interface). DUs associated with the one or more base stations may be controlled by MT functionality. In addition, DUs of the one or more base stations 105 may be partially controlled by signaling messages from CU entities of associated donor base stations on the configured access and backhaul links of a network connection (i.e., via an F1-application protocol (AP)). The DUs of the one or more base stations 105 may support one of multiple serving cells 110 of the network coverage area. The DUs of the one or more base stations 105 may control and/or schedule functionality for additional devices (e.g., one or more alternative base stations 105, UEs 115) according to configured access and backhaul links. Based on the supported entities at the one or more base stations 105, the base stations may be referred to as intermediary base stations (i.e., or IAB nodes).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in the range of 300 MHz to 300 GHz. The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may correspond to one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, one or more base stations 105 may include CUs and DUs, where one or more DUs associated with a base station 105 may be partially controlled by a CU associated with the respective base station 105. The base station CUs may be a component of a database, data center, or the core network 130 (e.g., a 5G NR core network (5GC)). In some examples, a base station CU (e.g., a relay base station 105) may communicate with a one or more DUs supported by antecedent (e.g., parent) base stations 105 via a backhaul link 132 (e.g., a wireline backhaul or a wireless backhaul). As another example, in IAB networks, a base station CU (e.g., a donor base station 105) may communicate with the core network 130 (e.g., the NGC) via a backhaul link 132 (e.g., a wireline backhaul or wireless backhaul). The donor base station 105 may be referred to, for example in an IAB network, as an IAB donor and may be in communication with one or more IAB nodes (e.g., one or more additional base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes in between). IAB nodes may support mobile terminal (MT) functionality (which may also be referred to as UE function (UE-F)) controlled and scheduled by an IAB donor, or another IAB node, as its parent node as well as DU functionality (which may also be referred to as an access node function (AN-F)) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells 110, etc.

Aspects of base stations 105 (e.g., IAB nodes, including DUs, MTs, etc.) and served UEs 115 may implement TA values associated with one or more configured timers (e.g., timingAdvanceTimers), to support UL synchronization with subframe timing at the network. Each TA value and timer may be associated with one or more serving cells 110 of the network coverage area. Specifically, one or more serving cells with the same estimated uplink TA and downlink timing reference cell may correspond to a TAG of the network communication. Wireless communications system 100 may employ relay chains for communications within a network architecture, such as in an exemplary IAB network architecture. Relay base stations 105 (i.e., IAB nodes) and UEs 115 may support MT functionality and communicate with one or more antecedent (e.g., upstream) base stations 105 (e.g., DUs) on the uplink. MT functionality at the relay base stations 105 may be controlled and or scheduled by a donor base station 105 (e.g., DUs of an IAB node or IAB donor). Additionally, the relay base stations 105 may support DU entities controlling and scheduling additional descendant devices (i.e., base stations 105 that including MTs, UEs 115, etc.) within the IAB network on the downstream. A relay base station 105 may act as a relay between the donor base station 105 and UE 115 in both transmission directions. The donor base station 105 may refer to the base station containing a base station DU coupled with the base station CU.

In some examples, relay base stations 105 and/or UEs 115 (e.g., each a node) may experience potential configured timer expiration for one or more connections associated with a TAG. A node may consider timer expiration an indication of a loss of uplink synchronization. In present systems, a node may flush buffers and initiate the clearing of configured downlink assignments or uplink grants of the TAG based on the timer expiration. For example, for a TAG associated with an activated primary cell (PCell) of the network connection (e.g., a primary TAG (pTAG)), the MT entity of a relay base station may flush all HARQ buffers for all serving cells (e.g., PCell and secondary cells (SCells)). In addition, the MT entity may notify RRC release of configured PUCCH and SRS and clear any configured downlink assignments and configured uplink grants. In other examples, for a TAG associated with one or more secondary serving cells of the network connection (e.g., a secondary TAG (sTAG)), the MT entity of a relay base station may flush all HARQ buffers for the sTAG, clear any configured downlink assignments and uplink grants, and notify RRC release of configured PUCCH and SRS. The described operations, however, promote service interruptions as data transmission and reception may be suspended by the MT entity with connected DUs, allowing only RACH performance on the uplink.

As will be discussed, the relay base stations 105 and/or UEs 115 may support service resolution and maintain uplink synchronization. Specifically, in some examples, relay base stations 105 and/or UEs 115 may experience potential configured timer expiration for a TAG. The supported aspects may include MT operating mechanisms for satisfying TA command and timer reset or performing periodic CFRA procedure with associated DUs. As a result, relay base stations 105 and/or UEs 115 may maintain uplink synchronization despite potential configured timer expiration, obviating the potential clearing of buffers and clearing configured downlink assignments or uplink grants within the connection. The described techniques, including maintaining uplink synchronization, may improve signaling throughput and reduce communication latency between the relay base stations 105 and/or UEs 115. In particular, the described techniques may reduce the number of signal exchanges for random access, and therefore improving service in communication.

A MT of a node (e.g., base station 105, UE 115) may identify that a configured timer associated with a RAT of a communication link has expired. Based on the identification, the MT may implement one or more service enhancements to support TA command update and timer reset. In some examples, the one or more service enhancements may include allowance capability to receive updated TA commands over PDSCH following configured timer expiration. In other cases, the one or more service enhancements may include periodic resource allocation for performing CFRA procedure and TA request transmission, prior to or following configured timer expiration. Additionally, in some examples, a relay base station 105 and/or UE 115 may be supported by a plurality of DUs via multiple communication (e.g., access, wired or wireless backhaul) links. Additionally or alternatively, each of the communication links may support multiple radio access technologies (RATs) (e.g., millimeter wave (mmW) and sub-6 channels) for communication. One or more service enhancements at a MT entity may include periodic resource allocation for performing CFRA procedure and TA request transmission for a first link connection based on communication with a second link connection (i.e., alternative backhaul link or RAT).

Figure 2:
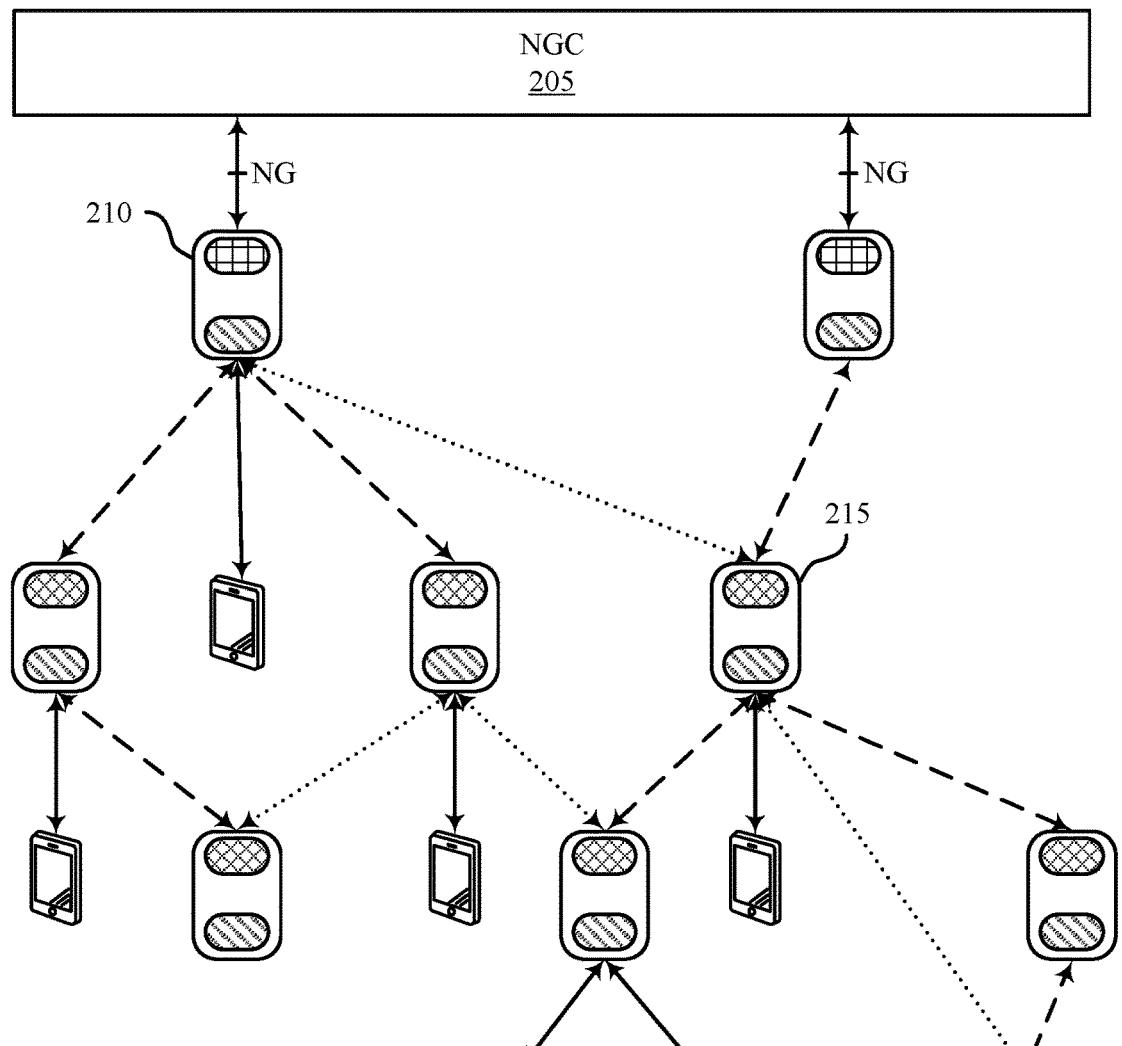
FIG. 2 illustrates an example of a wireless communications system that supports a timing alignment timer in a wireless communication network in accordance with aspects of the present disclosure.

FIG. 2 illustrates an example of a wireless communications system 200 that supports a timing alignment timer in a wireless communication network in accordance with aspects of the present disclosure. For example, FIG. 2 illustrates a wireless communications system 200 (e.g., a NR system) that supports sharing of infrastructure and spectral resources for NR access with wireless backhaul link capabilities, in supplement to wireline backhaul connections, providing an IAB network architecture. Wireless communications system 200 may include a core network 205 (e.g., NGC), and base stations or supported devices split into one or more support entities (i.e., functionalities) for promoting wireless backhaul density in collaboration with NR communication access. Aspects of the supporting functionalities of the base stations may be referred to as IAB nodes. In some examples, wireless communications system 200 may implement aspects of wireless communications system 100.

Wireless communications system 200 may include one or more IAB donor nodes 210 that support associated base station CU and DU entities, where one or more DUs associated with a IAB donor node 210 may be partially controlled by an associated CU. CUs of IAB donor nodes 210 may host layer 3 (L3) (e.g., radio resource control (RRC), service data adaption protocol (SDAP), packet data convergence protocol (PDCP), etc.) functionality and signaling. Further CUs of IAB donor nodes 210 may communicate with core network 205 over an NG interface (which may be an example of a portion of a backhaul link). DUs may host lower layer, such as layer 1 (L1) and layer 2 (L2) (e.g., radio link control (RLC), media access control (MAC), physical (PHY), etc.) functionality and signaling. A DU entity of IAB donor node 210 may support one of multiple serving cells of the network coverage according to connections associated with backhaul and access links of the IAB network. DUs of the IAB donor nodes 210 may control both access links and backhaul links within the corresponding network coverage and provide controlling and scheduling for descendant (i.e., child) IAB nodes 215 and or UEs 115-a.

IAB nodes 215 may support associated MT functionality and base station DU entities, where MT functionality of the IAB nodes 215 may be controlled and/or scheduled by antecedent (e.g., parent) IAB nodes of the established connectivity via access and backhaul links of a coverage area. DUs associated with an IAB node 215 may be controlled by MT functionality of the node. In addition, DUs of the IAB nodes 215 may be partially controlled by signaling messages from CU entities of associated IAB donor nodes 210 of the network connection (i.e., via an F1-application protocol (AP)). The DUs of the IAB nodes 215 may support one of multiple serving cells of the network coverage area.

Wireless communications system 200 may employ relay chains for communications within the IAB network architecture. For example, an IAB donor 210 may support primary and one or more secondary (e.g., backup) backhaul links to child IAB nodes 215. The IAB donor may further support one or more access links to additional devices (e.g., UEs 115-a) or entities of the network. In addition, MT functionality of each of the one or more child IAB nodes 215 and UEs 115-a may be configured to support network connectivity to multiple parent nodes via access and backhaul links associated with coverage areas of the IAB network. For example, in some cases an IAB node 215 may be supported by a first (e.g., primary) backhaul link associated with a coverage area and MT functionality may be controlled and/or scheduled by a first parent node. Additionally, the IAB node 215 may supported by one or more secondary backhaul links associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB nodes 215 and UEs 115-a within (i.e., downstream) the IAB network via the configured backhaul and access links. That is, an IAB node 215 may act as a relay between the IAB donor 210 and one or more descendant devices (e.g., IAB nodes 215, UEs 115-a) in both communication directions based on established backhaul and access connections.

The supported relay chain of wireless communications system 200, including multiple backhaul and access link connections between IAB donors 210, IAB nodes 215, and UEs 115-a may enhance backhaul density within the coverage areas supported by the network, while achieving resource gains. That is, enhanced backhaul link coverage (i.e., increased backhaul links due to wireless backhaul on NR access technology and resources) within the wireless communications system 200 may increase supported service capacity density within a coverage area. As a result, network capacity in terms of supported user capacity density may be improved, with enhanced utilization of deployed backhaul spectrum.

Figure 3:
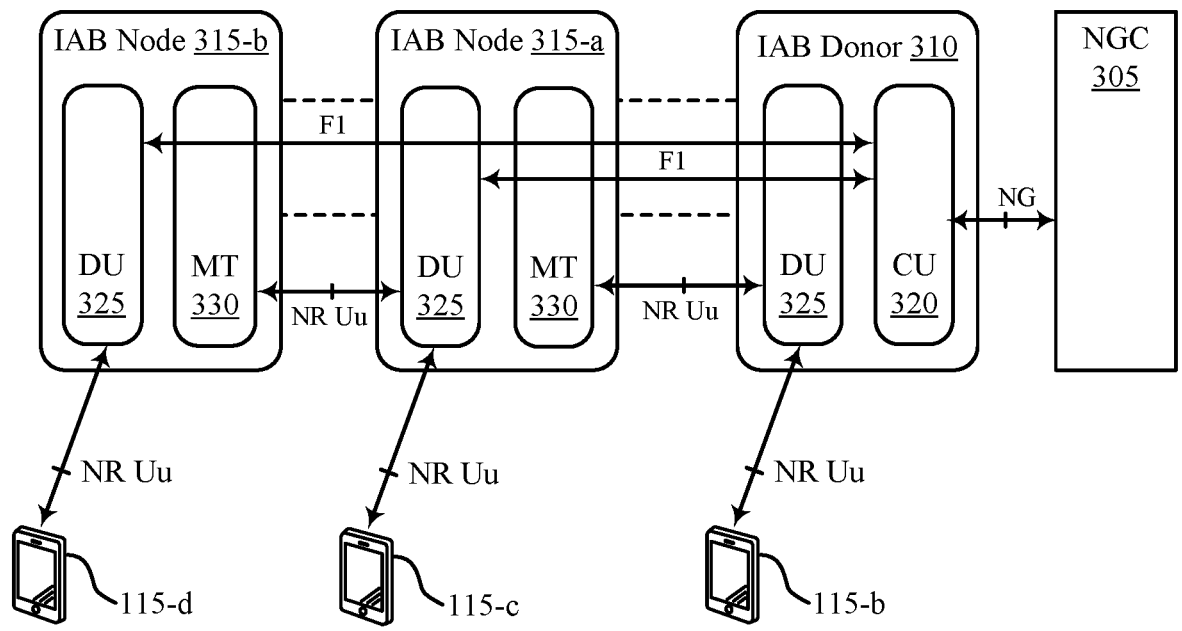
FIG. 3 illustrates an example of a wireless communications system that supports a timing alignment timer in a wireless communication network in accordance with aspects of the present disclosure.

FIG. 3 illustrates an example of a wireless communications system 300 that supports a timing alignment timer in a wireless communication network in accordance with aspects of the present disclosure. Wireless communications system 300 may include a core network 305 (e.g., a NGC), an IAB donor 310, IAB nodes 315, and UEs 115, where IAB nodes 315 may be partially controlled by each other and/or the IAB donor 310. The IAB donor 310 and IAB nodes 315 may be examples of aspects of base stations 105, and core network 305 may be an example of aspects of core network 130, as described with reference to FIG. 1. IAB donor 310 and one or more IAB nodes 315 may be configured as (e.g., or in communication according to) some relay chain.

For example, an access network (AN) may refer to communications between access nodes (e.g., IAB donor 310), IAB nodes 315-a and 315-b, and one or more UEs 115 (e.g., UEs 115-b, 115-c, and 115-d). The IAB donor 310 may facilitate connection between the core network 305 and the AN (e.g., via a wireline or wireless connection to the core network 305). That is, an IAB donor 310 may refer to a radio access network (RAN) node with a wireline or wireless connection to core network 305. The IAB donor 310 may include a CU 320 and at least one DU 325, where the CU 320 may communicate with the core network 305 over an NG interface (e.g., some backhaul link 132). The CU 320 may host layer 3 (L3) (e.g., radio resource control (RRC), service data adaption protocol (SDAP), packet data convergence protocol (PDCP), etc.) functionality and signaling. The at least one DU 325 may host lower layer, such as layer 1 (L1) and layer 2 (L2) (e.g., radio link control (RLC), media access control (MAC), physical (PHY), etc.) functionality and signaling, and may each be at least partially controlled by the CU 320. The DU 325 may support one or multiple different cells. IAB donor 310 and IAB nodes 315-a and 315-b may communicate over an F1 interface according to some protocol that defines signaling messages (e.g., F1-AP protocol). Additionally, CU 320 may communicate with the core network 305 over an NG interface (which may an example of a portion of backhaul link 132), and may communicate with other CUs 320 (e.g., a CU associated with an alternative IAB donor 310) over an Xn-C interface (which may an example of a portion of a backhaul link).

IAB nodes 315 may refer to a RAN node that provides IAB functionality (e.g., access for UEs 115, wireless self-backhauling capabilities, etc.). IAB nodes 315 may include a DU 325 and a mobile terminal (MT) 330. A DU 325 may act as a distributed scheduling node towards child nodes associated with the IAB node 315, and the MT 330 may act as a scheduled node towards parent nodes associated with the IAB node 315. That is, an IAB donor 310 may be referred to as a parent node in communication with one or more child nodes (e.g., an IAB donor may relay transmissions for UEs through one or more other IAB nodes 315). Additionally, an IAB node 315 may also be referred to as a parent node or a child node to other IAB nodes 315, depending on the relay chain or configuration of the AN. Therefore, the MT entity of IAB nodes 315 (e.g., MTs 330) may provide a Uu interface for a child node to receive signaling from a parent IAB node, and the DU interface (e.g., DUs 325) may provide a Uu interface for a parent node to signal to a child IAB node or UE 115.

For example, IAB node 315-a may be referred to a parent node associated with IAB node 315-b, and a child node associated with IAB donor 310. The IAB donor 310 may include a CU 320 with a wireline (e.g., optical fiber) or wireless connection to the core network 225, and may act as parent node to IAB nodes 315-a and 315-b. For example, the DU 325 of IAB donor 310 may relay transmissions to UEs 115-c and 115-d through IAB nodes 315-a and 315-b, and may directly signal transmissions to the UE 115-b. The CU 320 of IAB donor 310 may signal communication link establishment via an F1 interface to IAB nodes 315-a and 315-b, and the IAB nodes 315-a and 315-b may schedule transmissions (e.g., transmissions to the UEs 115 relayed from the IAB donor 310) through the DUs 325. That is, data may be relayed to and from IAB nodes 315-a and 315-b via signaling over an NR Uu interface to MT 330 of the IABs node 315-a and 315-b. Communications with IAB node 315-a may be scheduled by DU 325 of IAB donor 310 and communications with IAB node 315-b may be scheduled by DU 325 of IAB Node 315-a.

In the following description, mechanisms for service resolution and maintenance of uplink synchronization may be described in terms of actions and processes performed by MTs 330 of the IAB nodes 315-a or 315-b and/or one or more of the UEs 115-b, 115-c, or 115-d. The IAB nodes 315 may correspond to one or more relay base stations. The MT 330 of IAB nodes 315 or MT functionality of the UEs 115 may receive one or more TA values and timing configurations associated with access and backhaul links of the IAB network, for uplink transmission synchronization. Each TA and configured timer may correspond to one or more serving cells (e.g., TAG) supported within the IAB network that share an uplink TA and downlink timing reference cell. The TA for each TAG may be estimated by a DU entity of the communication link and may be used at the MT as a timing reference for uplink during link procedures (i.e., initial access, radio link failure, during handover, etc.). In some examples, the TA for access or backhaul connection associated with a TAG may be indicated by an index value within a MAC RAR, as part of a connection establishment. In other cases, when connectivity is established between DU and MT entities of the one or more IAB nodes 315 and/or UEs 115 and IAB donor 310, the TA for backhaul connection associated with a TAG may be indicated by an index value within a MAC CE. The TA may be represented as a negative timing offset between uplink transmission and downlink reception and the MT, and may be referred to as a round trip timing (RTT).

A time unit in a TA value (e.g., the time units representing a TA offset) may be denoted in $T_S$ seconds (i.e., $1/(4096*480000)$ seconds) and indicate the change of uplink scheduled timing relative to downlink reception. The timing offset indicated by a TA may indicate scheduling of uplink data transmission by MTs. For example, a TA estimated by a DU of IAB donor 310 may indicate timing synchronization for uplink signaling by MTs 330 associated with IAB nodes 315 and/or UEs 115. TA values may be provided to the associated MT entities and/or UEs according to a Uu or F1 interface associated with the supported backhaul links.

Figure 4:
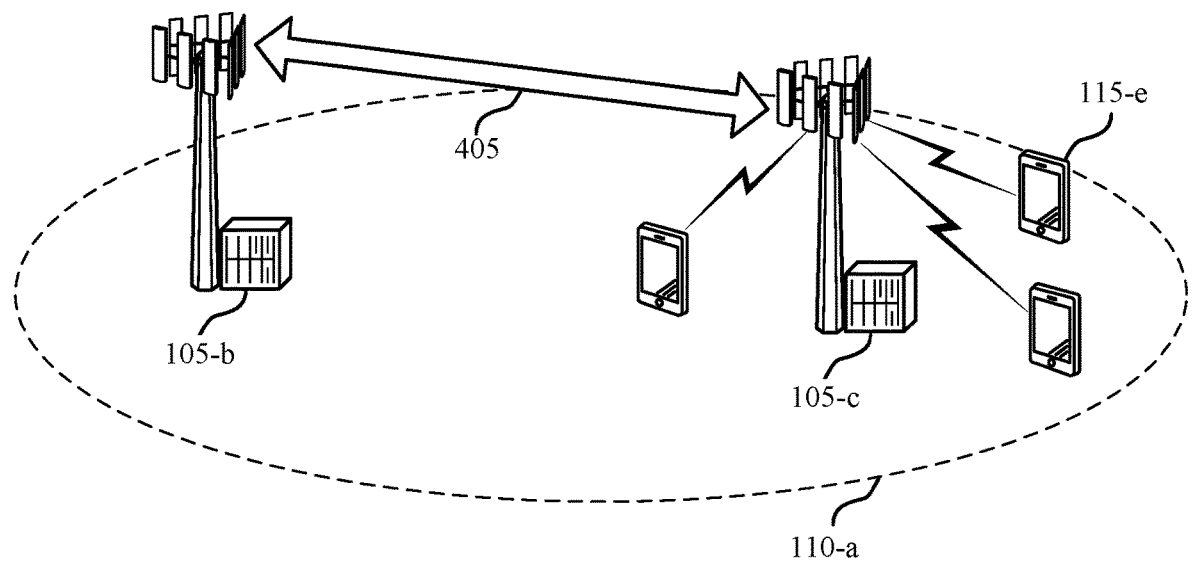
FIG. 4 illustrates an example of a wireless communications system that supports a timing alignment timer in a wireless communication network in accordance with aspects of the present disclosure.
Figure 4:
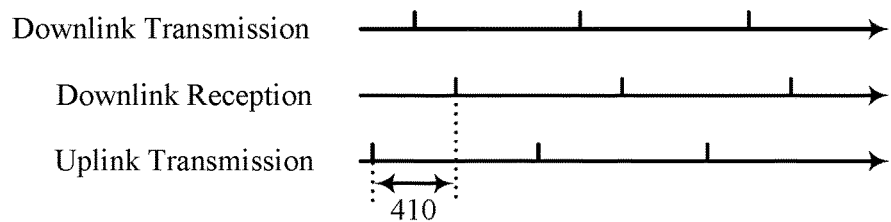

FIG. 4 illustrates an example of a wireless communications system 400 that supports a timing alignment timer in a wireless communication network in accordance with aspects of the present disclosure. In some examples, wireless communications system 400 may implement aspects of wireless communications system 100.

Wireless communications system 400 may support one or more base stations 105-b supporting network access for one or more cell coverage areas 110-a. In some examples, the one or more cell coverage areas 110-a may be non-collocated. Infrastructure and spectral resources for NR access within wireless communications system 400 may additionally support wireless backhaul link capabilities in supplement to wireline backhaul connections, providing an integrated access and backhaul (IAB) network architecture.

One or more base stations 105-b may contain associated base station CU and DU entities, where one or more DUs may be partially controlled by an associated CU. The CU entities of the one or more base stations 105-b may facilitate connection between the core network and the AN (e.g., via a wireline or wireless connection to the core network). The DUs of the one or more base stations 105-b may control and/or schedule functionality for additional devices according to configured wireless backhaul and access links. Based on the supported entities at the one or more base stations 105-b, the base stations may be referred to as IAB donors. Additional base stations 105-c may support link connectivity with the one or more IAB donors as part of a relay chain within the IAB network architecture. For example, one or more base stations 105-c may contain associated MT and base station DU entities, where MT functionality of the base stations 105-c may be controlled and/or scheduled by DU entities of one or more base stations 105-b (e.g., IAB donors). DUs associated with a base station 105-c may be controlled by MT functionality. In addition, DUs of the one or more base stations 105-c may be partially controlled by signaling messages from CU entities of associated IAB donor nodes 210 of the network connection (i.e., via an F1-application protocol (AP)). The DUs of the base stations 105-c may support one of multiple serving cells 110-a of the network coverage area. Based on the supported entities at the one or more base stations 105-c, the base stations may be referred to as IAB nodes.

MT functionality of each of the one or more base stations 105-c may be configured to support network connectivity to multiple supported entities (e.g., IAB nodes, IAB donors, DUs) of proximal base stations 105 via access and backhaul links associated with coverage areas of the IAB network. For example, IAB node functionality at base station 105-c may be supported by backhaul link 405 and controlled by DUs at a base station 105-b. DU entities of base station 105-c may support multiple access and backhaul links within the relay chain and control and/or schedule descendant IAB nodes and/or UEs 115-e within (i.e., downstream) the IAB network, as illustrated. That is, an IAB node functionality at base station 105-c may act as a relay between the IAB donor functionality of a base station 105-b and one or more descendant devices (e.g., UEs 115-e) in both communication directions based on established backhaul and access connections.

Due to increased spectral capabilities associated with NR technology and resource deployments, devices of an IAB network (e.g., base stations 105, UEs 115) may support CA spanning non-collocated cell coverage areas 110-a. In some examples, disparate cell deployments may include different propagation delays associated with data communication across network resources. Intermediary devices, such as IAB nodes supported by base stations 105-c, and terminal devices, such as one or more UEs 115-e, may attempt to compensate for propagation delay between downlink data reception and uplink transmission (i.e., RTT) by performing a negative offset in uplink transmission scheduling. Compensation may be based on an estimated timing advance provided by DUs of base stations 105-b or 105-c and may support uplink transmission alignment with subframe timing at the network. A TA value may be dynamically implemented according to a configured timer (e.g., timeAlignmentTimer) where the IAB node may be considered uplink time aligned. In some examples, one or more serving cells 110-a may have the same estimated uplink TA and downlink timing reference cell. Each of the serving cells 110-a sharing a common estimated uplink TA may be recognized by the IAB node as part of a TAG.

For example, base stations 105-b and 105-c may support backhaul link 405 between supported DUs of base station 105-b and MT functionality of base station 105-c. Link 405 may be associated with service coverage of one or more service cells 110-a, as part of a TAG. Based on a measured timing offset between uplink signaling (e.g., PUSCH, PUCCH, SRS) reception at the DUs and the network subframe timing, base station 105-b may estimate a negative offset (i.e., TA) 410 for scheduling uplink transmission at the MT of base station 105-c. The TA may correspond to the RTT experienced by the base stations 105 due to propagation delays between transmission and reception on downlink and uplink. Base station 105-b may provide a signaling indication of the estimated TA 410 to MTs of base station 105-c via one or more index bits as part of a MAC RAR or MAC CE. In addition, base station 105-b may provide a configured timer (e.g., timeAlignmentTimer) indication supporting an allowable duration for implementation of TA 410 on associated links of the TAG. MT entities of the base station 105-c may then proceed to apply TA 410 for scheduling uplink data transmission, as a means to support UL synchronization with DU entities of base station 105-b. Application of TA 410 may be supported throughout the configured timer and may be updated at the base station 105-c according to reception of a subsequent TA command.

In some examples, the configured timer associated with a TA on one or more network links may be configured to infinity, allowing for a maintained TA throughout the service connection. Such a configuration may be particularly suitable for fixed UEs or fixed relays within the relay chain of an IAB network. In other cases, the configured timer associated with a TA may be configured to a fixed duration. A UE-F of a device may implement the TA value according to the configured timer, where communication on one or more network links may be considered uplink time aligned. Due to the possibility of a fixed timer duration, UE-F supported devices (e.g., MTs of a base station 105-c, one or more UEs 115-e) may experience potential configured timer expiration for one or more connections (e.g., link 405) associated with the TAG. The devices may consider timer expiration an indication of a loss of uplink synchronization. As a result, MTs of base station 105-c and/or the one or more UEs 115-e of the one or more network links may implement aspects to support enhanced service resolution capabilities despite configured timer expiration.

Figure 5:
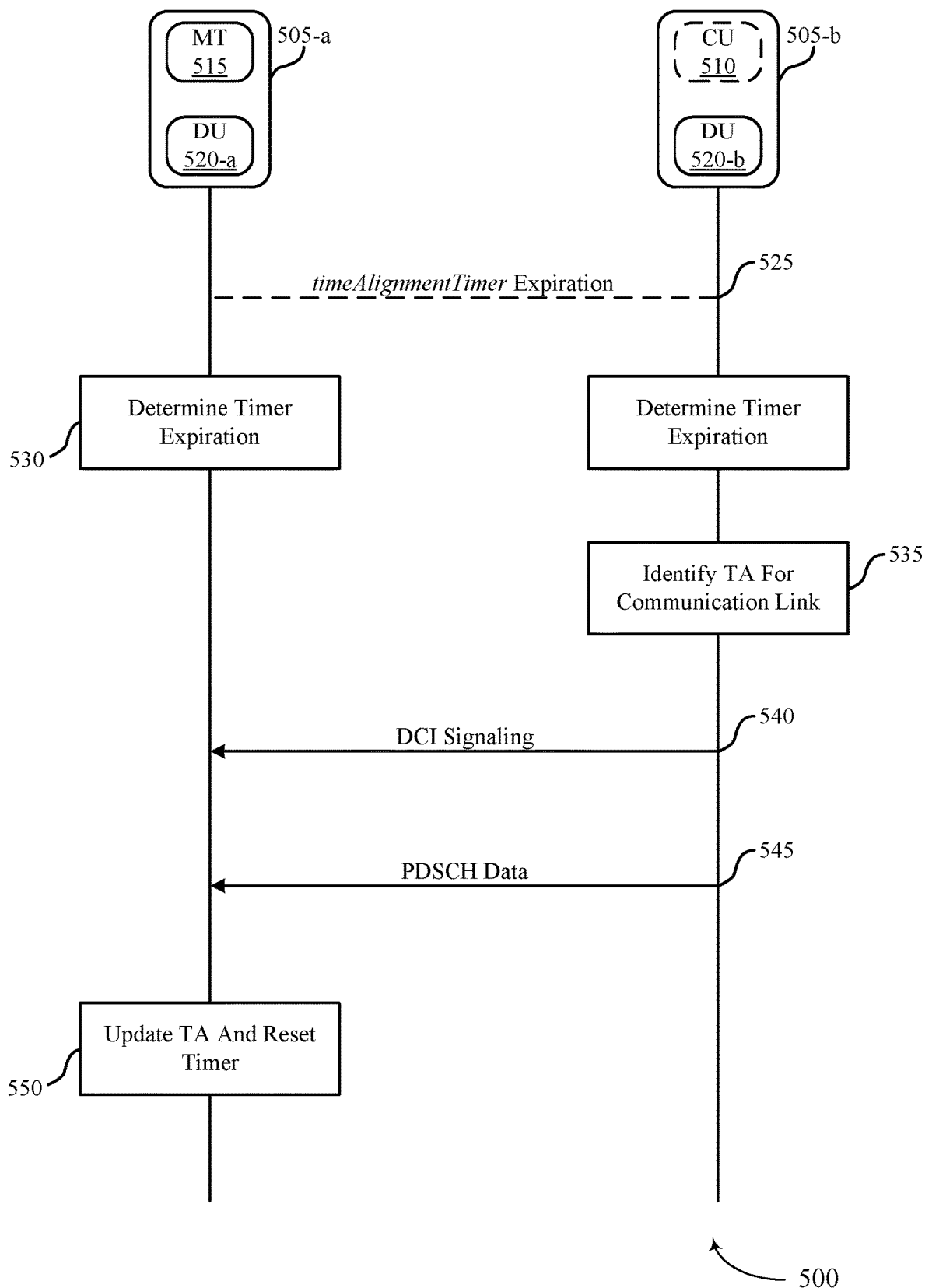
FIG. 5 illustrates an example of a process flow that supports a timing alignment timer in a wireless communication network in accordance with aspects of the present disclosure.

FIG. 5 illustrates an example of a process flow 500 that supports a timing alignment timer in a wireless communication network in accordance with aspects of the present disclosure. Process flow 500 may include one or more IAB nodes 505, which may be examples of supporting functionality within a base station 105 of a wireless network architecture (e.g., an IAB network architecture), as described with reference to FIGS. 1 through 4. As described, mechanisms for performing one or more processes of the described techniques may be performed by an MT entity (e.g., a UE-F) of an IAB node 505 via a backhaul link. Additionally or alternatively, the following examples or features may be performed by one or more UEs or other descendant devices within a relay chain of the IAB network via one or more access or backhaul links. Further, as described, mechanisms for performing one or more processes of the described techniques may be performed by one or more DUs 520 of an IAB node 505 (e.g., an IAB donor 505-*b* or an additional IAB node 505 within the relay chain).

In some examples, CU 510 and DU 520-*b* may be located in a single IAB node 505, referred to as an IAB donor (e.g., a IAB donor 505-*b* containing a CU 510 and DU 520-*b*). CU 510 may be a component of a database, data center, or the core network (e.g., a 5G NR core network (5GC)). CU 510 may communicate with the core network (e.g., the NGC) via a backhaul link (e.g., a wireline backhaul or wireless backhaul). DU 520-*b* associated with a IAB donor node 505-*b* may be partially controlled and/or scheduled by CU 510. CU 510 may host layer 3 (L3) (e.g., radio resource control (RRC), service data adaption protocol (SDAP), packet data convergence protocol (PDCP), etc.) functionality and signaling for IAB donor 505-*b*. DU 520-*b* may host lower layer, such as layer 1 (L1) and layer 2 (L2) (e.g., radio link control (RLC), media access control (MAC), physical (PHY), etc.) functionality and signaling. IAB node 505-*a* may be a descendant (i.e., child) node relative to IAB donor 505-*b* within the relay chain. In some examples, IAB node 505-*a* may include MT 515 and DU 520-*a* (e.g., a IAB node 505-*a* containing a MT 515 and DU 520-*a*). MT 515 may be controlled and/or scheduled by DU 520-*b* of IAB donor 505-*b* (i.e., parent node) via access and backhaul links of the IAB network. DU 520-*a* may be controlled and/or scheduled by MT 515. In addition, In some examples, DU 520-*a* may be partially controlled and/or scheduled by signaling messages from CU 510 of IAB donor 505-*b* (i.e., via an F1-AP). DU 520-*a* may support one or more wireless backhaul and/or access links within the relay chain, providing network services to one or more descendant devices throughout the network. DU 520-*a* may host lower layer, such as layer 1 (L1) and layer 2 (L2) (e.g., radio link control (RLC), media access control (MAC), physical (PHY), etc.) functionality and signaling.

Process flow 500 may illustrate service resolution mechanisms for maintaining uplink synchronization at a wireless device supporting UE-F. As described, mechanisms for performing the described techniques may be performed by an MT 515 of an IAB node. Additionally or alternatively, the following examples or features may be performed by a UE on an established communication link and/or by one or more UEs or descendant devices within a relay chain of the IAB network. In particular, process flow 500 may describe methods or procedures for enhancement to MT functionality in the case of timer (e.g., timeAlignmentTimer) expiration associated with a configured uplink TA on an established communication link (e.g., access link, wired or wireless backhaul link, etc.). In the following description of process flow 500, the operations between IAB donor 505-*b*, IAB node 505-*a*, and the associated entities (e.g., CU 510, DUs 520, MT 515) of the IAB nodes 505 may be transmitted in a different order than the exemplary order shown, or the operations performed may be performed in different orders or at different times. In some examples, operations may also be left out of the process flow 500, or other operations may be added to the process flow 500.

At 525, a timer (e.g., timeAlignmentTimer) associated with an assigned TA for MT 515 may expire without renewal. The TA may be associated with uplink scheduling on a communication link between IAB node 505-*a* and IAB donor 505-*b*, and may be controlled and/or scheduled by DU 520-*b* of the IAB donor 505-*b*. In some examples, the TA may be associated with one or more additional communication links over serving cells corresponding to a TAG.

At 530, IAB node 505-*a* and IAB donor 505-*b* may determine that the timer associated with the TA over the communication (e.g., backhaul) link has expired. Based on the timer expiration, MT 515 may allow for potential reception of a new TA command with an updated timer reset. Allowance for potential reception at MT 515 may include obviating procedure associated with interpreted loss to uplink synchronization. For example, based on the allowance for potential reception, MT 515 may postpone flushing of HARQ buffers for serving cells of the TAG associated with the TA value, and obviate notification of PUCCH and/or SRS release procedure and clearing of configured downlink assignments or uplink grants for at least a specified duration following the configured timer expiration. Postponement by MT 515 may be based on the determination of timer expiration at the IAB donor 505-*b* and expectation that a TA command response may be provided by DU 520-*b* in response to the timer expiration (i.e., within some predetermined maximum time).

At 535, TAB donor 505-*b* may identify a TA command value and timer reset indication based on the determination of timer expiration. In some examples, IAB donor 505-*b* may identify the TA command value based on the previous estimated TA command associated with the TAG containing the communication link. In other cases, TAB donor 505-*b* may estimate an updated TA command based on recent measured propagation delays associated with downlink scheduling and reception of uplink signaling (e.g., PUSCH, PUCCH, SRS, etc.) indication. The TA command value may be represented as a negating timing offset between uplink transmission and downlink reception at MT 515 (i.e., referred to as a RTT). A time unit in the TA command value (e.g., the time units representing a TA offset) may be denoted in $T_S$ seconds (i.e., 1/(4096*480000) seconds) and indicate the change of uplink scheduled timing relative to downlink reception. In addition, IAB donor 505-*b* may determine a configured timer update value and/or reset associated with the TA command. In some examples, the timer update may include a timer reset indication to continue communication on the communication link for a specified duration.

At 540, DU 520-*b* of IAB donor 505-*b* may transmit DCI to MT 515 of IAB node 505-*a* on PDCCH. The DCI may be formatted to include scheduling for subsequent PDSCH transmission (e.g., DCI format 1_1). In addition, DU 520-*b* may configure an indicator within the DCI format to indicate the presence of a TA command within a MAC CE of the PDSCH transmission. The indicator may include a single bit or multi-bit indicator value configured to provide notification to MT 515 of an updated TA command for processing during PDSCH reception of the MAC CE. Based on the indication, MT 515 may receive and process the formatted DCI transmission and anticipate reception of the TA command within a MAC CE of the PDSCH. Alternatively, the DCI may provide the TA command.

At 545, DU 520-*b* of IAB donor 505-*b* may transmit a MAC CE, including an updated TA command, to MT 515 of IAB node 505-*a* on PDSCH resources of the communication link. The updated TA command may be indicated according to a 6-bit index value (i.e., value 0-63). In addition, DU 520-*b* may provide a configured timer reset associated with the updated TA command. MT 515 may receive the PDSCH transmission and process the updated TA command associated with the TAG of the communication link between MT 515 and DU 520-*b*. Based on the processing, at 550, MT 515 may update the TA command for scheduling uplink transmission and reset the timer associated with the TA value.

Figure 6:
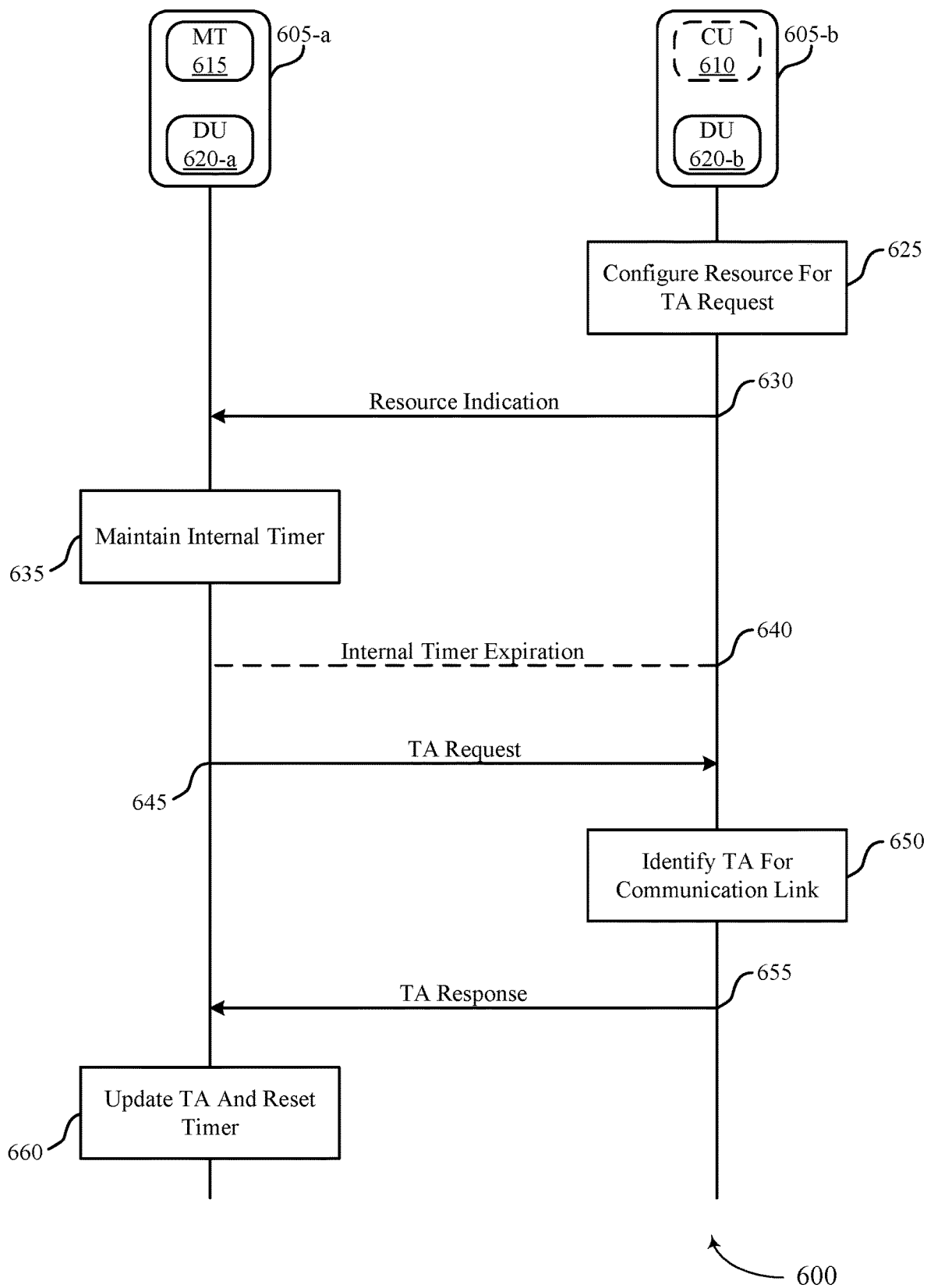
FIG. 6 illustrates an example of a process flow that supports a timing alignment timer in a wireless communication network in accordance with aspects of the present disclosure.

FIG. 6 illustrates an example of a process flow 600 that supports a timing alignment timer in a wireless communication network in accordance with aspects of the present disclosure. Process flow 600 may include one or more IAB nodes 605, which may be examples of supporting functionality within a base station 105 of an IAB network architecture, as described with reference to FIGS. 1 through 4. As described, mechanisms for performing one or more processes of the described techniques may be performed by an MT entity of an IAB node 605 via a backhaul link. Additionally or alternatively, the following examples or features may be performed by one or more UEs or descendant devices within a relay chain of the IAB network via one or more access or backhaul links. Further, as described, mechanisms for performing one or more processes of the described techniques may be performed by one or more DUs 620 of an IAB node 505 (e.g., an IAB donor 605-*b* or an additional IAB node 605 within the relay chain).

In some examples, CU 610 and DU 620-*b* may be located in a single IAB node 605, referred to as an IAB donor (e.g., a donor IAB 605-*b* containing a CU 610 and DU 620-*b*). CU 610 may be a component of a database, data center, or the core network (e.g., a 5G NR core network (NGC)). CU 610 may communicate with the core network (e.g., the NGC) via a backhaul link (e.g., a wireline backhaul or wireless backhaul). DU 620-*b* associated with a IAB donor node 605-*b* may be partially controlled and/or scheduled by CU 610. CU 610 may host layer 3 (L3) (e.g., radio resource control (RRC), service data adaption protocol (SDAP), packet data convergence protocol (PDCP), etc.) functionality and signaling for IAB donor 605-*b*. DU 620-*b* may host lower layer, such as layer 1 (L1) and layer 2 (L2) (e.g., radio link control (RLC), media access control (MAC), physical (PHY), etc.) functionality and signaling. IAB node 605-*a* may be a descendant (i.e., child) node relative to IAB donor 605-*b* within the relay chain. In some examples, IAB node 605-*a* may include MT 615 and DU 620-*a* (e.g., a IAB node 605-*a* containing a MT 615 and DU 620-*a*). MT 615 may be controlled and/or scheduled by DU 620-*b* of IAB donor 605-*b* (i.e., its parent node) via access and backhaul links of the IAB network. DU 620-*a* may be controlled and/or scheduled by MT 615. In addition, In some examples, DU 620-*a* may be partially controlled and/or scheduled by signaling messages from CU 610 of IAB donor 605-*b* (i.e., via an F1-AP). DU 620-*a* may support one or more wireless backhaul and/or access links within the relay chain, providing network services to one or more descendant devices throughout the network. DU 620-*a* may host lower layer, such as layer 1 (L1) and layer 2 (L2) (e.g., radio link control (RLC), media access control (MAC), physical (PHY), etc.) functionality and signaling.

Process flow 600 may illustrate service resolution mechanisms for maintaining uplink synchronization at a wireless device supporting UE-F. As described, mechanisms for performing the described techniques may be performed by an MT 615 of an IAB node. Additionally or alternatively, the following examples or features may be performed a UE on an established communication link and/or by one or more UEs or descendant devices within a relay chain of the IAB network. In particular, process flow 600 may describe methods or procedures for enhancement to MT functionality proactive to potential timer (e.g., timeAlignmentTimer) expiration associated with a configured uplink TA on an established communication link (e.g., access link, wired or wireless backhaul link, etc.). In the following description of process flow 600, the operations between IAB donor 605-*b*, IAB node 605-*a*, and the associated entities (e.g., CU 610, DUs 620, MT 615) of the IAB nodes 605 may be transmitted in a different order than the exemplary order shown, or the operations performed may be performed in different orders or at different times. In some examples, operations may also be left out of the process flow 600, or other operations may be added to the process flow 600.

At 625, IAB donor 605-*b* may pre-configure a periodic resource allocation or configuration for IAB node 605-*a* to provide a TA command request via MT 615. In some examples, the resource allocation or configuration for the TA request may correspond to resources for performing a CFRA procedure initiated by MT 615. In some examples, the resource allocation or configuration may correspond to performing a TA request in the form of a MAC CE, PUCCH transmission, or lower layer (e.g., L1, L2) signaling mechanism. In other cases, the resource allocation or configuration may correspond to performing a TA request may be in the form of an RRC message or other upper-layer (L3, backhaul) signaling mechanism. For one or more forms, configuration of resources for the TA request may include designing a new resource format for signaling. For example, IAB donor 605-*b* may use a PUCCH format configured to provide the TA command request indication. Alternatively, configuration of resources for the TA request may include modifying an existing resource format to include the TA command request. For example, IAB donor 605-*b* may modify the resource format of a configured PUCCH message may include one or more bits associated with communicating the TA command request.

In the case of a resource allocation or configuration for performing CFRA procedure, DU 620-*b* may configure one or more RACH values associated with parameters of the CFRA procedure. For example, DU 620-*b* may configure preambleTransMax and/or RARwindow parametrizations specific to the CFRA procedure of the resource allocation or configuration. The configured RACH value parameters may be distinct from one or more parameterizations associated with CFRA procedure in other contexts. For example, In some examples, RACH value parameters (e.g., preambleTransMax, RARwindow, etc.) may be set to small values in order to be quickly declared if RACH procedure associated with the CFRA is unsuccessful.

At 630, DU 620-*b* of IAB donor 605-*b* may transmit an indication of the pre-configured resource allocation or configuration to MT 615 of IAB node 605-*a*, for performing periodic TA command request. For example, DU 620-*b* may transmit a DCI indication for scheduling the periodic TA command request at MT 615. The DCI indication may further include an indication of the resource format (e.g., MAC CE, PUCCH, RRC, CFRA, etc.) for performing the periodic TA command request. MT 615 may receive the indication of the resource allocation or configuration and, at 635, maintain a second (e.g., internal) timer or other timing mechanism relative to the configured timer (e.g., timeAlignmentTimer) for the current TA of the communication link. For example, MT 615 may receive the indication and determine an internal timing mechanism coordinated to expire a fixed number of subframes or a fixed temporal duration prior to the configured timer of the TA on the communication link.

At 640, MT 615 of IAB node 605-*a* may determine that the internal timing mechanism has expired and initiate a TA command request on the pre-configured resources provided by DU 620-*b* of IAB donor 605-*b*. At 645, MT 615 may transmit the TA command request according to the configured resource format allocated by the IAB donor 605-*b*. In some examples, the TA request may correspond to initiation of a CFRA procedure, including transmission of a CFRA preamble. In some examples, the TA request may include lower layer (e.g., L1, L2) signaling according to a MAC CE, or PUCCH transmission, formatted to include the TA command request. In other cases, the TA request may be in the form of an RRC message or other upper-layer (L3, backhaul) signaling mechanism.

At 650, DU 620-*b* of IAB donor 605-*b* may receive the periodic TA command request transmitted by MT 615 and configure a TA command response. The TA command response may include an updated TA command and indication that MT 615 may continue communication on the communication link (e.g., reset configured timer). At 655, DU 620-*b* may then transmit the TA response to MT 615. For example, DU 620-*b* may transmit a MAC CE, including an updated TA command, to MT 615 on PDSCH resources of the communication link. In some examples, the updated TA command may be indicated according to a 6-bit index value (e.g., representing values 0-63). MT 615 may receive the PDSCH transmission and process the updated TA command associated with the TAG of the communication link between MT 615 and DU 620-*b*.

At 660, MT 615 of IAB node 605-*a* may update the TA for uplink transmissions and reset the timer associated with the TA value. The timer reset may be implemented prior to the configured timer (e.g., timeAlignmentTimer) expiration of the TA command, hence proactively updating the TA command prior to potential timer expiration. In addition, MT 615 may update the internal timer associated with the pre-configured TA command request resources relative to the configured timer reset. MT 615 may then proceed with data communication with DU 620-*b*, including configured uplink grants and downlink assignments to one or more descendant devices of the relay chain.

Though process flow 600 is described with reference to one or more IAB nodes 605, process flow 600 may also be performed in other wireless communication network contexts. For example, IAB node 605-*a* may instead be a UE 115, or a MT or UE-F of another wireless network node or device, such that UE 115, or MT or UE-F of the another wireless network node or device, may receive the resource indication at 630, maintain an internal timer at 635, identifying that such timer has expired at 640, and send a TA request at 645, and receive a response to the TA request at 655 (e.g., a TA command), and update its TA and reset the internal timer at 660.

Similarly, IAB donor 605-*b* may instead be base station 105, or a DU or AN-F of another wireless network node or device, such that base station 105, or a DU or AN-F of another wireless network node or device, may configure resources to be used for a TA request by another wireless device (e.g., a UE 115, or a MT or UE-F of another wireless network node or device), transmit the resource indication at 630, receive a TA request at 645, identifying TA information for the communication link, and transmit a response to the TA request at 655 (e.g., a TA command) based on the identified TA information.

Figure 7:
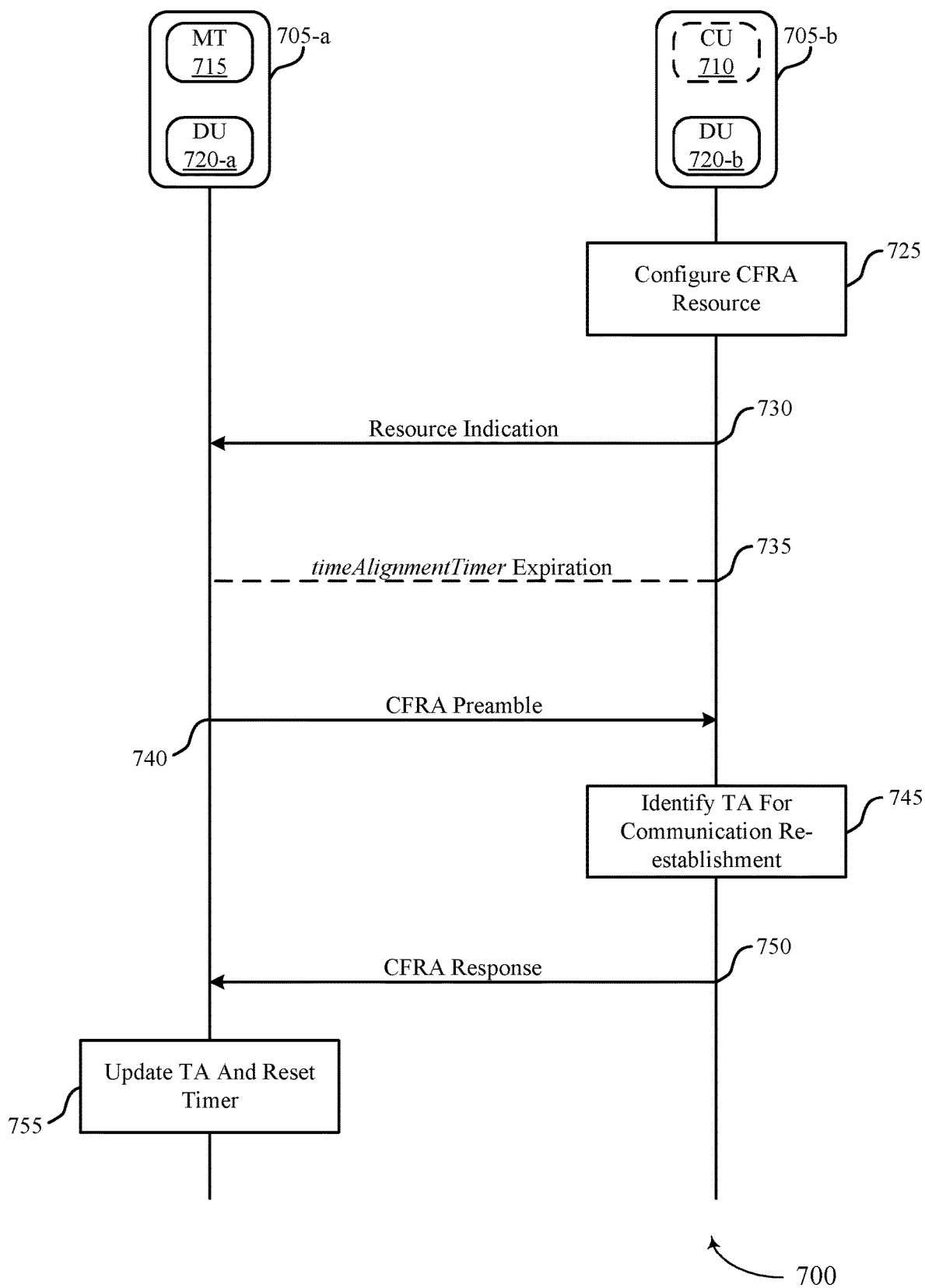
FIG. 7 illustrates an example of a process flow that supports a timing alignment timer in a wireless communication network in accordance with aspects of the present disclosure.

FIG. 7 illustrates an example of a process flow 700 that supports a timing alignment timer in a wireless communication network in accordance with aspects of the present disclosure. Process flow 700 may include one or more IAB nodes 705, which may be examples of supporting functionality within a base station 105 of an IAB network architecture, as described with reference to FIGS. 1 through 4. As described, mechanisms for performing one or more processes of the described techniques may be performed by an MT entity of an IAB node 705 via a backhaul link. Additionally or alternatively, the following examples or features may be performed by one or more UEs or descendant devices within a relay chain of the IAB network via one or more access or backhaul links. Further, as described, mechanisms for performing one or more processes of the described techniques may be performed by one or more DUs 720 of an IAB node 705 (e.g., an IAB donor 705-*a* or an additional IAB node 705 within the relay chain).

In some examples, CU 710 and DU 720-*b* may be located in a single IAB node 705-*b*, referred to as an IAB donor (e.g., a donor IAB 705-*b* containing a CU 710 and DU 720-*b*). CU 710 may be a component of a database, data center, or the core network (e.g., a 5G NR core network (NGC)). CU 710 may communicate with the core network (e.g., the NGC) via a backhaul link (e.g., a wireline backhaul or wireless backhaul). DU 720-*b* associated with a IAB donor node 705-*b* may be partially controlled and/or scheduled by CU 710. CU 710 may host layer 3 (L3) (e.g., radio resource control (RRC), service data adaption protocol (SDAP), packet data convergence protocol (PDCP), etc.) functionality and signaling for IAB donor 705-*b*. DU 720-*b* may host lower layer, such as layer 1 (L1) and layer 2 (L2) (e.g., radio link control (RLC), media access control (MAC), physical (PHY), etc.) functionality and signaling. IAB node 705-*a* may be a descendant (i.e., child) node relative to IAB donor 705-*b* within the relay chain. In some examples, IAB node 705-*a* may include MT 715 and DU 720-*a* (e.g., a IAB node 705-*a* containing a MT 715 and DU 720-*a*). MT 715 may be controlled and/or scheduled by DU 720-*b* of IAB donor 705-*b* (i.e., its parent node) via access and backhaul links of the IAB network. DU 720-*a* may be controlled and/or scheduled by MT 715. In addition, In some examples, DU 720-*a* may be partially controlled and/or scheduled by signaling messages from CU 710 of IAB donor 705-*b* (e.g., via an F1-AP). DU 720-*a* may support one or more wireless backhaul and/or access links within the relay chain, providing network services to one or more descendant devices throughout the network. DU 720-*a* may host lower layer, such as layer 1 (L1) and layer 2 (L2) (e.g., radio link control (RLC), media access control (MAC), physical (PHY), etc.) functionality and signaling.

Process flow 700 may illustrate service resolution mechanisms for maintaining uplink synchronization at a wireless device supporting UE-F. As described, mechanisms for performing the described techniques may be performed by an MT 715 of an IAB node. Additionally or alternatively, the following examples or features may be performed a UE on an established communication link and/or by one or more UEs or descendant devices within a relay chain of the IAB network. In particular, process flow 700 may describe methods or procedures for enhancement to MT functionality following timer (e.g., timeAlignmentTimer) expiration associated with a configured uplink TA on an established communication link (e.g., access link, wired or wireless backhaul link, etc.). In the following description of process flow 700, the operations between IAB donor 705-*b*, IAB node 705-*a*, and the associated entities (e.g., CU 710, DUs 720, MT 715) of the IAB nodes 705 may be transmitted in a different order than the exemplary order shown, or the operations performed may be performed in different orders or at different times. In some examples, operations may also be left out of the process flow 700, or other operations may be added to the process flow 700.

At 725, IAB donor 705-*b* may pre-configure a resource allocation or configuration for IAB node 705-*a* to provide a TA command request via MT 715. The resource allocation or configuration for the TA request may correspond to resources for performing a CFRA procedure initiated by MT 715. In the case of a TA request associated with a dispersed communication links of a TAG (e.g., dense relay chain)

associated with a plurality of descendant (i.e., child) IAB nodes 705 in supplement to IAB node 705-*a*, DU 720-*b* of IAB donor 705-*b* may configure a unique CFRA preamble for each child IAB node 705. Due to enhanced backhaul capacity density associated with an IAB network, DU 720-*b* may facilitate mechanisms for spatial reuse and therefore enhance spectral efficiency within network resources. DU 720-*b* may configure the resource allocation or configuration for CFRA procedure at MT 715 according to any combination of uplink reference signaling indication (e.g., SSB, CSI-RS, etc.).

MT 715 may support beam management techniques on a set of transmission reception point (TRxP) antenna arrays for downlink and uplink transmission and reception. In some examples, DU 720-*b* may allocate a CFRA preamble in association with all TRxP on the antenna array supported by MT 715 (i.e., all antenna directions). In other cases, DU 720-*b* may allocate a CFRA preamble for one or more TRxP subsets associated with the reference signaling indication. DU 720-*b* may determine the one or more TRxP subsets according to at least one of a beam report indication provided by MT 715, location of the one or more TRxP subsets, mobile relay capability at MT 715, or a scheduling state of the MT 715. For example, IAB node 705-*a* corresponding to MT 715 may in supplement serve as a parent node for one or more descendant (e.g., child) devices within the relay chain, providing scheduling and command via DU 720-*a*. As a result, IAB node 705-*a* may be limited in the scheduling availability of resources for performing CFRA procedure, due to resource occupation due to additional services by DU 720-*a*.

DU 720-*b* may configure one or more RACH values associated with parameters of the CFRA procedure. For example, DU 720-*b* may configure preambleTransMax and/or RARwindow parametrizations specific to the CFRA procedure of the resource allocation or configuration. The configured RACH value parameters may be distinct from one or more parameterizations associated with CFRA procedure in other contexts. For example, In some examples, RACH value parameters (e.g., preambleTransMax, RAR-window, etc.) may be set to small values. As a result, radio link failure instances may be quickly declared if RACH procedure associated with the CFRA is unsuccessful.

At 730, DU 720-*b* of IAB node 705-*b* may transmit the indication of the pre-configured resource allocation or configuration to MT 715 of IAB node 705-*a*, for performing CFRA procedure. For example, DU 720-*b* may transmit an RRC message to MT 715 indicating allocation of resources for performing CFRA in the event of configured timer (e.g., timeAlignmentTimer) expiration in association with a TA on the communication link. MT 715 may receive and process the resource allocation or configuration for performing CFRA procedure.

At 735, the configured timer (e.g., timeAlignmentTimer) associated with the assigned TA for MT 715 may expire without renewal. In some examples, the TA may be associated with one or more additional communication links over serving cells corresponding to a TAG. At 740, based on the configured timer expiration, MT 715 may transmit a CFRA preamble on the pre-configured resources allocated by DU 720-*b*. By transmitting the CFRA preamble on the pre-configured resources, MT 715 may obviate temporal delays associated with receiving a DCI scheduling to perform random access procedure.

At 745, DU 720-*b* of IAB donor 705-*b* may receive the CFRA preamble of MT 715 and configure a TA command response. The TA command response may include TA command value and a configured timer indication for communication re-establishment on the communication link. At 750, DU 720-*b* may then transmit the TA response to MT 715. For example, DU 720-*b* may transmit a MAC RAR, including a TA command value, to MT 715 on PDSCH resources of the communication link. The TA command value of the MAC RAR may be based on the RACH procedure initiated by MT 715. The TA command value may be indicated according to a 11-bit index value (i.e., value 0-1282). MT 715 may receive the PDSCH transmission and process the MAC RAR for connection re-establishment over the communication link.

At 755, MT 715 may process the TA command value for scheduling uplink transmission and implement the configured timer of the TA command response provided in the MAC RAR. MT 715 may then complete communication re-establishment on resources of the communication link between IAB node 705-*a* and IAB donor 705-*b* and proceed with data communication, including configured uplink grants and downlink assignments to one or more descendant devices of the relay chain.

Though process flow 700 is described with reference to one or more IAB nodes 705, process flow 700 may also be performed in other wireless communication network contexts. For example, IAB node 705-*a* may instead be a UE 115, or a MT or UE-F of another wireless network node or device, such that UE 115, or MT or UE-F of the another wireless network node or device, may receive a pre-configured resource allocation or configuration at 725, identifying that a timer associated with a TA has expired at 735, and initiate a CFRA procedure (i.e., transmit a CFRA preamble) at 740, and receive a response to the CFRA preamble associated with (e.g., a TA command included in a MAC RAR) at 745, and update its TA and reset the internal timer at 750.

Similarly, IAB node 705-*b* may instead be base station 105, or a DU or AN-F of another wireless network node or device, such that base station 105, or a DU or AN-F of another wireless network node or device, may configure resources to be used for a TA request by another wireless device (e.g., a UE 115, or a MT or UE-F of another wireless network node or device), configure a resource allocation or configuration for performing a CFRA procedure at 725, transmit the resource indication at 730, receive a CFRA preamble at 740, identifying TA information for the communication link, and transmit a response at 750 (e.g., a TA command included in a MAC RAR) based on the identified TA information.

Figure 8:
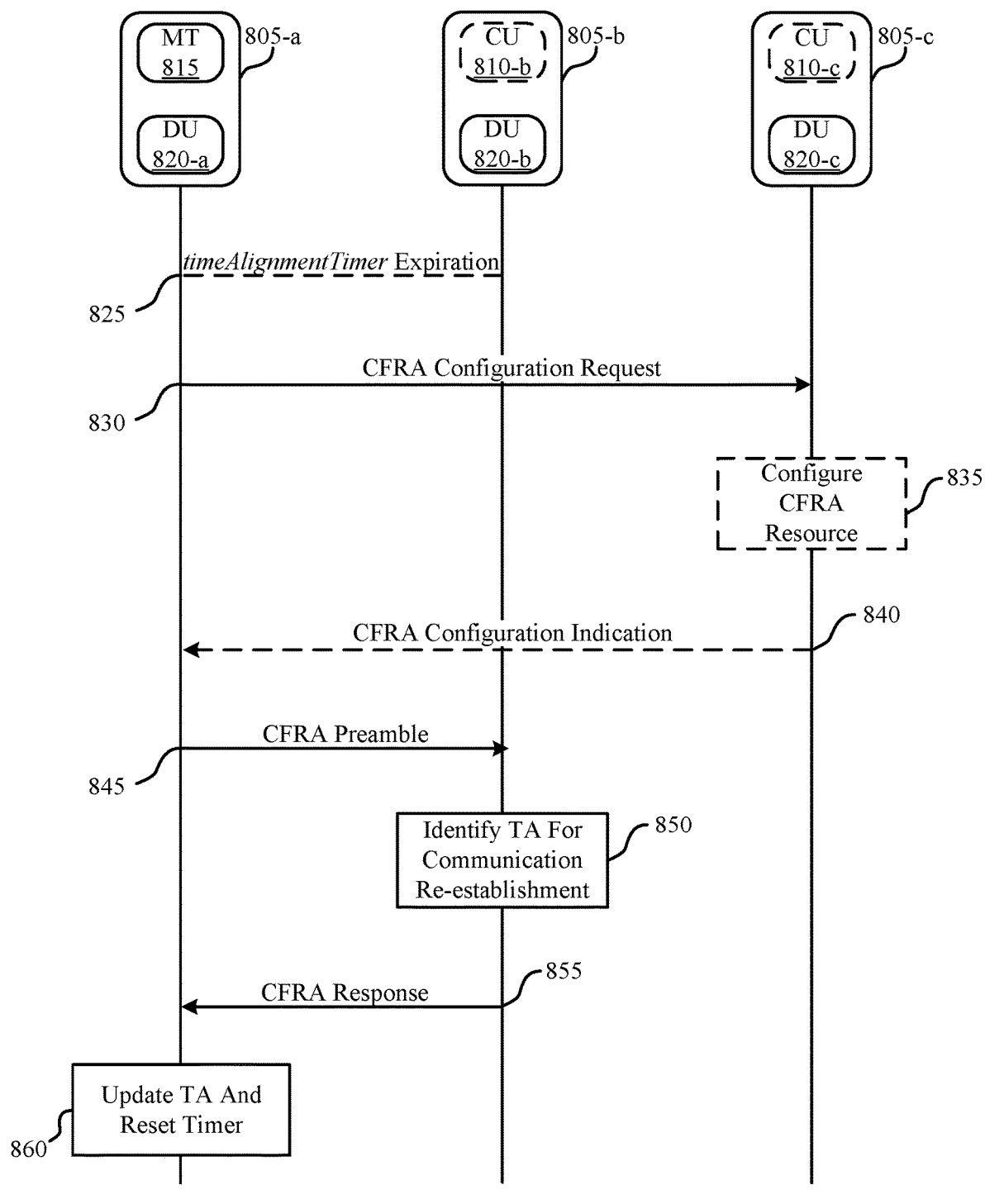
FIG. 8 illustrates an example of a process flow that supports a timing alignment timer in a wireless communication network in accordance with aspects of the present disclosure.

FIG. 8 illustrates an example of a process flow 800 that supports a timing alignment timer in a wireless communication network in accordance with aspects of the present disclosure. Process flow 800 may include one or more IAB nodes 805, which may be examples of supporting functionality within a base station 105 of an IAB network architecture, as described with reference to FIGS. 1 through 4. As described, mechanisms for performing one or more processes of the described techniques may be performed by an MT entity of an IAB node 805 via a backhaul link. Additionally or alternatively, the following examples or features may be performed by one or more UEs or descendant devices within a relay chain of the IAB network via one or more access or backhaul links. Further, as described, mechanisms for performing one or more processes of the described techniques may be performed by one or more DUs 820 of an IAB node 805 (e.g., an IAB donor 805-*c* or IAB donor 805-*b*, or an additional IAB node 805 within the relay chain).

Due to enhanced backhaul capability density on an IAB network an IAB node 805-*a* may be supported in the IAB network by a plurality of parent nodes (e.g., IAB nodes, IAB donors) 805-*b* and 805-*c* via multiple backhaul links. Additionally, each of the multiple backhaul links supported at IAB node 805-*a* may support multiple radio access technologies (RATs) (e.g., millimeter wave (mmW) and sub-6 channels) for communication. For example, IAB node 805-*a* may be a descendant (i.e., child) node relative to each of IAB nodes 805-*b* and 805-*c* (e.g., parent nodes 805-*b* and 805-*c*). In some cases each of parent IAB nodes 805-*b* and 805-*c* may include CUs 810 and DUs 820, and may be referred to as IAB donors (e.g., a IAB donor 805-*b* containing a CU 810-*b* and a DU 820-*b* and a IAB donor 805-*c* containing a CU 810-*c* and a DU 820-*c*). CUs 810 may each be a component of a database, data center, or the core network (e.g., a 5G NR core network (NGC)). DUs 820-*b* and 820-*c* may be partially controlled and/or scheduled by their associated CUs 810-*b* and 810-*c* within IAB donors 805-*b* and 805-*c*.

IAB node 805-*a* may include MT 815 and DU 820-*a* (e.g., a IAB node 805-*a* containing a MT 815 and DU 820-*a*). MT 815 may be controlled and/or scheduled by a first DU 820-*b* of IAB donor 805-*b* (i.e., parent node) via an access and backhaul link associated with a first TAG over serving cells of the network. In addition, MT 815 may be controlled and/or scheduled by a second DU 820-*c* of IAB donor 805-*c* (i.e., parent node) via a separate access and backhaul link associated with a second TAG over serving cells non-collocated with that of DU 820-*b*. DU 820-*a* may be controlled and/or scheduled by MT 815. In addition, In some examples, DU 820-*a* may be partially controlled and/or scheduled by signaling messages from CUs 810-*b* and 810-*c* (i.e., via F1-AP interfaces between IAB node 805-*a* and IAB donors 805-*b* and/or 805-*c*). DU 820-*a* may support one or more wireless backhaul and/or access links within the relay chain, providing network services to one or more descendant devices throughout the network. DU 820-*a* may host lower layer, such as layer 1 (L1) and layer 2 (L2) (e.g., radio link control (RLC), media access control (MAC), physical (PHY), etc.) functionality and signaling.

Process flow 800 may illustrate service resolution mechanisms for maintaining uplink synchronization at a wireless device supporting UE-F. As described, mechanisms for performing the described techniques may be performed by an MT 815 of an IAB node. Additionally or alternatively, the following examples or features may be performed a UE on an established communication link and/or by one or more UEs or descendant devices within a relay chain of the IAB network. In particular, process flow 800 may describe methods or procedures for enhancement to MT functionality for an IAB node configured for multi-connectivity. In the following description of process flow 800, the operations between IAB donors 805-*b* and 805-*c*, IAB node 805-*a*, and the associated entities (e.g., CUs 810, DUs 820, MT 815) of the IAB nodes 805 may be transmitted in a different order than the exemplary order shown, or the operations performed may be performed in different orders or at different times. In some examples, operations may also be left out of the process flow 800, or other operations may be added to the process flow 800.

At 825, a timer (e.g., timeAlignmentTimer) associated with an assigned TA corresponding to the communication link (e.g., target link) for MT 815 may expire without renewal. The target link may correspond to a wireless backhaul connection between IAB node 805-*a* and IAB donor 805-*b*, and may be controlled and/or scheduled by DU 820-*b* of the IAB donor 805-*b*. In some examples, the TA may be associated with one or more additional communication links over serving cells corresponding to a TAG.

At 830, MT 815 may transmit a request for a configured resource allocation or configuration for performing a CFRA random access procedure on the target link, the request transmitted on uplink resources of a second communication link (e.g., secondary link) between IAB node 805-*a* and IAB donor 805-*c*. Specifically, MT 815 may transmit a CFRA configuration request to DU 820-*c* of IAB donor 805-*c* for allocating resources to perform RACH procedure on resources associated with a communication link between MT 815 and DU 820-*b* of IAB donor 805-*b*. In some examples, the request may be transmitted by MT 815 according to lower layer (e.g., L1, L2) signaling mechanisms on a Uu interface between MT 815 and DU 820-*c*. In other cases, the request may be transmitted by MT 815 or DU 820-*a* according to an upper layer (e.g., L3) signaling mechanism on a backhaul (e.g., F1-AP) interface between IAB node 805-*a* and IAB donor 805-*b*.

At 835, IAB donor 805-*c* may configure a resource allocation or configuration for IAB node 805-*a* to perform a CFRA procedure initiated by MT 815. In some examples, DU 820-*c* of IAB donor 805-*c* may configure resources for performing the CFRA procedure at MT 815 in association with the communication link between MT 815 and DU 820-*b* of IAB donor 805-*b* (i.e., target link). Specifically, DU 820-*c* of IAB donor 805-*c* may act as a serving mechanism for configuring resources for a RACH procedure at MT 815, for uplink communication re-establishment at IAB donor 805-*b*. In other cases, IAB donor 805-*c* may receive the request by MT 815 and coordinate an indication to IAB donor 805-*b* (e.g., via a Uu or F1-AP interface). Based on the indication, DU 820-*b* may configure a resource allocation or configuration for MT 815 to perform a CFRA procedure and re-establish communication with MT 815.

In some examples, dispersed communication links of a TAG (e.g., dense relay chain) may be associated with a plurality of descendant (i.e., child) IAB nodes 805 in supplement to IAB node 805-*a*. As a result, DU 820-*b* of IAB donor 805-*b* and/or DU 820-*c* of IAB donor 805-*c* may configure a unique CFRA preamble for each child IAB node 805. Due to enhanced backhaul capacity density associated with an IAB network, DUs 820-*b* and/or 820-*c* may facilitate mechanisms for spatial reuse and therefore enhance spectral efficiency within network resources.

In some examples, MT 815 may support beam management techniques on a set of transmission reception point (TRxP) antenna arrays for downlink and uplink transmission and reception. Based on the coordination for configuring resources for CFRA procedure, DU 820-*b* and/or DU 820-*c* may allocate a CFRA preamble in association with all TRxP on the antenna array supported by MT 815 (i.e., all antenna directions). In other cases, DU 820-*b* and/or DU 820-*c* may allocate a CFRA preamble for one or more TRxP subsets associated with the reference signaling indication. DU 820-*b* may determine the one or more TRxP subsets according to at least one of a beam report indication provided by MT 815, location of the one or more TRxP subsets, mobile relay capability at MT 815, or a scheduling state of the MT 815.

At 840, MT 815 of IAB node 805-*a* may receive a response indication including the configured resources for performing CFRA procedure on the target link. In some examples, the indication of resource allocation or configuration for performing the CFRA procedure may be transmitted by DU 820-*c* of IAB donor 805-*c* via resources of a secondary link (e.g., Uu or F1-AP interface associated with a wireless backhaul link). In other cases, according to coordinated communication between IAB donor 805-*b* and IAB donor 805-*c*, DU 820-*b* of IAB donor 805-*b* may transmit the indication for resource allocation or configuration for performing CFRA procedure. For example, DU 820-*b* may transmit an RRC message to MT 715 indicating allocation of resources for performing CFRA based on configured timer (e.g., timeAlignmentTimer) expiration in association with a TA on the communication link.

At 845, based on the received CFRA resource allocation or configuration, MT 815 may transmit a CFRA preamble on the pre-configured resources allocated by DU 820-*c* and/or DU 820-*b*. By transmitting the CFRA preamble on the pre-configured resources, MT 815 may obviate temporal delays associated with receiving a DCI scheduling to perform random access procedure. The CFRA preamble may initiate RACH procedure for performing connection re-establishment on the link (e.g., target link) associated with MT 815 and DU 820-*b*.

At 850, DU 820-*b* of IAB donor 805-*b* may receive the CFRA preamble of MT 815 and configure a TA command response. The TA command response may include TA command value and a configured timer indication for communication re-establishment on the communication link. At 855, DU 820-*b* may then transmit the TA response to MT 815. For example, DU 820-*b* may transmit a MAC RAR, including a TA command value, to MT 815 on PDSCH resources of the communication link. The TA command value of the MAC RAR may be based on the RACH procedure initiated by MT 815. The TA command value may be indicated according to a 11-bit index value (i.e., value 0-1282). MT 815 may receive the PDSCH transmission and process the MAC RAR for connection re-establishment over the communication link.

At 860, MT 815 may process the TA command value for scheduling uplink transmission and implement the configured timer of the TA command response provided in the MAC RAR. MT 815 may then complete communication re-establishment on resources of the communication link between IAB node 805-*a* and IAB donor 805-*b* and proceed with data communication, including configured uplink grants and downlink assignments to one or more descendant (e.g., child) devices of the relay chain.

Though process flow 800 is described with reference to one or more IAB nodes 805, process flow 800 may also be performed in other wireless communication network contexts. For example, IAB node 805-*a* may instead be a UE 115, or a MT or UE-F of another wireless network node or device, such that UE 115, or MT or UE-F of the another wireless network node or device, may identify a timer expiration associated with a first communication link at 825, transmit, on a second communication link, a request for a CFRA resource allocation at 830, receive a response to the request for CFRA resource allocation at 840, and initiate a CFRA procedure (i.e., transmit a CFRA preamble) on the first communication link at 845, and receive a response to the CFRA preamble at 855 (e.g., a TA command included in a MAC RAR), and update its TA and reset the internal timer at 860.

Similarly, IAB nodes 805-*b* and 805-*c* may instead be base stations 105, or a DU or AN-F of other wireless network nodes or devices, such that base station 105, or a DU or AN-F of another wireless network node or device. In some examples, one of the wireless network nodes or devices may receive a request for CFRA resource allocation associated with connectivity re-establishment on a disparate communication link at 830, configure resources to be used for a CFRA procedure by another wireless device (e.g., a UE 115, or a MT or UE-F of another wireless network node or device) at 835, and transmit the resource indication at 840. Additionally or alternatively, one or more wireless network nodes or devices may receive a TA request included in a CFRA preamble at 850, identifying TA information for the communication link, and transmit a response to the TA request at 855 (e.g., a TA command included in a MAC RAR) based on the identified TA information.

Figure 9:
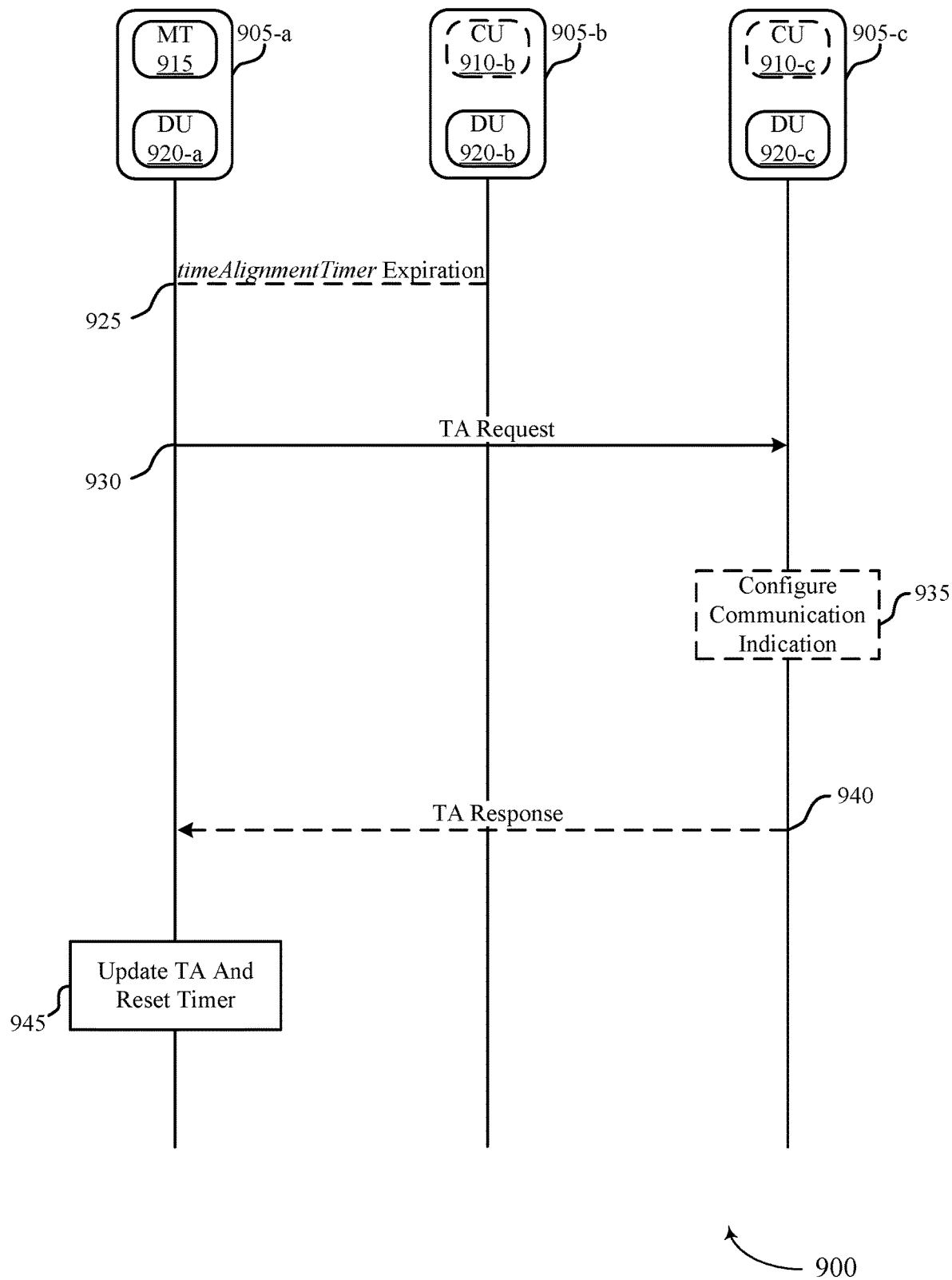
FIG. 9 illustrates an example of a process flow that supports a timing alignment timer in a wireless communication network in accordance with aspects of the present disclosure.

FIG. 9 illustrates an example of a process flow 900 that supports a timing alignment timer in a wireless communication network in accordance with aspects of the present disclosure. Process flow 900 may include one or more IAB nodes 905, which may be examples of supporting functionality within a base station 105 of an IAB network architecture, as described with reference to FIGS. 1 through 4. As described, mechanisms for performing one or more processes of the described techniques may be performed by an MT entity of an IAB node 905 via a backhaul link. Additionally or alternatively, the following examples or features may be performed by one or more UEs or descendant devices within a relay chain of the IAB network via one or more access or backhaul links. Further, as described, mechanisms for performing one or more processes of the described techniques may be performed by one or more DUs 920 of an IAB node 905 (e.g., an IAB donor 905-*a* or an additional IAB node 905 within the relay chain).

Due to enhanced backhaul capability density on an IAB network an IAB node 905-*a* may be supported in the IAB network by a plurality of parent nodes (e.g., IAB nodes, IAB donors) 905-*b* and 905-*c* via multiple backhaul links. Additionally, each of the multiple backhaul links supported at IAB node 905-*a* may support multiple radio access technologies (RATs) (e.g., millimeter wave (mmW) and sub-6 channels) for communication. For example, IAB node 905-*a* may be a descendant (i.e., child) node relative to each of IAB nodes 905-*b* and 905-*c* (e.g., parent nodes 905-*b* and 905-*c*). In some cases each of parent IAB nodes 905-*b* and 905-*c* may include CUs 910 and DUs 920, and may be referred to as IAB donors (e.g., a IAB donor 905-*b* containing a CU 910-*b* and a DU 920-*b* and a IAB donor 905-*c* containing a CU 910-*c* and a DU 920-*c*). CUs 910 may each be a component of a database, data center, or the core network (e.g., a 5G NR core network (NGC)). DUs 920-*b* and 920-*c* may be partially controlled and/or scheduled by their associated CUs 910-*b* and 910-*c* within IAB donors 905-*b* and 905-*c*.

IAB node 905-*a* may include MT 915 and DU 920-*a* (e.g., a IAB node 905-*a* containing a MT 915 and DU 920-*a*). MT 915 may be controlled and/or scheduled by a first DU 920-*b* of IAB donor 905-*b* (i.e., parent node) via an access and backhaul link associated with a first TAG over serving cells of the network. In addition, MT 915 may be controlled and/or scheduled by a second DU 920-*c* of IAB donor 905-*c* (i.e., parent node) via a separate access and backhaul link associated with a second TAG over serving cells non-collocated with that of DU 920-*b*. DU 920-*a* may be controlled and/or scheduled by MT 915. In addition, In some examples, DU 920-*a* may be partially controlled and/or scheduled by signaling messages from CUs 910-*b* and 910-*c* (i.e., via F1-AP interfaces). DU 920-*a* may support one or more wireless backhaul and/or access links within the relay chain, providing network services to one or more descendant devices throughout the network. DU 920-*a* may host lower layer, such as layer 1 (L1) and layer 2 (L2) (e.g., radio link control (RLC), media access control (MAC), physical (PHY), etc.) functionality and signaling.

Process flow 900 may illustrate service resolution mechanisms for maintaining uplink synchronization at a wireless device supporting UE-F. As described, mechanisms for performing the described techniques may be performed by an MT 915 of an IAB node. Additionally or alternatively, the following examples or features may be performed a UE on an established communication link and/or by one or more UEs or descendant devices within a relay chain of the IAB network. In particular, process flow 900 may describe methods or procedures for enhancement to MT functionality for an IAB node configured for multi-connectivity. In the following description of process flow 900, the operations between IAB donors 905-b and 905-c, IAB node 905-a, and the associated entities (e.g., CUs 910, DUs 920, MT 915) of the IAB nodes 905 may be transmitted in a different order than the exemplary order shown, or the operations performed may be performed in different orders or at different times. In some examples, operations may also be left out of the process flow 900, or other operations may be added to the process flow 900.

At 925, a timer (e.g., timeAlignmentTimer) associated with an assigned TA corresponding to the communication link (e.g., target link) for MT 915 may expire without renewal. The target link may correspond to a wireless backhaul connection between IAB node 905-a and IAB donor 905-b, and may be controlled and/or scheduled by DU 920-b of the IAB donor 905-b. In some examples, the TA may be associated with one or more additional communication links over serving cells corresponding to a TAG.

At 930, MT 915 may transmit a request for an updated TA command associated with the target link, the request transmitted on uplink resources of a second communication link (e.g., secondary link) between IAB node 905-a and IAB donor 905-c. Specifically, MT 915 may transmit a TA command request to DU 920-c of IAB donor 905-c for updating TA command and configured timer information on the target link between MT 915 and DU 920-b of IAB donor 905-b. In some examples, MT 915 may transmit the TA command request as part of a MAC CE, or as a data payload within a PUCCH transmission or lower layer (e.g., L1, L2) signaling mechanism on a Uu interface between MT 915 and DU 920-c. In other cases, MT 915 or DU 920-a may transmit the TA command request in the form of an RRC message or other upper-layer (L3, backhaul) signaling mechanism on a backhaul (e.g., F1-AP) interface between IAB node 905-a and IAB donor 905-b. For one or more forms, configuration of resources for the TA request may include designing a new resource format for signaling. For example, IAB donor 905-b may design a new PUCCH format for providing the TA command request. Alternatively, configuration of resources for the TA request may include modifying an existing resource format to include the TA command request. For example, IAB donor 905-b may modify the resource format of a PUCCH message indication to include one or more additional bits for the TA command request.

At 935, DU 920-c of IAB donor 905-c may receive the TA command request of MT 915 and configure a TA command response. In some examples, DU 920-c of IAB donor 905-c may determine an updated TA command and configured timer value (e.g., timer reset) for the communication link (e.g., target link) between MT 915 and DU 920-b of IAB node 905-b. Specifically, DU 920-c of IAB donor 905-c may act as a serving mechanism for configuring a TA command response directed to MT 915, for uplink communication re-establishment at IAB donor 905-b. In other cases, IAB donor 905-c may receive the TA command request by MT 915 and coordinate an indication to IAB donor 905-b (e.g., via a Uu or F1-AP interface). Based on the indication, DU 920-b may determine an updated TA command value and configured timer reset for MT 915.

At 940, MT 915 of IAB node 905-a may receive the TA command response, including a configured timer reset associated with the TA value of the communication link (i.e., and associated TAG). In some examples, the TA command response may be transmitted by DU 920-c of IAB donor 905-c via resources of a secondary link (e.g., Uu or F1-AP interface associated with a wireless backhaul link). In other cases, according to coordinated communication between IAB donor 905-b and IAB donor 905-c, DU 920-b of IAB donor 905-b may transmit the TA command response. For example, DU 920-b may transmit DCI to MT 915 of IAB node 905-a on PDCCH. The DCI may be formatted to include scheduling for subsequent PDSCH transmission (i.e., DCI format 1_1). In addition, DU 920-b may configure an indicator within the DCI format to indicate the presence of a TA command within a MAC CE of the PDSCH transmission. The indicator may include a single bit or multi-bit indicator value configured to provide notification to MT 915 of an updated TA command for processing during PDSCH reception of the MAC CE.

At 945, MT 915 may process the TA command value for scheduling uplink transmission and implement the configured timer of the TA command response provided in the received TA command response. MT 915 may then continue communication on resources of the communication link between IAB node 805-a and IAB donor 805-b, including configured uplink grants and downlink assignments to one or more descendant (e.g., child) devices of the relay chain.

Though process flow 900 is described with reference to one or more IAB nodes 905, process flow 900 may also be performed in other wireless communication network contexts. For example, IAB node 905-a may instead be a UE 115, or a MT or UE-F of another wireless network node or device, such that UE 115, or MT or UE-F of the another wireless network node or device, may identify a timer expiration associated with a first communication link at 925, transmit, on a second communication link, a TA request at 930, receive a response to the request at 940, and update its TA and reset the internal timer at 945.

Similarly, IAB nodes 905-b and 905-c may instead be base stations 105, or a DU or AN-F of other wireless network nodes or devices, such that base station 105, or a DU or AN-F of another wireless network node or device, may receive a request for a TA value (e.g., TA request) at 930, configure an updated TA value and associated timer to be used by another wireless device (e.g., a UE 115, or a MT or UE-F of another wireless network node or device) at 935, and transmit an indication of the TA value and timer (i.e., TA response) at 940.

Figure 10:
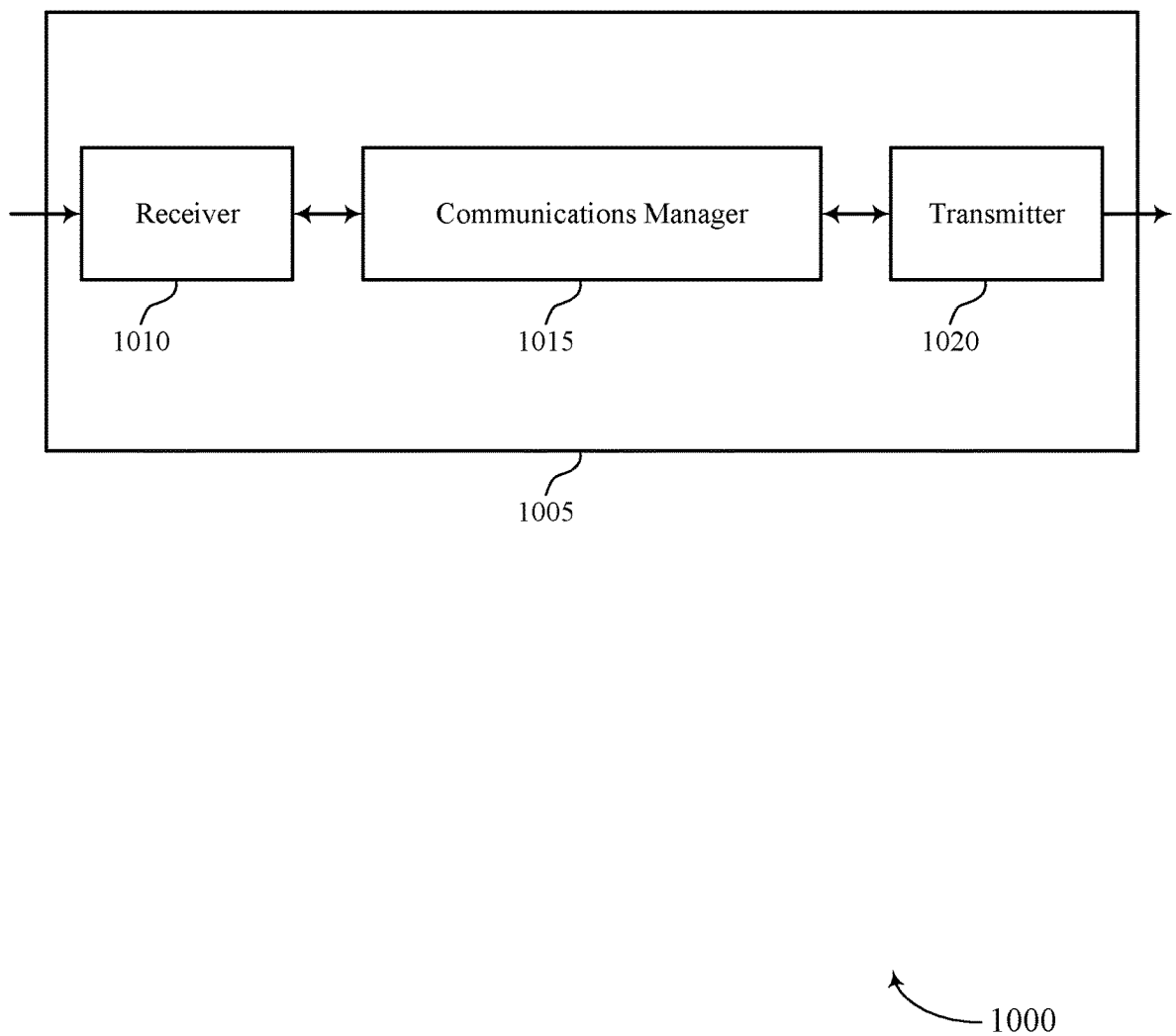
FIGS. 10 and 11 show block diagrams of devices that support timing alignment timer in a wireless communication network in accordance with aspects of the present disclosure.

FIG. 10 shows a block diagram 1000 of a device 1005 that supports a timing alignment timer in a wireless communication network in accordance with aspects of the present disclosure. The device 1005 may be an example of aspects of a base station 105 as described herein. The device 1005 may include a receiver 1010, a communications manager 1015, and a transmitter 1020. The device 1005 may also include one or more processors, memory coupled with the one or more processors, and instructions stored in the memory that are executable by the one or more processors. Each of these components may be in communication with one another (e.g., via one or more buses).

The receiver 1010 may receive information such as packets, user data, or control information associated with various information channels (e.g., control channels, data channels, and information related to timing alignment timer in a wireless communication network, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify that a timing alignment timer for a communication link between the first wireless node and a second wireless node of the wireless communications network has expired, transmit, to the second wireless node, an indication that a timing advance (TA) command for the communication link will be transmitted after expiration of the timing alignment timer, and transmit the indicated TA command to the second wireless node before receiving a RACH transmission from the second wireless device in response to expiration of the timing alignment timer. The communications manager 1015 may also transmit, to a second wireless node of the wireless communications network, an indication of resources and configurations for the second wireless node to use to transmit a request for a timing advance (TA) command for a communication link between the first wireless node and a second wireless node and receive the request for the TA command from the second wireless node using at least one of the indicated resources and configurations. The communications manager 1015 may also receive, from a second wireless node on resources of a first communication link of the wireless backhaul communications network, a request for a timing advance (TA) command, the resources indicated to the second wireless node over a second communication link of the wireless communications network and transmit, to the second wireless node, a response to the request for the TA command. The communications manager 1015 may also identify resources and configurations for a second wireless node of the wireless communications network to use to transmit, over a first communication link, a request for a timing advance (TA) command and transmit an indication of the identified resources and configurations to the second wireless node over a second communication link. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
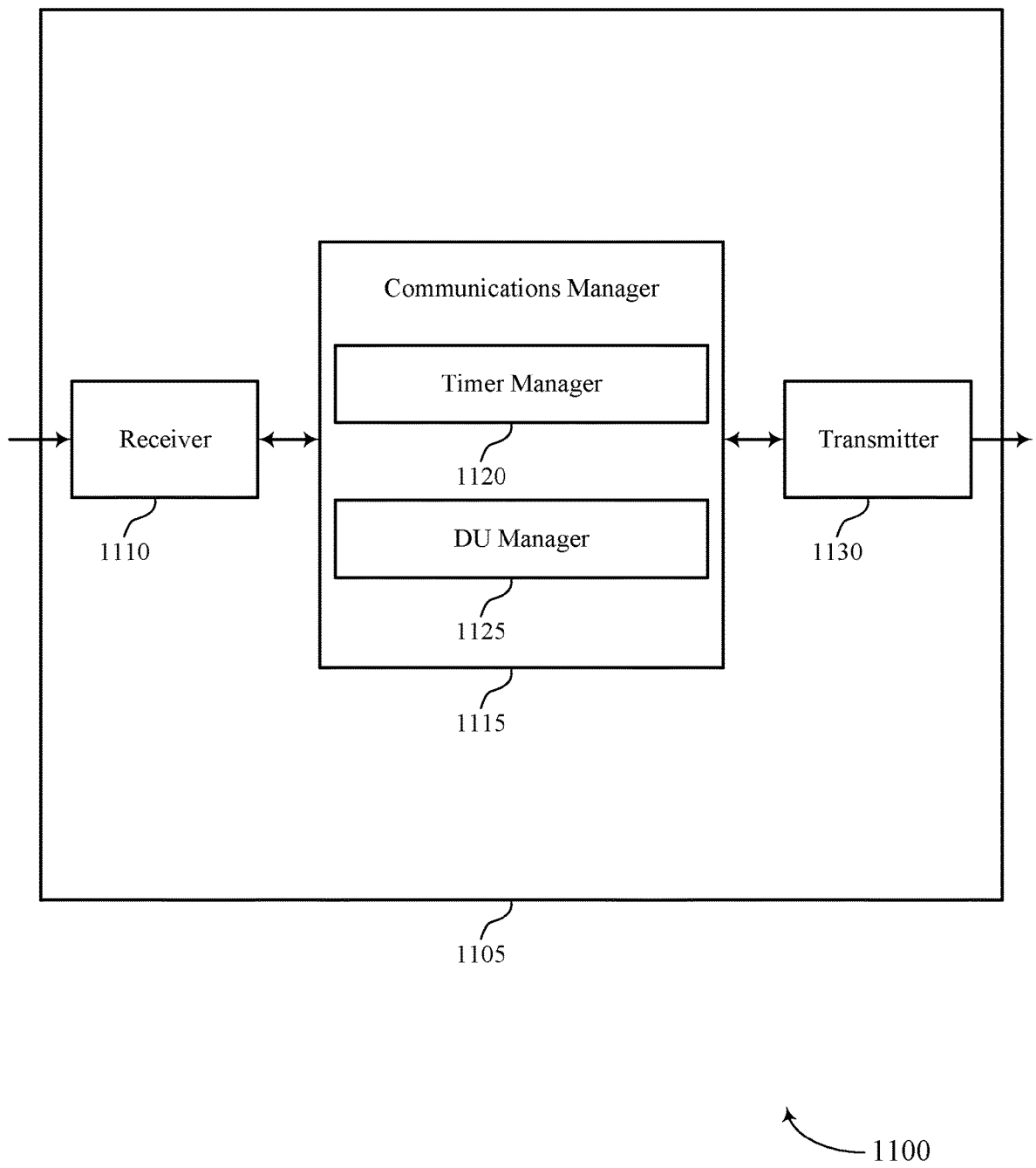

FIG. 11 shows a block diagram 1100 of a device 1105 that supports a timing alignment timer in a wireless communication network in accordance with aspects of the present disclosure. The device 1105 may be an example of aspects of a device 1005 or a base station 115 as described herein. The device 1105 may include a receiver 1110, a communications manager 1115, and a transmitter 1140. The device 1105 may also include one or more processors, memory coupled with the one or more processors, and instructions stored in the memory that are executable by the one or more processors. Each of these components may be in communication with one another (e.g., via one or more buses).

The receiver 1110 may receive information such as packets, user data, or control information associated with various information channels (e.g., control channels, data channels, and information related to timing alignment timer in a wireless communication network, etc.). Information may be passed on to other components of the device 1105. The receiver 1110 may be an example of aspects of the transceiver 1320 described with reference to FIG. 13. The receiver 1110 may utilize a single antenna or a set of antennas.

The receiver 1110 may receive the request for the TA command from the second wireless node using at least one of the indicated resources and configurations. The receiver 1110 may receive, from a second wireless node on resources of a first communication link of the wireless backhaul communications network, a request for a timing advance (TA) command, the resources indicated to the second wireless node over a second communication link of the wireless communications network.

The communications manager 1115 may be an example of aspects of the communications manager 1015 as described herein. The communications manager 1115 may include a timer manager 1120 and a DU manager 1125. The communications manager 1115 may be an example of aspects of the communications manager 1310 described herein.

The timer manager 1120 may identify that a timing alignment timer for a communication link between the first wireless node and a second wireless node of the wireless communications network has expired.

The DU manager 1125 may identify resources and configurations for a second wireless node of the wireless communications network to use to transmit, over a first communication link, a request for a timing advance (TA) command.

The transmitter 1130 may transmit, to the second wireless node, an indication that a timing advance (TA) command for the communication link will be transmitted after expiration of the timing alignment timer and transmit the indicated TA command to the second wireless node before receiving a RACH transmission from the second wireless device in response to expiration of the timing alignment timer. The transmitter 1130 may transmit, to a second wireless node of the wireless communications network, an indication of resources and configurations for the second wireless node to use to transmit a request for a timing advance (TA) command for a communication link between the first wireless node and a second wireless node. The transmitter 1130 may transmit an indication of the identified resources and configurations to the second wireless node over a second communication link. The transmitter 1130 may transmit signals generated by other components of the device 1105. The transmitter 1130 may transmit, to the second wireless node, a response to the request for the TA command.

In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
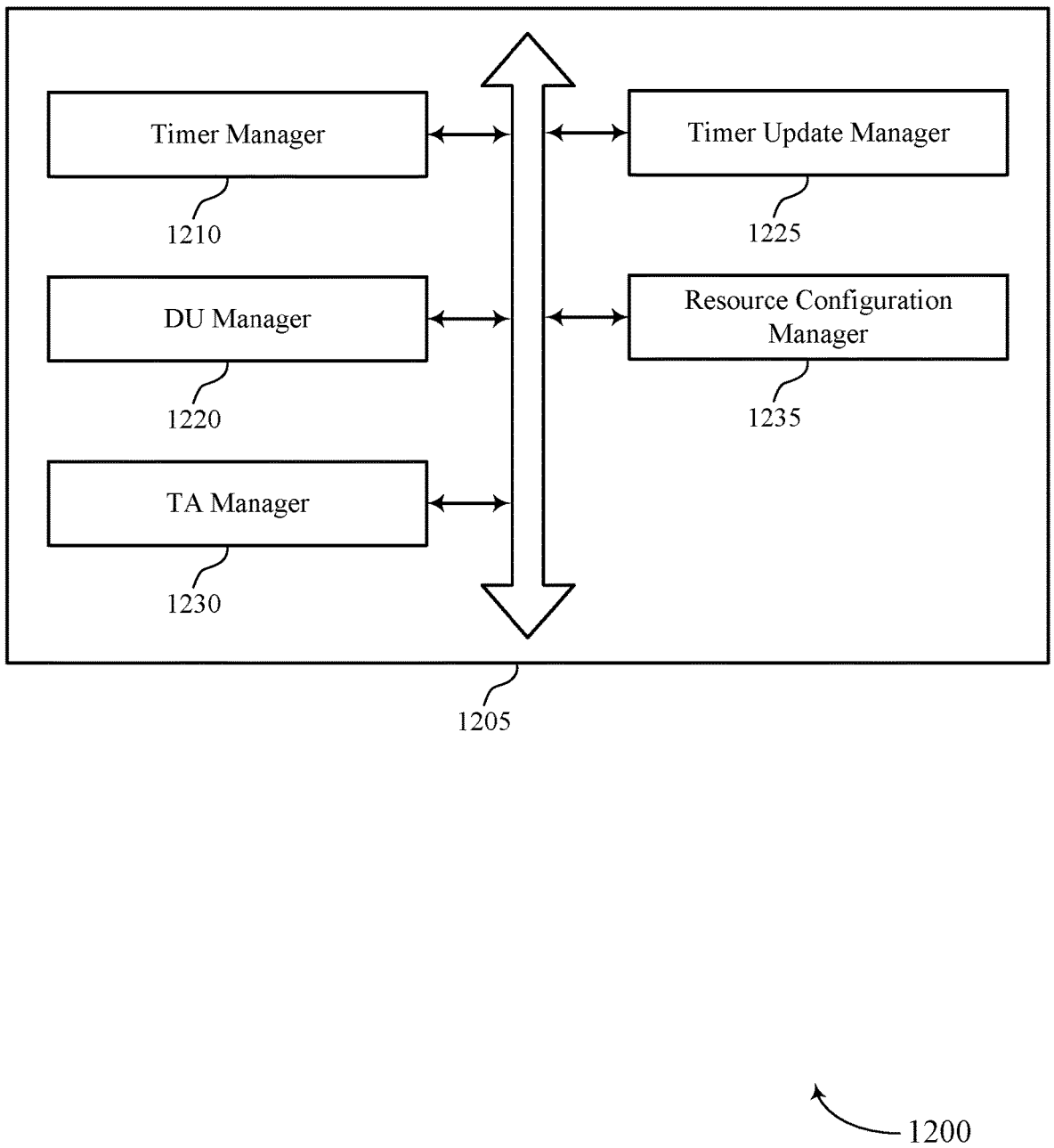
FIG. 12 shows a block diagram of a communications manager that supports a timing alignment timer in a wireless communication network in accordance with aspects of the present disclosure.

FIG. 12 shows a block diagram 1200 of a communications manager 1205 that supports a timing alignment timer in a wireless communication network in accordance with aspects of the present disclosure. The communications manager 1205 may be an example of aspects of a communications manager 1015, a communications manager 1115, or a communications manager 1310 described herein. The communications manager 1205 may include a timer manager 1210, a DU manager 1220, a timer update manager 1225, and a resource configuration manager 1235. The communications manager 1205 may include one or more processors, memory coupled with the one or more processors, and instructions stored in the memory that are executable by the one or more processors to implement some or all of the operations of the described modules included in the communications manager 1205. Each of these modules may communicate, directly or indirectly, with one another (e.g., via one or more buses).

The TA manager 1230 may receive the request for the TA command from the second wireless node using at least one of the indicated resources and configurations. In some examples, the TA manager 1230 may receive, from a second wireless node on resources of a first communication link of the wireless backhaul communications network, a request for a timing advance (TA) command, the resources indicated to the second wireless node over a second communication link of the wireless communications network. In some examples, receiving a random access communication from the second wireless node after expiration of the timing alignment timer, where the random access communication includes the received request for the TA command.

The timer manager 1210 may identify that a timing alignment timer for a communication link between the first wireless node and a second wireless node of the wireless communications network has expired. In some examples, the request for the TA command is received before expiration of a timing alignment timer for the communication link.

The DU manager 1220 may transmit, to the second wireless node, an indication that a timing advance (TA) command for the communication link will be transmitted after expiration of the timing alignment timer.

In some examples, the DU manager 1220 may transmit the indicated TA command to the second wireless node before receiving a RACH transmission from the second wireless device in response to expiration of the timing alignment timer. In some examples, the DU manager 1220 may transmit, to a second wireless node of the wireless communications network, an indication of resources and configurations for the second wireless node to use to transmit a request for a timing advance (TA) command for a communication link between the first wireless node and a second wireless node. In some examples, the DU manager 1220 may transmit, to the second wireless node, a response to the request for the TA command. In some examples, the DU manager 1220 may transmit an indication of the identified resources and configurations to the second wireless node over a second communication link. In some examples, the DU manager 1220 may transmit at least one TA command in response to the received request for the TA command.

In some examples, the DU manager 1220 may transmit, by the first wireless node to the second wireless node, the indication of the resources over the first communication link using the first RAT, where the request for the TA command is received using the second RAT. In some examples, the DU manager 1220 may transmit the TA command in response to the request for the TA command over the first communication link or the second communication link. In some examples, the DU manager 1220 may transmit, over the first communication link or the second communication link, an indication that the first wireless node is to continue to communicate with the second wireless node using the second communication link. In some examples, the indication is transmitted in downlink control information. In some examples, the downlink control information schedules a downlink data channel that carries the TA command. In some examples, the TA command is transmitted in a MAC control element (CE).

In some examples, the communication link is a wireless backhaul link between a distributed unit (DU) of the first wireless node and a mobile termination (MT) of the second wireless node. In some examples, the indicated resources and configurations include periodic contention free random access (CFRA) resources and configurations, or PUCCH resources and configurations, or a combination thereof. In some examples, the identified resources and configurations are for the second wireless node to transmit the request for the TA command over the first communication link to a third wireless node of the wireless communications network. In some examples, the identified resources and configurations are for the second wireless node to transmit the request for the TA command over the first communication link to the first wireless node. In some examples, the first communication link uses a first RAT, and the second communication link uses a second RAT different from the first RAT.

The resource configuration manager 1235 may identify resources and configurations for a second wireless node of the wireless communications network to use to transmit, over a first communication link, a request for a timing advance (TA) command. In some examples, the indicated resources and configurations include periodic contention free random access (CFRA) resources, or a MAC control element (CE), or PUCCH resources, or RRC signaling, or a combination thereof.

The timer update manager 1225 may reset the timing alignment timer in response to transmitting the TA command.

Figure 13:
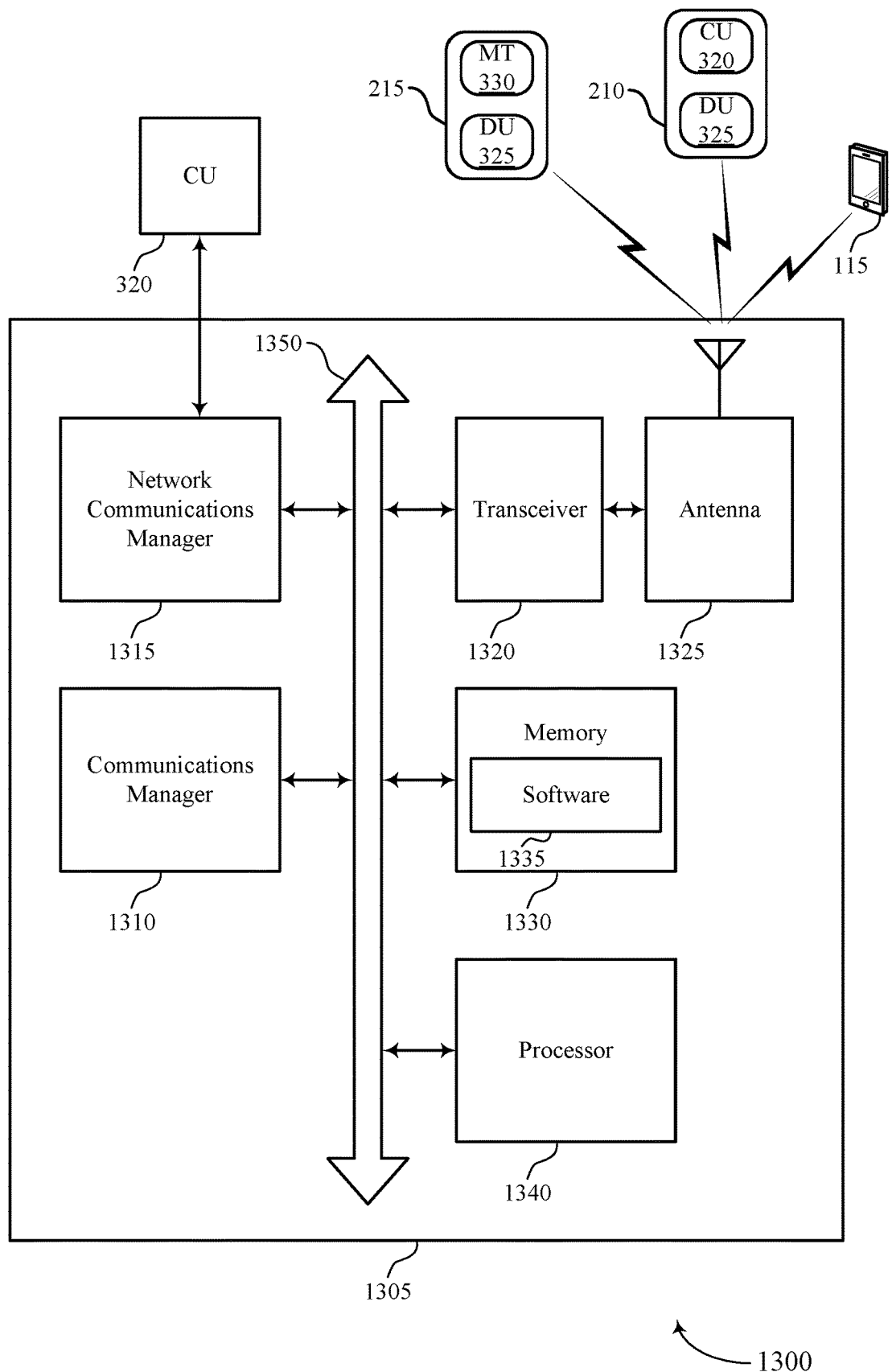
FIG. 13 shows a diagram of a system including a device that supports a timing alignment timer in a wireless communication network in accordance with aspects of the present disclosure.

FIG. 13 shows a diagram of a system 1300 including a device 1305 that supports a timing alignment timer in a wireless communication network in accordance with aspects of the present disclosure. The device 1305 may be an example of or include the components of device 1005, device 1105, or a DU or AN-F as described herein. In some examples, the device 1305 may correspond to a base station 105. For example, In some examples, the device 1305 may represent a DU of a donor base station 105 (e.g., IAB donor). In other cases, the device 1305 may represent a DU of an intermediary base station 105 (e.g., IAB node). The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The network communications manager 1315 may manage communications with other CUs 320 (e.g., via one or more wired backhaul links), as described with reference to FIGS. 1 through 9. For example, the network communications manager 1315 may include a controller or scheduler for controlling communications with CUs over an F1-AP interface. For example, the network communications manager 1315 may provide an F1-AP interface for signaling of TA commands for uplink transmission scheduling as described herein. Alternatively, network communications manager 1315 may receive control and scheduling indication according to a CU 320 of an IAB donor 210. IAB donor 210 may be representative of an antecedent (e.g., parent) node within the relay chain of the network and support control and scheduling operations for network communications manager 1315. IAB donor 210 may provide an F1-AP interface for signaling of control and/or scheduling operations as described herein.

The communications manager 1310 may provide signaling for command and/or scheduling instructions to descendant (e.g., child) devices within the relay chain, including one or more UEs 115 and/or MTs 330 of IAB nodes 215, as described with reference to FIGS. 1 through 9. For example, communications manager 1310 may include a controller or scheduler for controlling communications with MTs 330 and/or UEs 115. For example, communications manager 1310 may provide a Uu interface for signaling of TA commands for uplink transmission scheduling as described herein.

The communications manager 1310 may identify that a timing alignment timer for a communication link between the first wireless node and a second wireless node of the wireless communications network has expired, transmit, to the second wireless node, an indication that a timing advance (TA) command for the communication link will be transmitted after expiration of the timing alignment timer, and transmit the indicated TA command to the second wireless node before receiving a RACH transmission from the second wireless device in response to expiration of the timing alignment timer. The communications manager 1310 may also transmit, to a second wireless node of the wireless communications network, an indication of resources and configurations for the second wireless node to use to transmit a request for a timing advance (TA) command for a communication link between the first wireless node and a second wireless node and receive the request for the TA command from the second wireless node using at least one of the indicated resources and configurations. The communications manager 1310 may also receive, from a second wireless node on resources of a first communication link of the wireless backhaul communications network, a request for a timing advance (TA) command, the resources indicated to the second wireless node over a second communication link of the wireless communications network and transmit, to the second wireless node, a response to the request for the TA command. The communications manager 1310 may also identify resources and configurations for a second wireless node of the wireless communications network to use to transmit, over a first communication link, a request for a timing advance (TA) command and transmit an indication of the identified resources and configurations to the second wireless node over a second communication link.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (e.g., the memory 1330) to cause the device to perform various functions (e.g., functions or tasks supporting timing alignment timer in a wireless communication network).

The software 1335 may include code or instructions to implement aspects of the present disclosure, including instructions to support wireless communications. The software 1335 may be stored in a non-transitory computer-readable medium such as system memory or other type of memory. In some examples, the software 1335 may not be directly executable by the processor 1340 but may cause a computer (e.g., when compiled and executed) to perform functions described herein.

Figure 14:
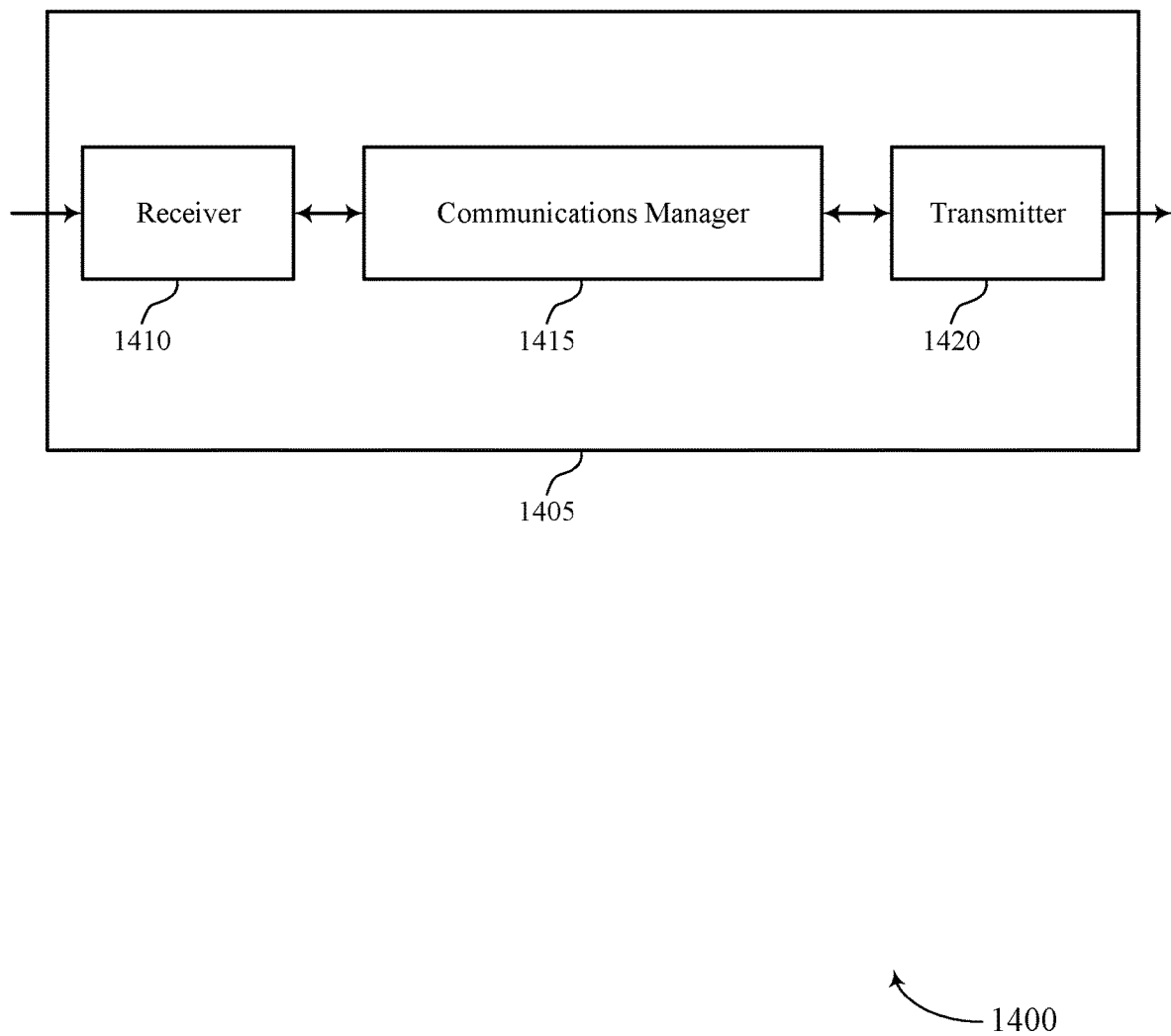
FIGS. 14 and 15 show block diagrams of devices that support timing alignment timer in a wireless communication network in accordance with aspects of the present disclosure.

FIG. 14 shows a block diagram 1400 of a device 1405 that supports a timing alignment timer in a wireless communication network in accordance with aspects of the present disclosure. The device 1405 may be an example of aspects of a device as described herein. The device 1405 may include a receiver 1410, a communications manager 1415, and a transmitter 1420. The device 1405 may also include one or more processors, memory coupled with the one or more processors, and instructions stored in the memory that are executable by the one or more processors. Each of these components may be in communication with one another (e.g., via one or more buses).

The receiver 1410 may receive information such as packets, user data, or control information associated with various information channels (e.g., control channels, data channels, and information related to timing alignment timer in a wireless communication network, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receive the indicated TA command from the second wireless node, and determine a timing advance for the communication link based on the received TA command. The communications manager 1415 may also receive, from a second wireless node of the wireless communications network, an indication of resources and configurations for the first wireless node to use to transmit a request for a timing advance (TA) command for a communication link between the first wireless node and a second wireless node and transmit the request for the TA command to the second wireless node using at least one of the indicated resources and configurations. The communications manager 1415 may also receive, over a first communication link of the wireless communications network, an indication of resources and configurations for the first wireless node to use to transmit, a request for a timing advance (TA) command for communication over a second communication link of the wireless communications network with a second wireless node and transmit, over the first communication link or the second communication link of the wireless communications network, the request for the TA command using at least one of the indicated resources and configurations. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
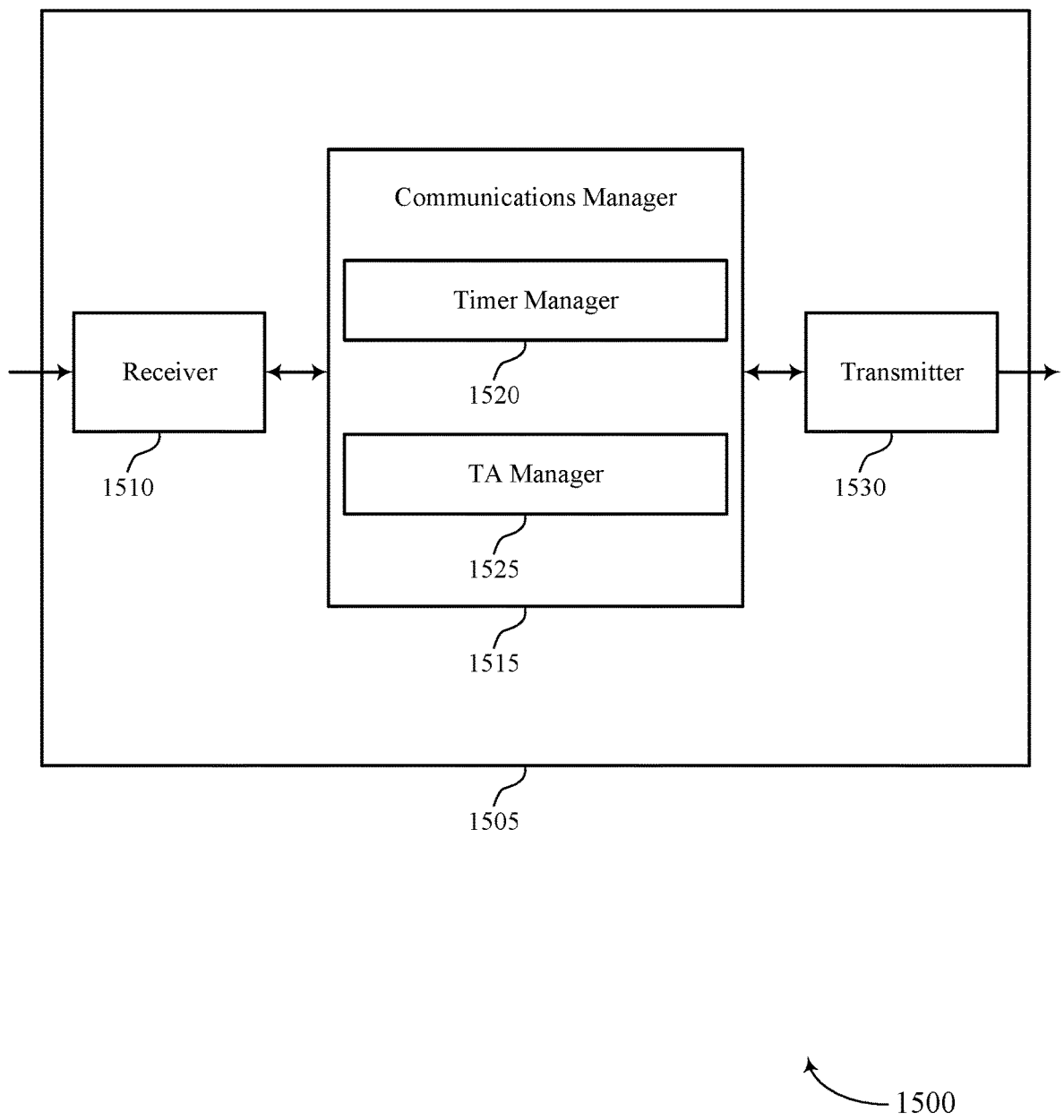

FIG. 15 shows a block diagram 1500 of a device 1505 that supports a timing alignment timer in a wireless communication network in accordance with aspects of the present disclosure. The device 1505 may be an example of aspects of a device 1405 or a device 115 as described herein. The device 1505 may include a receiver 1510, a communications manager 1515, and a transmitter 1535. The device 1505 may also include one or more processors, memory coupled with the one or more processors, and instructions stored in the memory that are executable by the one or more processors. Each of these components may be in communication with one another (e.g., via one or more buses).

The receiver 1510 may receive information such as packets, user data, or control information associated with various information channels (e.g., control channels, data channels, and information related to timing alignment timer in a wireless communication network, etc.). Information may be passed on to other components of the device 1505. The receiver 1510 may be an example of aspects of the transceiver 1720 described with reference to FIG. 17. The receiver 1510 may utilize a single antenna or a set of antennas.

The receiver 1510 may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node and receive the indicated TA command from the second wireless node. The receiver 1510 may receive, over a first communication link of the wireless communications network, an indication of resources and configurations for the first wireless node to use to transmit, a request for a timing advance (TA) command for communication over a second communication link of the wireless communications network with a second wireless node. The receiver 1510 may receive, from a second wireless node of the wireless communications network, an indication of resources and configurations for the first wireless node to use to transmit a request for a timing advance (TA) command for a communication link between the first wireless node and a second wireless node.

The communications manager 1515 may be an example of aspects of the communications manager 1415 as described herein. The communications manager 1515 may include a timer manager 1520 and a TA manager 1525. The communications manager 1515 may be an example of aspects of the communications manager 1710 described herein.

The timer manager 1520 may identify that a timing alignment timer for a communication link between the first wireless node and a second wireless node of the wireless communications network has expired.

The TA Manager 1525 may determine a timing advance for the communication link based on the received TA command.

The transmitter 1530 may transmit signals generated by other components of the device 1505. In some examples, the transmitter 1530 may be collocated with a receiver 1510 in a transceiver module. For example, the transmitter 1530 may be an example of aspects of the transceiver 1720 described with reference to FIG. 17. The transmitter 1530 may utilize a single antenna or a set of antennas.

The transmitter 1530 may transmit the request for the TA command to the second wireless node using at least one of the indicated resources and configurations. The transmitter 1530 may transmit, over the first communication link or the second communication link of the wireless communications network, the request for the TA command using at least one of the indicated resources and configurations.

Figure 16:
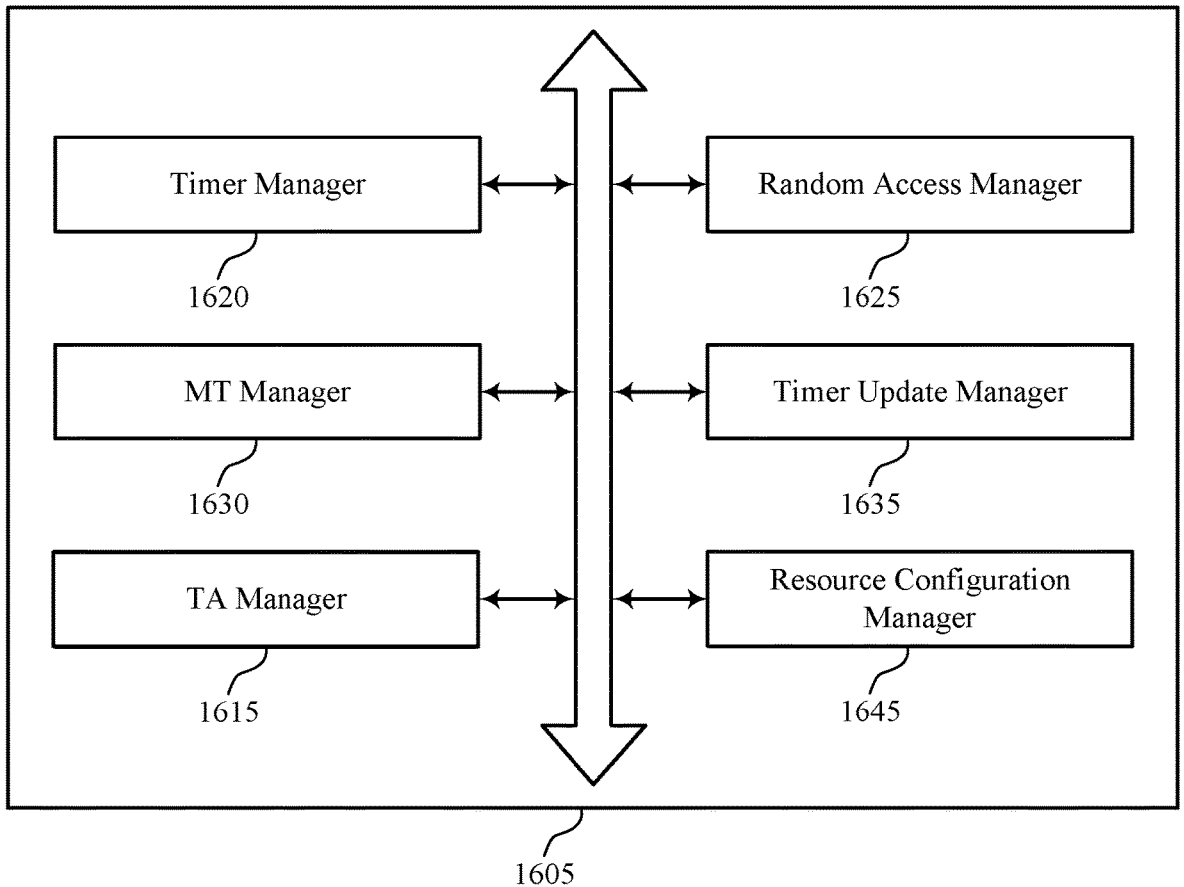
FIG. 16 shows a block diagram of a communications manager that supports a timing alignment timer in a wireless communication network in accordance with aspects of the present disclosure.

FIG. 16 shows a block diagram 1600 of a communications manager 1605 that supports a timing alignment timer in a wireless communication network in accordance with aspects of the present disclosure. The communications manager 1605 may be an example of aspects of a communications manager 1415, a communications manager 1515, or a communications manager 1710 described herein. The communications manager 1605 may include a TA manager 1615, a timer manager 1620, a random access manager 1625, a MT manager 1630, a timer update manager 1635, and a resource configuration manager 1645. The communications manager 1605 may include one or more processors, memory coupled with the one or more processors, and instructions stored in the memory that are executable by the one or more processors to implement some or all of the operations of the described modules included in the communications manager 1605. Each of these modules may communicate, directly or indirectly, with one another (e.g., via one or more buses).

The MT manager 1630 may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node.

In some examples, the MT manager 1630 may receive, from a second wireless node of the wireless communications network, an indication of resources and configurations for the first wireless node to use to transmit a request for a timing advance (TA) command for a communication link between the first wireless node and a second wireless node. In some examples, the MT manager 1630 may receive, over a first communication link of the wireless communications network, an indication of resources and configurations for the first wireless node to use to transmit, a request for a timing advance (TA) command for communication over a second communication link of the wireless communications network with a second wireless node.

In some examples, the MT manager 1630 may receive the over the first communication link or the second communication link, a response to the request for the TA command, where the response includes the TA command in response to the request for the TA command, or an indication that the first wireless node is to continue to communicate with the second wireless node using the second communication link.

In some examples, the MT manager 1630 may receive the indication of resources and configurations is in response to a request transmitted over the first communication link by the first wireless node.

In some examples, the indication is included in downlink control information. In some examples, the downlink control information schedules a downlink data channel that carries the TA command. In some examples, the TA command is received in a MAC control element (CE). In some examples, the indication of the resources and configurations is received over the first communication link from a third wireless node of the wireless communications network.

The MT manager 1630 may identify that a second timer has expired, the second timer set to expire before the timing alignment timer, where the request for the TA command is transmitted based on the expiration of the second timer. The MT manager 1630 may transmit the request for the TA command to the second wireless node using at least one of the indicated resources and configurations.

In some examples, the communication link is a wireless backhaul link between a mobile termination (MT) of the first wireless node and a distributed unit (DU) of the second wireless node. In some examples, the request for the TA command is transmitted before expiration of a timing alignment timer for the communication link. In some examples, the first communication link uses a first RAT, and the second communication link uses a second RAT different from the first RAT.

The TA Manager 1615 may determine a timing advance for the communication link based on the received TA command. In some examples, the TA Manager 1615 may determine a timing advance for the communication link based on the at least one received TA command.

The timer manager 1620 may identify that the timing alignment timer for the first wireless node has expired. In some examples, the timer manager 1620 may identify that a timing alignment timer for the communication link has expired.

The random access manager 1625 may set a second timer indicating a time for which the first wireless node is to refrain from transmitting the RACH transmission.

The resource configuration manager 1645 may identify indicated resources and configurations. In some examples, the indicated resources and configurations include periodic contention free random access (CFRA) resources, or a MAC control element (CE), or PUCCH resources, or RRC signaling, or a combination thereof.

The timer update manager 1635 may reset the timing alignment timer in response to receiving the TA command.

Figure 17:
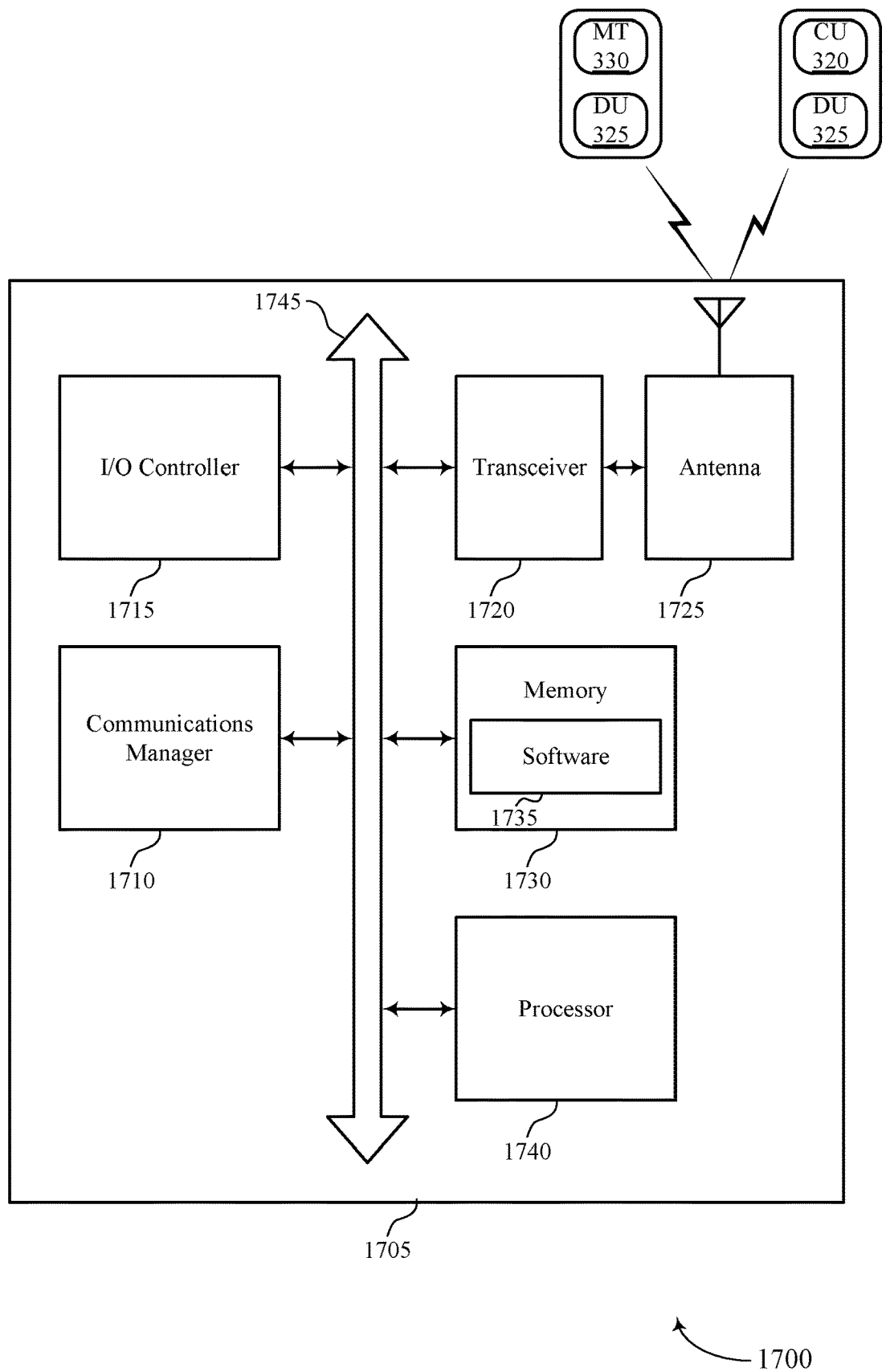
FIG. 17 shows a diagram of a system including a device that supports a timing alignment timer in a wireless communication network in accordance with aspects of the present disclosure.

FIG. 17 shows a diagram of a system 1700 including a device 1705 that supports a timing alignment timer in a wireless communication network in accordance with aspects of the present disclosure. The device 1705 may be an example of or include the components of device 1405, device 1505, or a MT or UE-F as described herein. In some examples, the device 1705 may correspond to a UE 115. In other cases, the device 1705 may correspond to MT functionality supported by a base station 105 operating as an IAB node. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may manage communications scheduled and/or controlled by one or more DUs 325 of IAB donors 210 and/or IAB nodes 215. For example, communications manager 1710 may receive signaling for control and/or scheduling via a DU 325 of an IAB node 215 according to an Uu interface. Additionally or alternatively, communications manager 1710 may manage communications scheduled and/or controlled by a CU 320 of an IAB donor 210. For example, communications manager 1710 may receive signaling for control and/or scheduling via a CU 320 of an IAB donor 210 according to an F1-AP interface.

The communications manager 1710 may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node, receive the indicated TA command from the second wireless node, and determine a timing advance for the communication link based on the received TA command. The communications manager 1710 may also receive, from a second wireless node of the wireless communications network, an indication of resources and configurations for the first wireless node to use to transmit a request for a timing advance (TA) command for a communication link between the first wireless node and a second wireless node and transmit the request for the TA command to the second wireless node using at least one of the indicated resources and configurations. The communications manager 1710 may also receive, over a first communication link of the wireless communications network, an indication of resources and configurations for the first wireless node to use to transmit, a request for a timing advance (TA) command for communication over a second communication link of the wireless communications network with a second wireless node and transmit, over the first communication link or the second communication link of the wireless communications network, the request for the TA command using at least one of the indicated resources and configurations.

The I/O controller 1715 may manage input and output signals for the device 1705. The I/O controller 1715 may also manage peripherals not integrated into the device 1705. In some examples, the I/O controller 1715 may represent a physical connection or port to an external peripheral. In some examples, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some examples, the I/O controller 1715 may be implemented as part of a processor. In some examples, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some examples, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some examples, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting timing alignment timer in a wireless communication network).

The software 1735 may include code and instructions to implement aspects of the present disclosure, including instructions to support wireless communications. The software 1735 may be stored in a non-transitory computer-readable medium such as system memory or other type of memory. In some examples, the software 1735 may not be directly executable by the processor 1740 but may cause a computer (e.g., when compiled and executed) to perform functions described herein.

Figure 18:
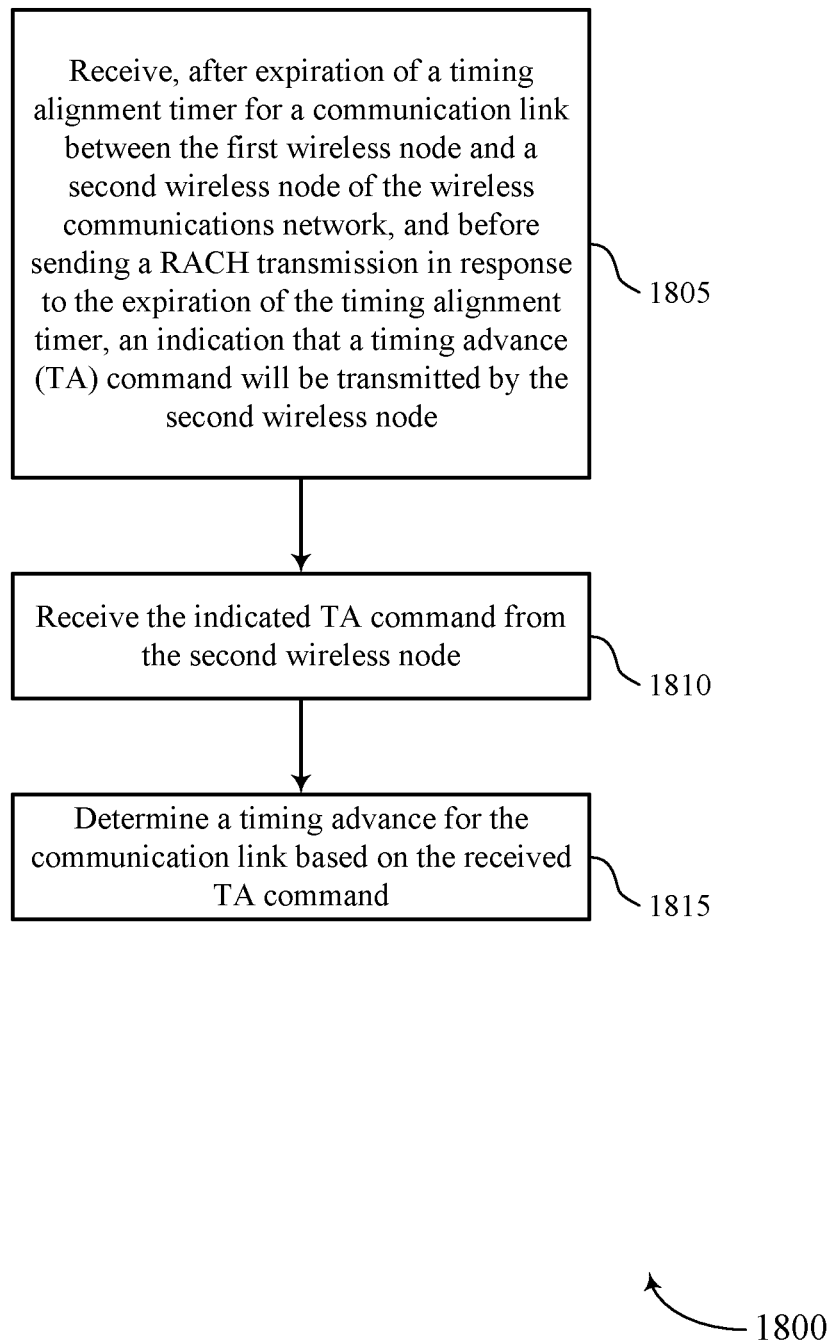
FIGS. 18 through 29 show flowcharts illustrating methods that support timing alignment timer in a wireless communication network in accordance with aspects of the present disclosure.

FIG. 18 shows a flowchart illustrating a method 1800 that supports a timing alignment timer in a wireless communication network in accordance with aspects of the present disclosure. The operations of method 1800 may be implemented by a device or its components as described herein. For example, the operations of method 1800 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 1805, the device may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node. The operations of 1805 may be performed according to the methods described herein. In some examples, aspects of the operations of 1805 may be performed by a receiver as described with reference to FIGS. 14 through 17.

At 1810, the device may receive the indicated TA command from the second wireless node. The operations of 1810 may be performed according to the methods described herein. In some examples, aspects of the operations of 1810 may be performed by a receiver as described with reference to FIGS. 14 through 17.

At 1815, the device may determine a timing advance for the communication link based on the received TA command. The operations of 1815 may be performed according to the methods described herein. In some examples, aspects of the operations of 1815 may be performed by a TA Manager as described with reference to FIGS. 14 through 17.

Figure 19:
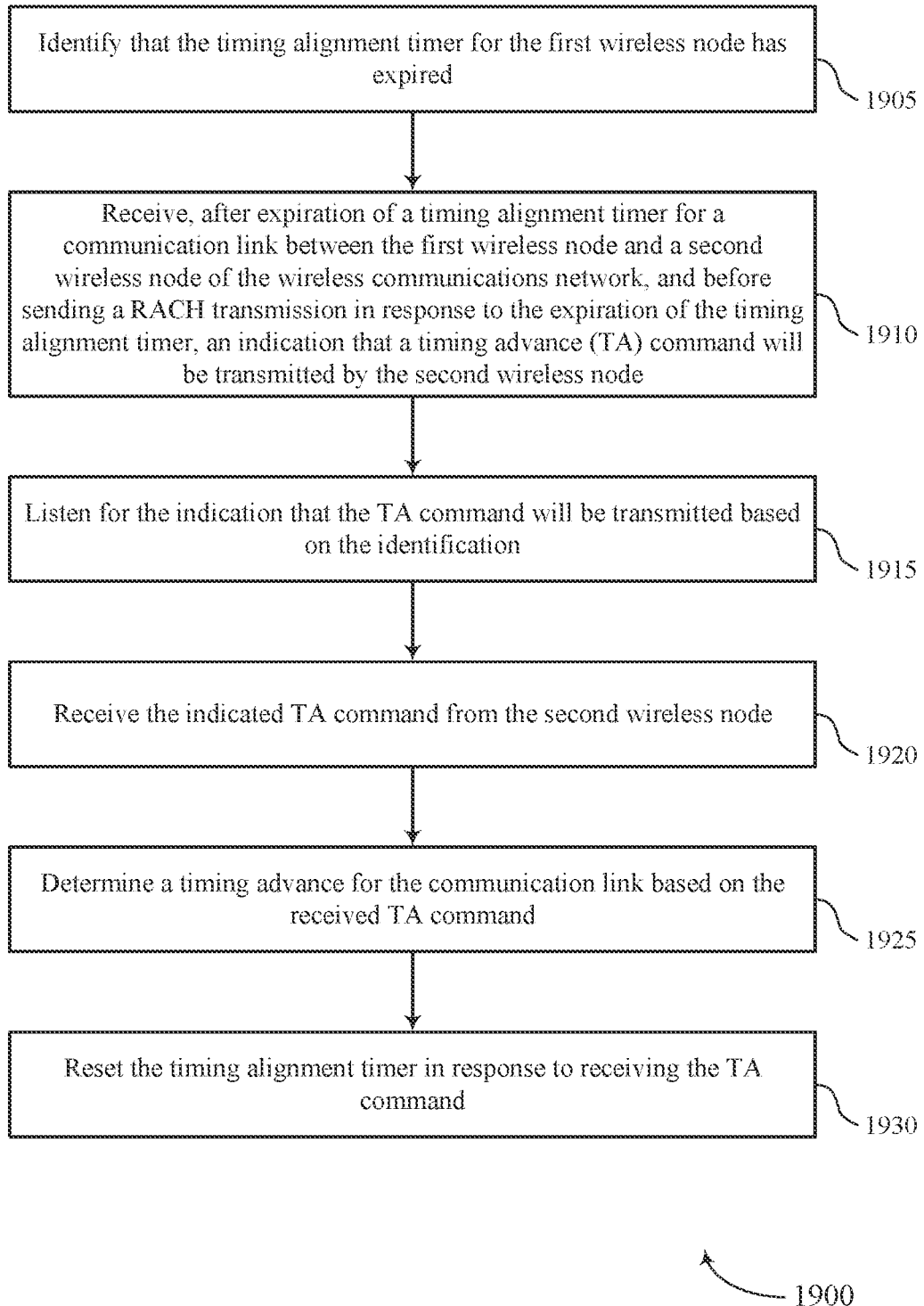

FIG. 19 shows a flowchart illustrating a method 1900 that supports a timing alignment timer in a wireless communication network in accordance with aspects of the present disclosure. The operations of method 1900 may be implemented by a device or its components as described herein. For example, the operations of method 1900 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 1905, the device may identify that the timing alignment timer for the first wireless node has expired. The operations of 1905 may be performed according to the methods described herein. In some examples, aspects of the operations of 1905 may be performed by a timer manager as described with reference to FIGS. 14 through 17.

At 1910, the device may receive, after expiration of a timing alignment timer for a communication link between the first wireless node and a second wireless node of the wireless communications network, and before sending a RACH transmission in response to the expiration of the timing alignment timer, an indication that a timing advance (TA) command will be transmitted by the second wireless node. The operations of 1910 may be performed according to the methods described herein. In some examples, aspects of the operations of 1910 may be performed by a receiver as described with reference to FIGS. 14 through 17.

At 1915, the device may listen for the indication that the TA command will be transmitted based on the identification. The operations of 1915 may be performed according to the methods described herein. In some examples, aspects of the operations of 1915 may be performed by a receiver as described with reference to FIGS. 14 through 17.

At 1920, the device may receive the indicated TA command from the second wireless node. The operations of 1920 may be performed according to the methods described herein. In some examples, aspects of the operations of 1920 may be performed by a receiver as described with reference to FIGS. 14 through 17.

At 1925, the device may determine a timing advance for the communication link based on the received TA command. The operations of 1925 may be performed according to the methods described herein. In some examples, aspects of the operations of 1925 may be performed by a TA Manager as described with reference to FIGS. 14 through 17.

At 1930, the device may reset the timing alignment timer in response to receiving the TA command. The operations of 1930 may be performed according to the methods described herein. In some examples, aspects of the operations of 1930 may be performed by a timer update manager as described with reference to FIGS. 14 through 17.

Figure 20:
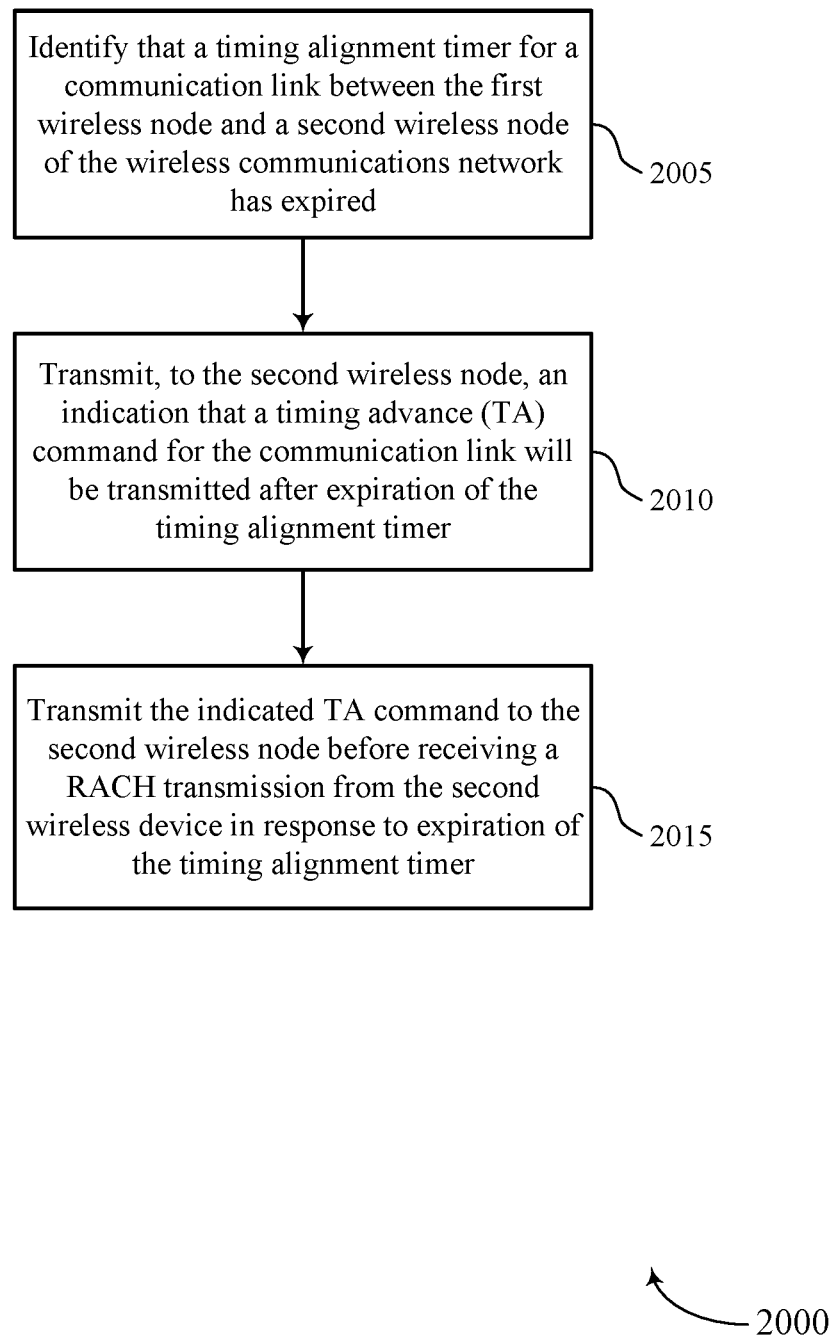

FIG. 20 shows a flowchart illustrating a method 2000 that supports a timing alignment timer in a wireless communication network in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may identify that a timing alignment timer for a communication link between the first wireless node and a second wireless node of the wireless communications network has expired. The operations of 2005 may be performed according to the methods described herein. In some examples, aspects of the operations of 2005 may be performed by a timer manager as described with reference to FIGS. 10 through 13.

At 2010, the base station may transmit, to the second wireless node, an indication that a timing advance (TA) command for the communication link will be transmitted after expiration of the timing alignment timer. The operations of 2010 may be performed according to the methods described herein. In some examples, aspects of the operations of 2010 may be performed by a transmitter as described with reference to FIGS. 10 through 13.

At 2015, the base station may transmit the indicated TA command to the second wireless node before receiving a RACH transmission from the second wireless device in response to expiration of the timing alignment timer. The operations of 2015 may be performed according to the methods described herein. In some examples, aspects of the operations of 2015 may be performed by a transmitter as described with reference to FIGS. 10 through 13.

Figure 21:
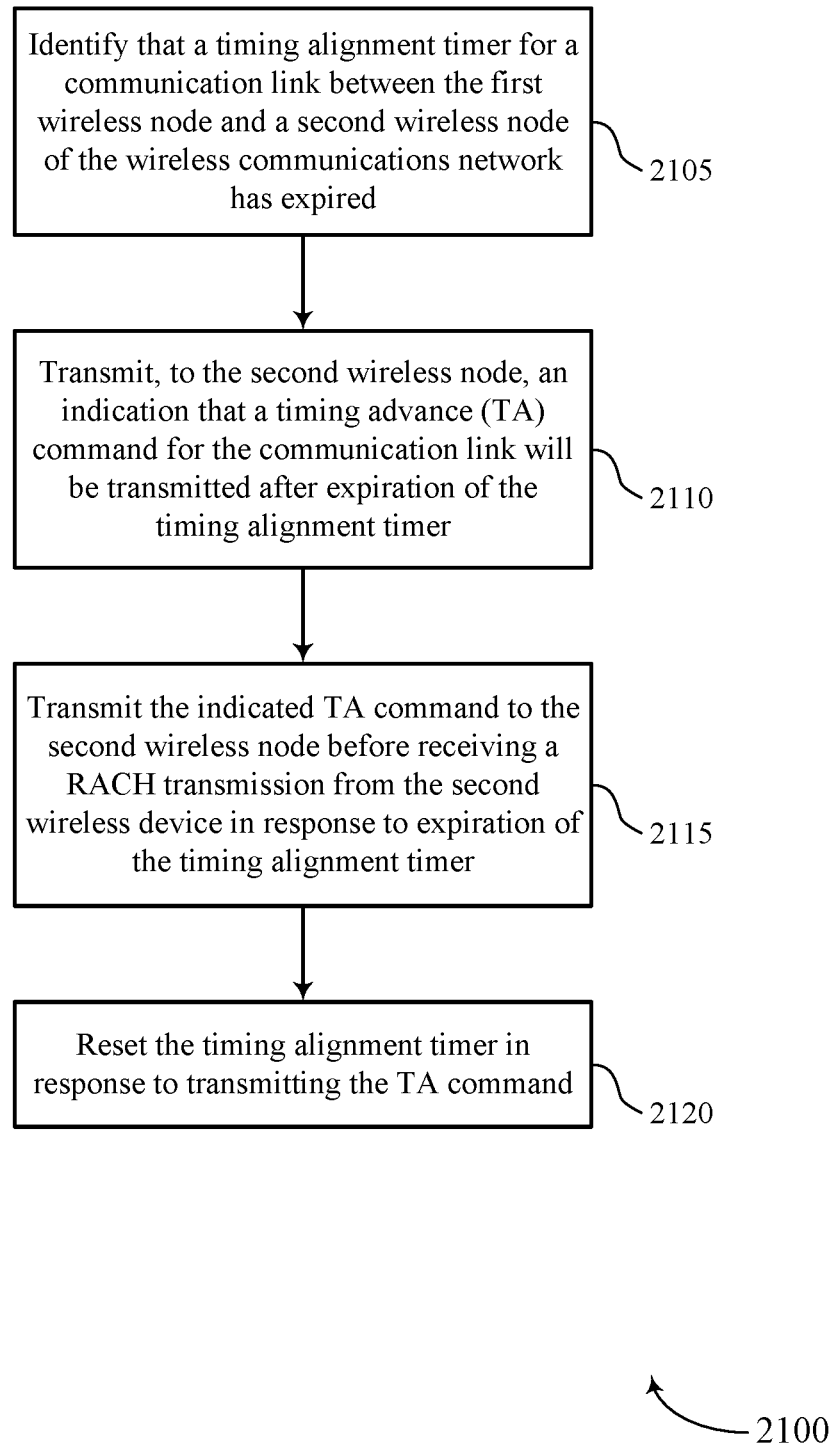

FIG. 21 shows a flowchart illustrating a method 2100 that supports a timing alignment timer in a wireless communication network in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may identify that a timing alignment timer for a communication link between the first wireless node and a second wireless node of the wireless communications network has expired. The operations of 2105 may be performed according to the methods described herein. In some examples, aspects of the operations of 2105 may be performed by a timer manager as described with reference to FIGS. 10 through 13.

At 2110, the base station may transmit, to the second wireless node, an indication that a timing advance (TA) command for the communication link will be transmitted after expiration of the timing alignment timer. The operations of 2110 may be performed according to the methods described herein. In some examples, aspects of the operations of 2110 may be performed by a transmitter as described with reference to FIGS. 10 through 13.

At 2115, the base station may transmit the indicated TA command to the second wireless node before receiving a RACH transmission from the second wireless device in response to expiration of the timing alignment timer. The operations of 2115 may be performed according to the methods described herein. In some examples, aspects of the operations of 2115 may be performed by a transmitter as described with reference to FIGS. 10 through 13.

At 2120, the base station may reset the timing alignment timer in response to transmitting the TA command. The operations of 2120 may be performed according to the methods described herein. In some examples, aspects of the operations of 2120 may be performed by a timer update manager as described with reference to FIGS. 10 through 13.

Figure 22:
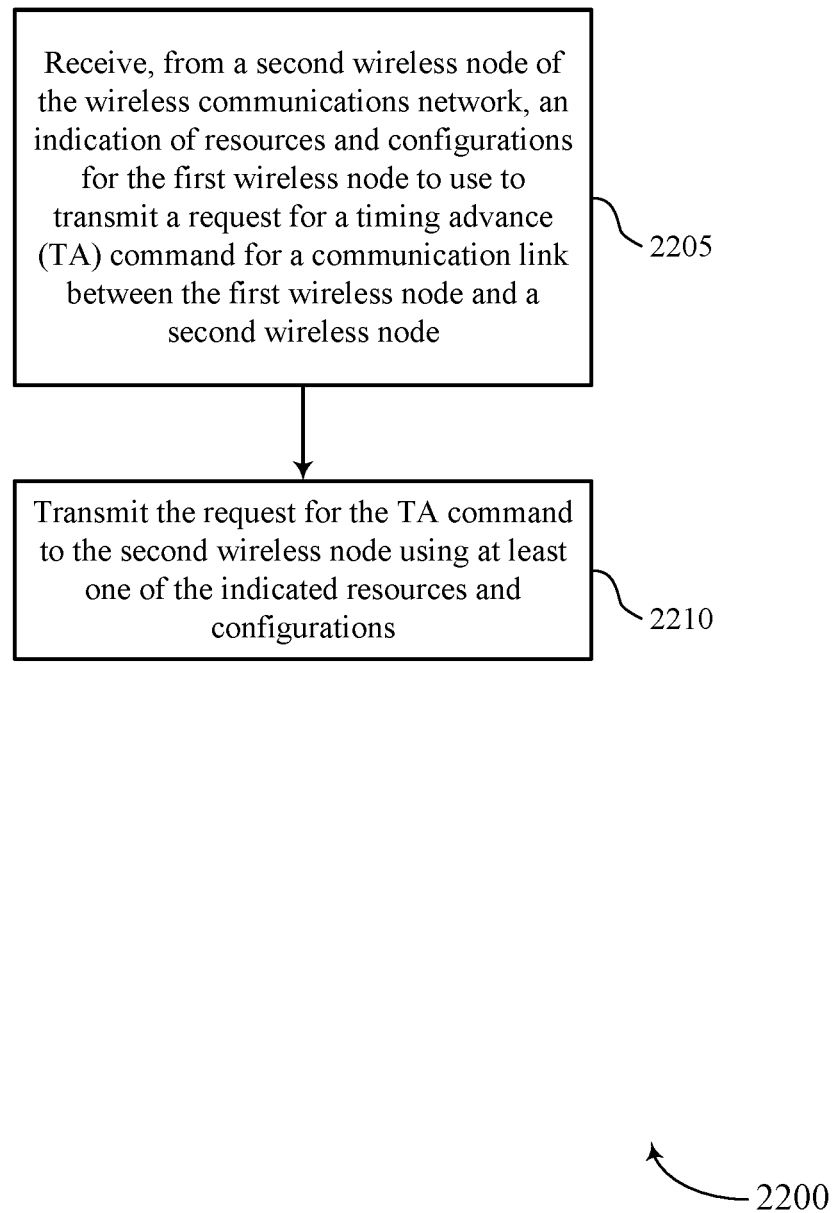

FIG. 22 shows a flowchart illustrating a method 2200 that supports a timing alignment timer in a wireless communication network in accordance with aspects of the present disclosure. The operations of method 2200 may be implemented by a device or its components as described herein. For example, the operations of method 2200 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 2205, the device may receive, from a second wireless node of the wireless communications network, an indication of resources and configurations for the first wireless node to use to transmit a request for a timing advance (TA) command for a communication link between the first wireless node and a second wireless node. The operations of 2205 may be performed according to the methods described herein. In some examples, aspects of the operations of 2205 may be performed by a receiver as described with reference to FIGS. 14 through 17.

At 2210, the device may transmit the request for the TA command to the second wireless node using at least one of the indicated resources and configurations. The operations of 2210 may be performed according to the methods described herein. In some examples, aspects of the operations of 2210 may be performed by a transmitter as described with reference to FIGS. 14 through 17.

Figure 23:
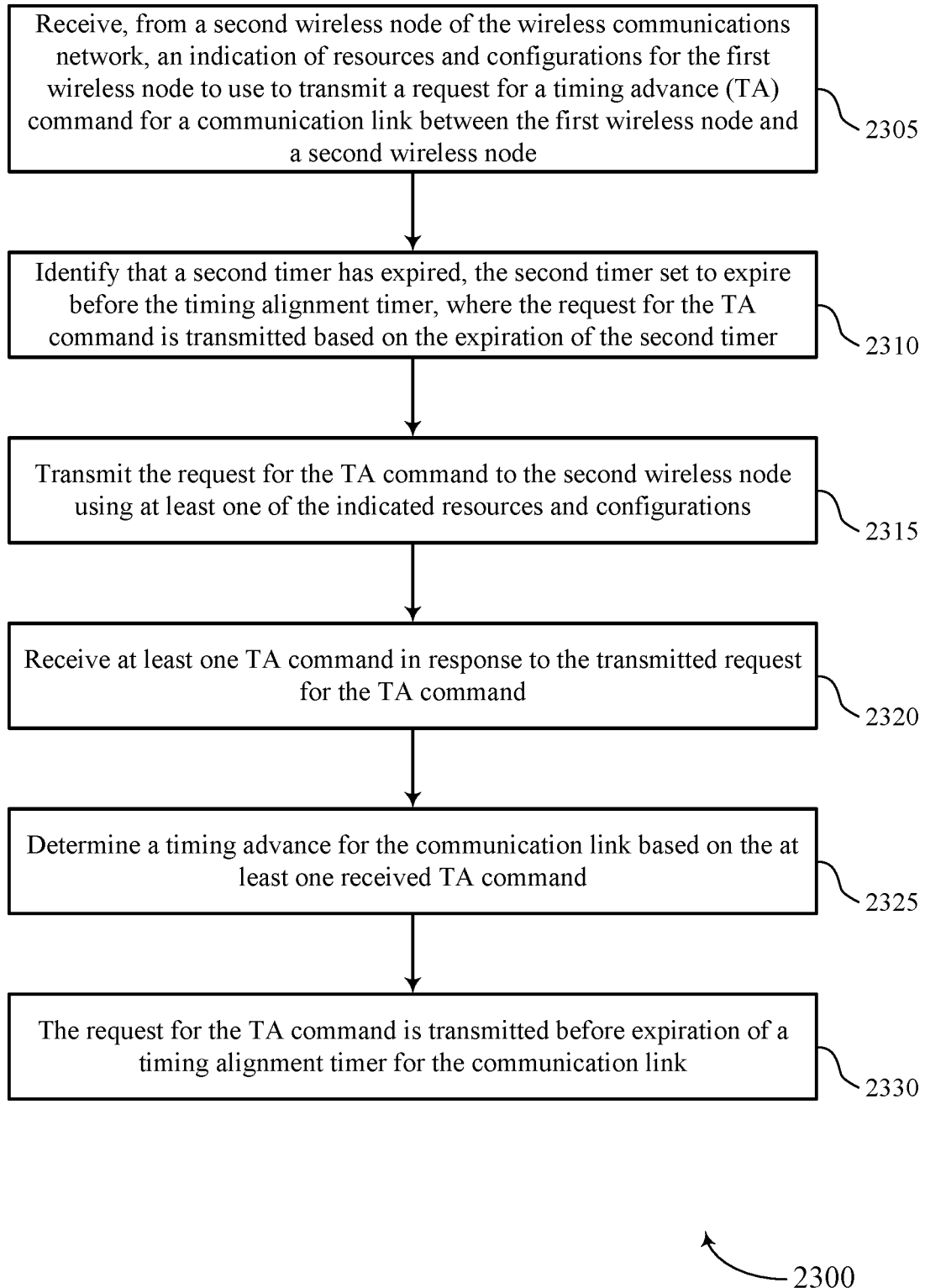

FIG. 23 shows a flowchart illustrating a method 2300 that supports a timing alignment timer in a wireless communication network in accordance with aspects of the present disclosure. The operations of method 2300 may be implemented by a device or its components as described herein. For example, the operations of method 2300 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 2305, the device may receive, from a second wireless node of the wireless communications network, an indication of resources and configurations for the first wireless node to use to transmit a request for a timing advance (TA) command for a communication link between the first wireless node and a second wireless node. The operations of 2305 may be performed according to the methods described herein. In some examples, aspects of the operations of 2305 may be performed by a receiver as described with reference to FIGS. 14 through 17.

At 2310, the device may identify that a second timer has expired, the second timer set to expire before the timing alignment timer, where the request for the TA command is transmitted based on the expiration of the second timer. The operations of 2310 may be performed according to the methods described herein. In some examples, aspects of the operations of 2310 may be performed by a MT manager as described with reference to FIGS. 14 through 17.

At 2315, the device may transmit the request for the TA command to the second wireless node using at least one of the indicated resources and configurations. The operations of 2315 may be performed according to the methods described herein. In some examples, aspects of the operations of 2315 may be performed by a transmitter as described with reference to FIGS. 14 through 17.

At 2320, the device may receive at least one TA command in response to the transmitted request for the TA command. The operations of 2320 may be performed according to the methods described herein. In some examples, aspects of the operations of 2320 may be performed by a receiver as described with reference to FIGS. 14 through 17.

At 2325, the device may determine a timing advance for the communication link based on the at least one received TA command. The operations of 2325 may be performed according to the methods described herein. In some examples, aspects of the operations of 2325 may be performed by a TA Manager as described with reference to FIGS. 14 through 17.

At 2330, the device may the request for the TA command is transmitted before expiration of a timing alignment timer for the communication link. The operations of 2330 may be performed according to the methods described herein. In some examples, aspects of the operations of 2330 may be performed by a MT manager as described with reference to FIGS. 14 through 17.

Figure 24:
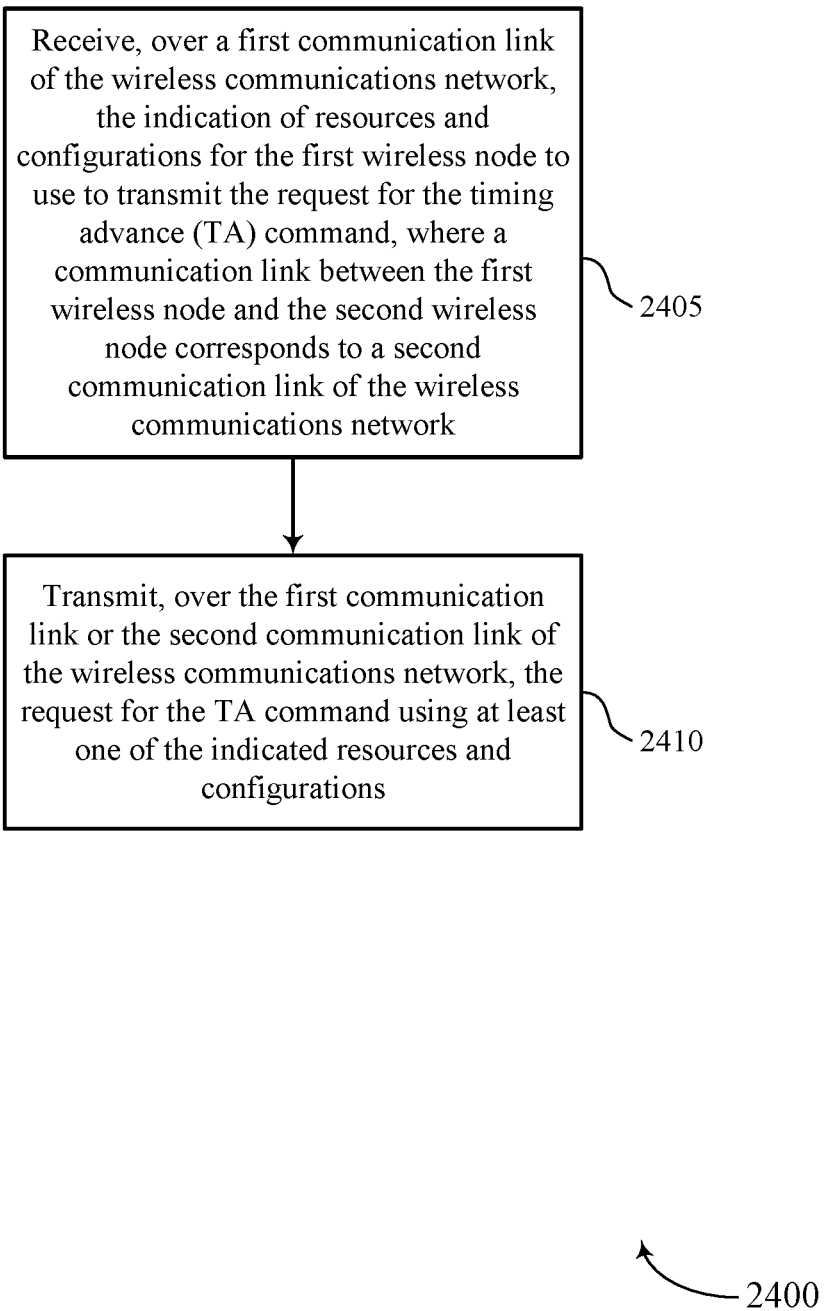

FIG. 24 shows a flowchart illustrating a method 2400 that supports a timing alignment timer in a wireless communication network in accordance with aspects of the present disclosure. The operations of method 2400 may be implemented by a device or its components as described herein. For example, the operations of method 2400 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 2405, the device may receive, over a first communication link of the wireless communications network, the indication of resources and configurations for the first wireless node to use to transmit, the request for the timing advance (TA) command, where a communication link between the first wireless node and a second wireless node corresponds to a second communication link of the wireless communications network. The operations of 2405 may be performed according to the methods described herein. In some examples, aspects of the operations of 2405 may be performed by a receiver as described with reference to FIGS. 14 through 17.

At 2410, the device may transmit, over the first communication link or the second communication link of the wireless communications network, the request for the TA command using at least one of the indicated resources and configurations. The operations of 2410 may be performed according to the methods described herein. In some examples, aspects of the operations of 2410 may be performed by a transmitter as described with reference to FIGS. 14 through 17.

Figure 25:
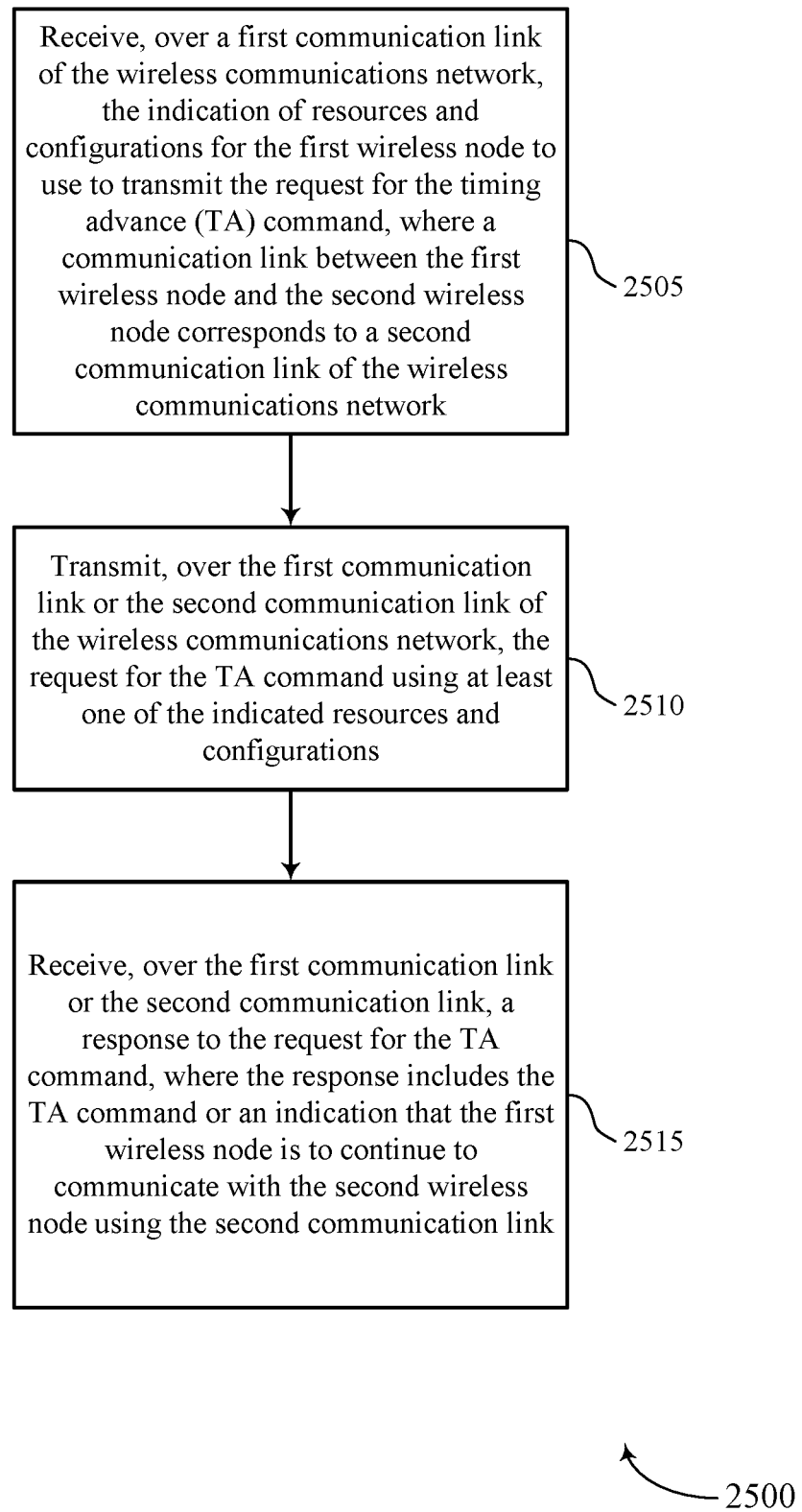

FIG. 25 shows a flowchart illustrating a method 2500 that supports a timing alignment timer in a wireless communication network in accordance with aspects of the present disclosure. The operations of method 2500 may be implemented by a device or its components as described herein.

For example, the operations of method 2500 may be performed by a communications manager as described with reference to FIGS. 14 through 17. In some examples, the communications manager may be associated with a UE 115 with reference to FIG. 1. In other cases, the communications manager may be associated with a MT supported at a base station 105 (e.g., IAB node) with reference to FIGS. 1 through 9, as described. In some examples, a device may execute a set of instructions to control the functional elements of the device to perform the functions described below. Additionally or alternatively, a device may perform aspects of the functions described below using special-purpose hardware.

At 2505, the device may the device may receive, over a first communication link of the wireless communications network, the indication of resources and configurations for the first wireless node to use to transmit, the request for the timing advance (TA) command, where a communication link between the first wireless node and a second wireless node corresponds to a second communication link of the wireless communications network. The operations of 2505 may be performed according to the methods described herein. In some examples, aspects of the operations of 2505 may be performed by a receiver as described with reference to FIGS. 14 through 17.

At 2510, the device may transmit, over the first communication link or the second communication link of the wireless communications network, the request for the TA command using at least one of the indicated resources and configurations. The operations of 2510 may be performed according to the methods described herein. In some examples, aspects of the operations of 2510 may be performed by a transmitter as described with reference to FIGS. 14 through 17.

At 2515, the device may receive, over the first communication link or the second communication link, a response to the request for the TA command, where the response includes the TA command or an indication that the first wireless node is to continue to communicate with the second wireless node using the second communication link. The operations of 2515 may be performed according to the methods described herein. In some examples, aspects of the operations of 2515 may be performed by a receiver as described with reference to FIGS. 14 through 17.

Figure 26:
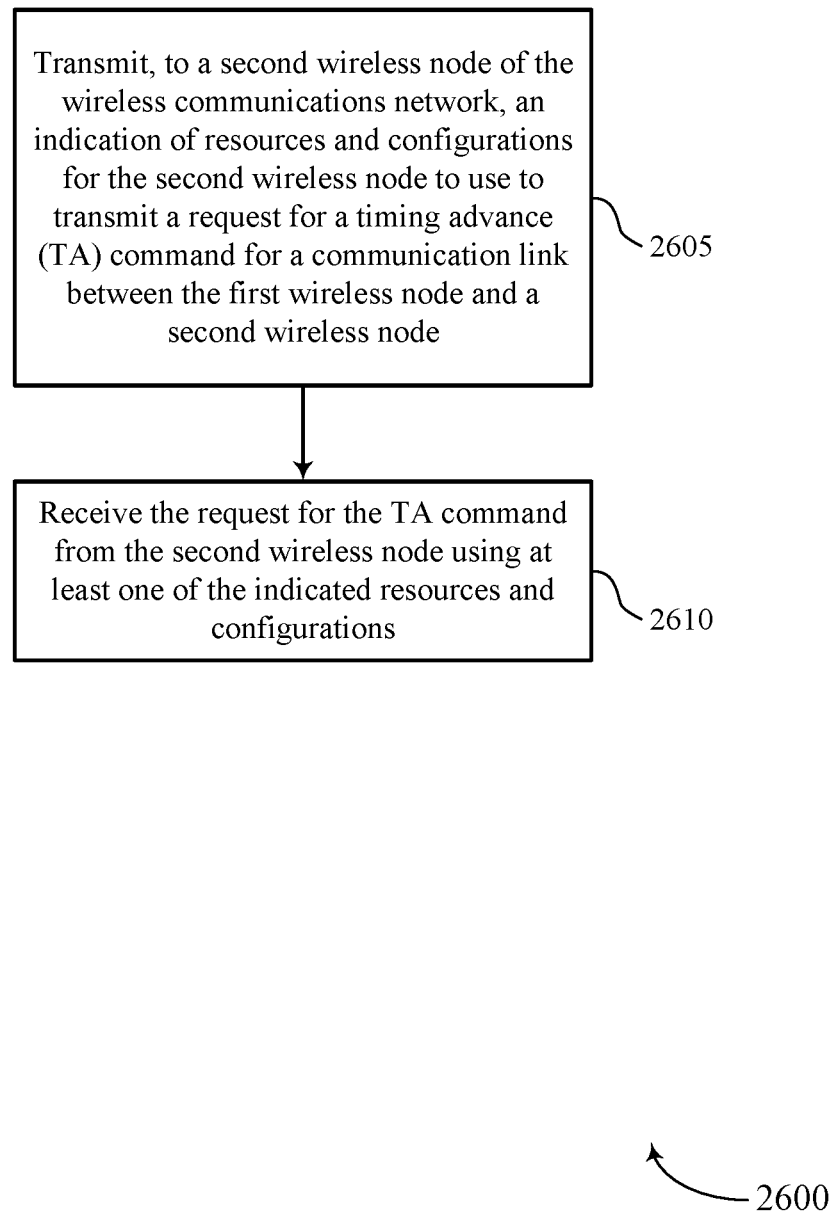

FIG. 26 shows a flowchart illustrating a method 2600 that supports a timing alignment timer in a wireless communication network in accordance with aspects of the present disclosure. The operations of method 2600 may be implemented by a base station 105 or its components as described herein. For example, the operations of method 2600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2605, the base station may transmit, to a second wireless node of the wireless communications network, an indication of resources and configurations for the second wireless node to use to transmit a request for a timing advance (TA) command for a communication link between the first wireless node and a second wireless node. The operations of 2605 may be performed according to the methods described herein. In some examples, aspects of the operations of 2605 may be performed by a transmitter as described with reference to FIGS. 10 through 13.

At 2610, the base station may receive the request for the TA command from the second wireless node using at least one of the indicated resources and configurations. The operations of 2610 may be performed according to the methods described herein. In some examples, aspects of the operations of 2610 may be performed by a receiver as described with reference to FIGS. 10 through 13.

Figure 27:
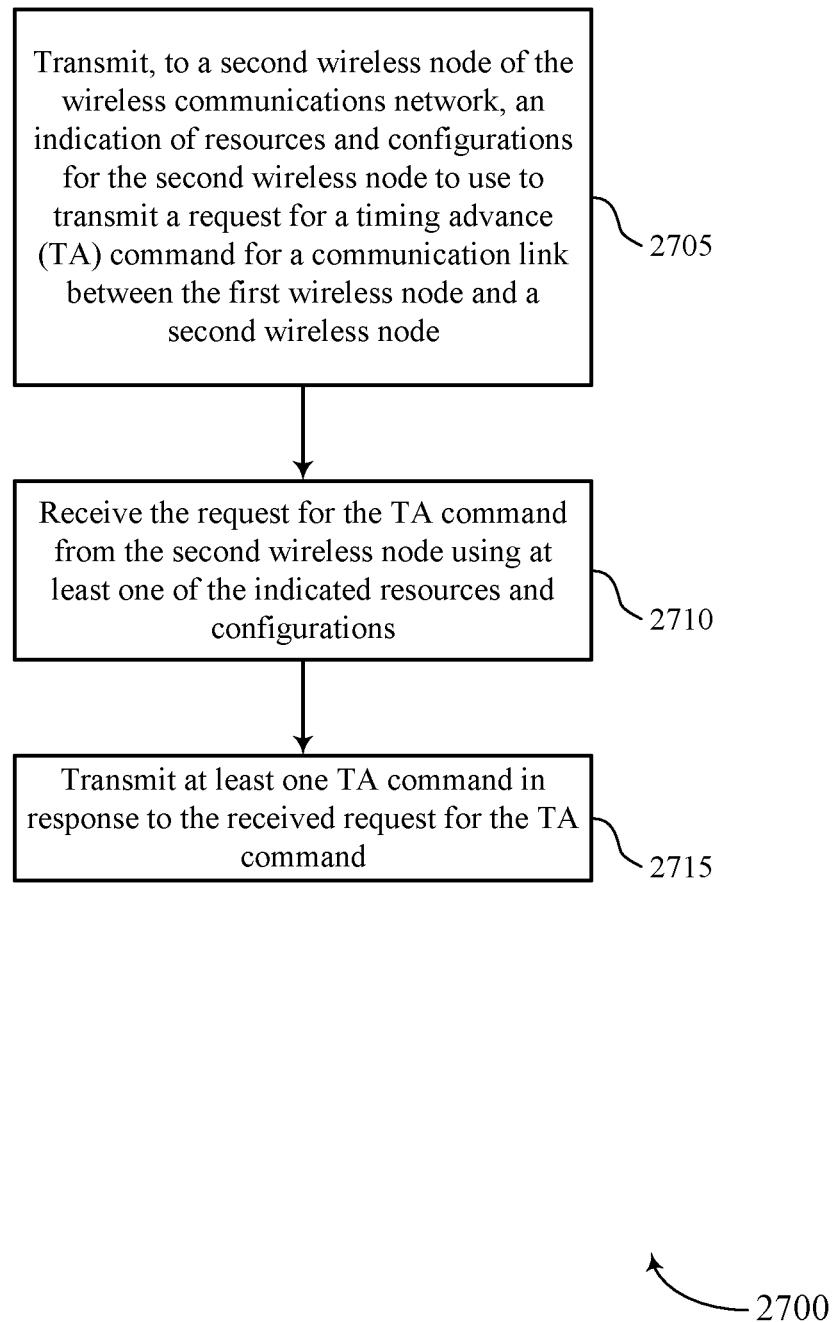

FIG. 27 shows a flowchart illustrating a method 2700 that supports a timing alignment timer in a wireless communication network in accordance with aspects of the present disclosure. The operations of method 2700 may be implemented by a base station 105 or its components as described herein. For example, the operations of method 2700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2705, the base station may transmit, to a second wireless node of the wireless communications network, an indication of resources and configurations for the second wireless node to use to transmit a request for a timing advance (TA) command for a communication link between the first wireless node and a second wireless node. The operations of 2705 may be performed according to the methods described herein. In some examples, aspects of the operations of 2705 may be performed by a transmitter as described with reference to FIGS. 10 through 13.

At 2710, the base station may receive the request for the TA command from the second wireless node using at least one of the indicated resources and configurations. The operations of 2710 may be performed according to the methods described herein. In some examples, aspects of the operations of 2710 may be performed by a receiver as described with reference to FIGS. 10 through 13.

At 2715, the base station may transmit at least one TA command in response to the received request for the TA command. The operations of 2715 may be performed according to the methods described herein. In some examples, aspects of the operations of 2715 may be performed by a transmitter as described with reference to FIGS. 10 through 13.

Figure 28:
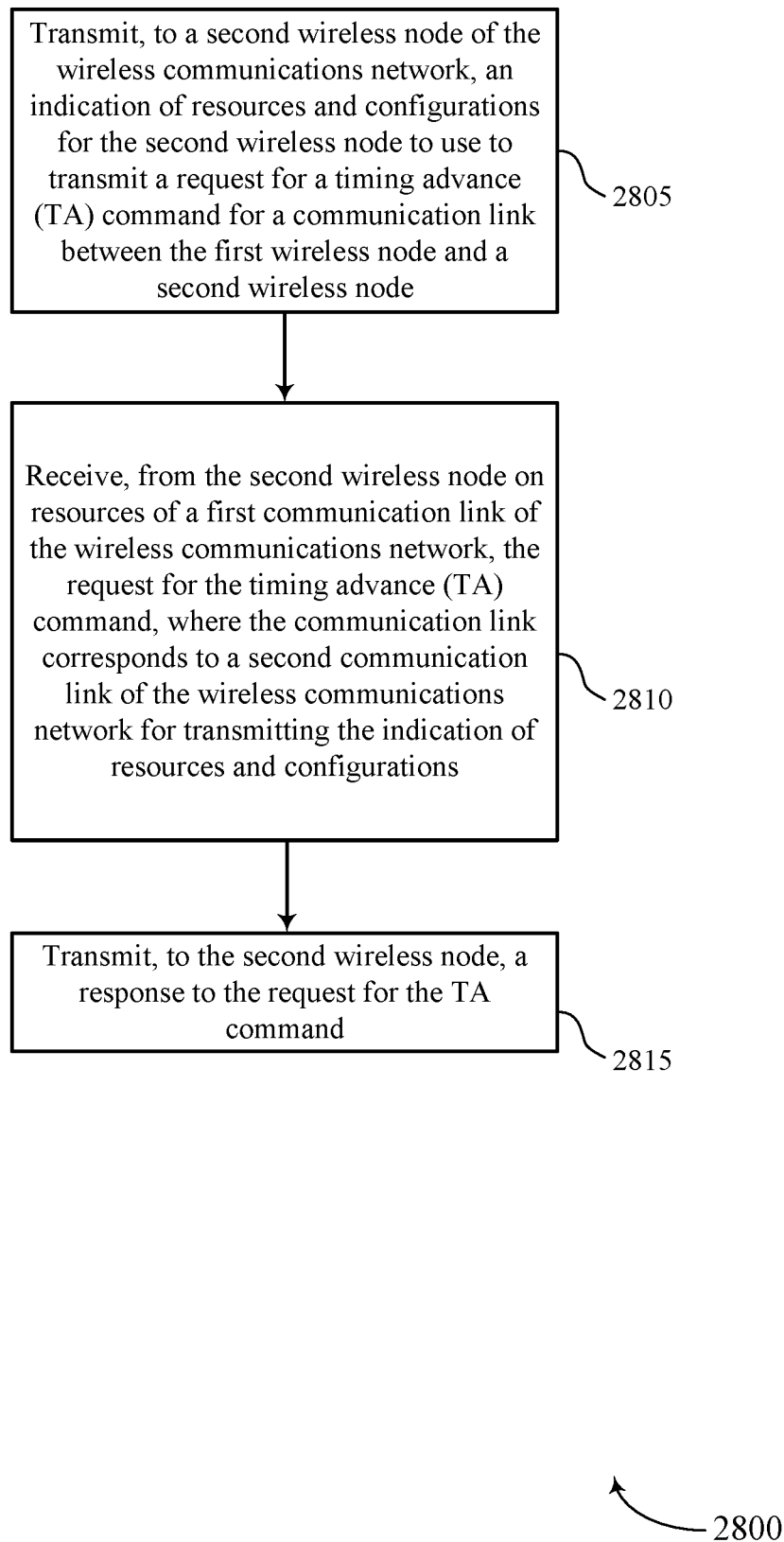

FIG. 28 shows a flowchart illustrating a method 2800 that supports a timing alignment timer in a wireless communication network in accordance with aspects of the present disclosure. The operations of method 2800 may be implemented by a base station 105 or its components as described herein. For example, the operations of method 2800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2805, the base station may transmit, to a second wireless node of the wireless communications network, an indication of resources and configurations for the second wireless node to use to transmit a request for a timing advance (TA) command for a communication link between the first wireless node and a second wireless node. The operations of 2805 may be performed according to the methods described herein. In some examples, aspects of the operations of 2805 may be performed by a transmitter as described with reference to FIGS. 10 through 13.

At 2810, the base station may receive, from the second wireless node on resources of a first communication link of the wireless communications network, the request for the timing advance (TA) command, where the communication link corresponds to a second communication link of the wireless communications network for transmitting the indication of resources and configurations. The operations of 2810 may be performed according to the methods described herein. In some examples, aspects of the operations of 2810 may be performed by a receiver as described with reference to FIGS. 10 through 13.

At 2815, the base station may transmit, to the second wireless node, a response to the request for the TA command. The operations of 2815 may be performed according to the methods described herein. In some examples, aspects of the operations of 2815 may be performed by a transmitter as described with reference to FIGS. 10 through 13.

Figure 29:
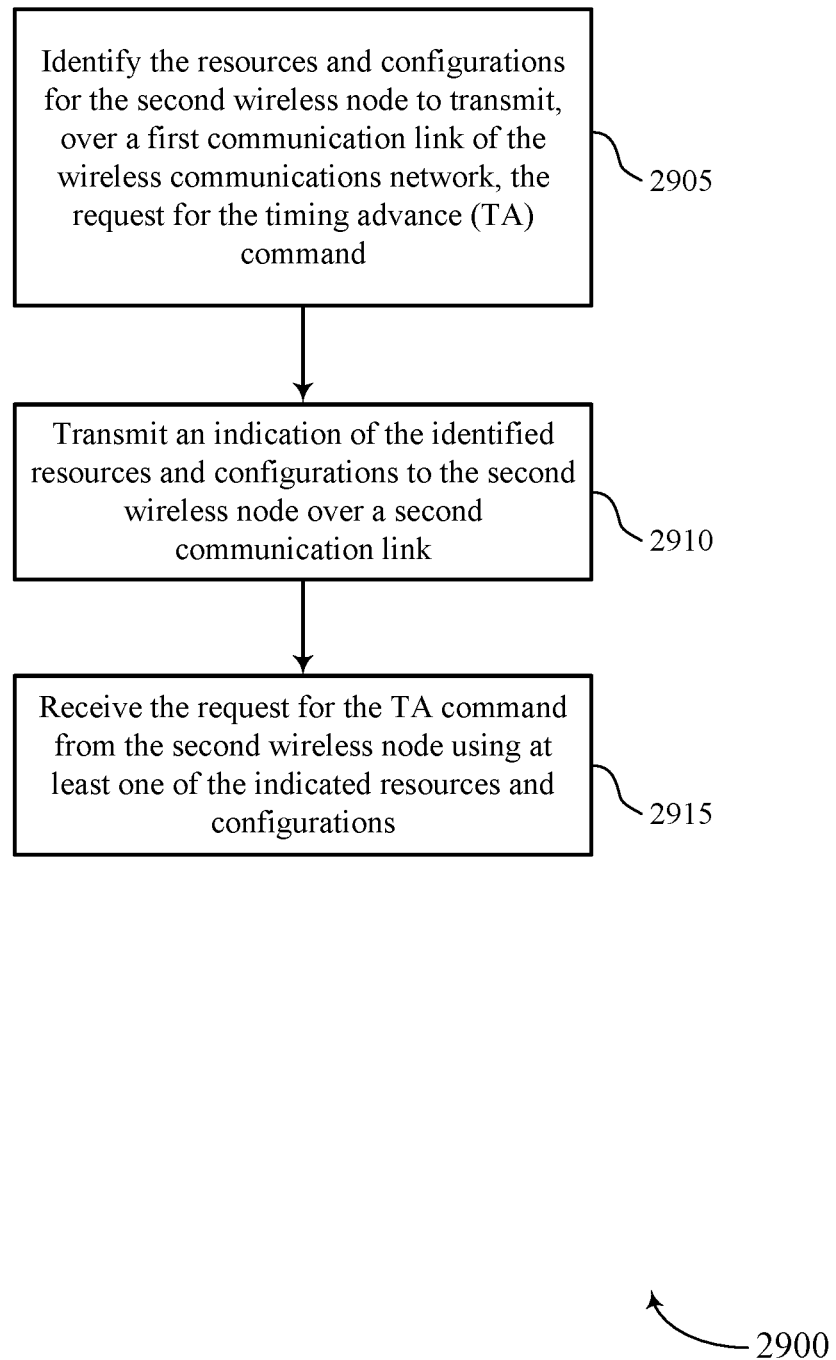

FIG. 29 shows a flowchart illustrating a method 2900 that supports a timing alignment timer in a wireless communication network in accordance with aspects of the present disclosure. The operations of method 2900 may be implemented by a base station 105 or its components as described herein. For example, the operations of method 2900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2905, the base station may identify resources and configurations for a second wireless node of the wireless communications network to use to transmit, over a first communication link, a request for a timing advance (TA) command. The operations of 2905 may be performed according to the methods described herein. In some examples, aspects of the operations of 2905 may be performed by a DU manager as described with reference to FIGS. 10 through 13.

At 2910, the base station may transmit an indication of the identified resources and configurations to the second wireless node over a second communication link. The operations of 2910 may be performed according to the methods described herein. In some examples, aspects of the operations of 2910 may be performed by a transmitter as described with reference to FIGS. 10 through 13.

At 2915, the base station may receive the request for the TA command from the second wireless node using at least one of the indicated resources and configurations. The operations of 2915 may be performed according to the methods described herein. In some examples, aspects of the operations of 2915 may be performed by a transmitter as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first integrated access and backhaul (IAB) node of a wireless communications network, comprising:
   communicating with a second IAB node via a communication link between the first IAB node and the second IAB node;
   communicating, during a time interval, with at least one child IAB node or user equipment (UE) via a communication link between the first IAB node and the at least one child IAB node or UE;
   receiving, from the second IAB node of the wireless communications network, an indication of resources and a resource format for the first IAB node to use to transmit a request for a timing advance (TA) command for the communication link between the first IAB node and the second IAB node; and
   transmitting, in the time interval, the request for the TA command to the second IAB node using at least one of the indicated resources and the resource format.

2. The method of claim 1, further comprising:
   receiving at least one TA command in response to the transmitted request for the TA command; and
   determining a timing advance for the communication link between the first IAB node and the second IAB node based at least in part on the at least one received TA command.

3. The method of claim 1, wherein the request for the TA command is transmitted before expiration of a timing alignment timer for the communication link.

4. The method of claim 3, further comprising:
identifying that a second timer has expired, the second timer set to expire before the timing alignment timer, wherein the request for the TA command is transmitted based at least in part on the expiration of the second timer.

5. The method of claim 1, further comprising:
identifying that a timing alignment timer for the communication link between the first IAB node and the second IAB node has expired; and
transmitting a random access communication to the second IAB node based at least in part on the expiration of the timing alignment timer, wherein the random access communication comprises the request for the TA command.

6. The method of claim 1, wherein the indication of resources and the resource format is received before expiration of a timing alignment timer for the communication link between the first IAB node and the second IAB node.

7. The method of claim 1, further comprising:
receiving, over a first communication link of the wireless communications network, the indication of resources and the resource format for the first IAB node to use to transmit the request for the TA command, wherein the communication link comprises a second communication link of the wireless communications network; and
transmitting, over the first communication link or the second communication link of the wireless communications network, the request for the TA command using at least one of the indicated resources and the resource format.

8. The method of claim 7, wherein the indication of the resources and the resource format is received over the first communication link from a third IAB node of the wireless communications network.

9. The method of claim 7, wherein the indication of the resources and the resource format is received over the first communication link from the second IAB node.

10. The method of claim 7, wherein the first communication link uses a first radio access technology (RAT), and the second communication link uses a second RAT different from the first RAT.

11. The method of claim 7, further comprising:
receiving, over the first communication link or the second communication link, a response to the request for the TA command, wherein the response comprises the TA command or an indication that the first IAB node is to continue to communicate with the second IAB node using the second communication link.

12. The method of claim 7, wherein:
receiving the indication of resources and the resource format is in response to a request transmitted over the first communication link by the first IAB node.

13. The method of claim 1, wherein receiving the indication of resources and the resource format comprises:
receiving a periodic contention free random access (CFRA) resource and the resource format, or a physical uplink control channel (PUCCH) resource and the resource format, or a combination thereof.

14. The method of claim 1, wherein the resource format comprises a format for a physical uplink control channel (PUCCH), or a medium access control element (MAC CE), or a radio resource control signal, or a contention free random access signal, or a combination thereof.

15. A method for wireless communication at a first integrated access and backhaul (IAB) node of a wireless communications network, comprising:
communicating with a second IAB node via a communication link between the first IAB node and the second IAB node, the second IAB node configured to communicate, during a time interval, with at least one child IAB node of the second IAB node or user equipment (UE) via a communication link between the second IAB node and the at least one child IAB node or UE;
transmitting, to the second IAB node of the wireless communications network, an indication of resources and a resource format for the second IAB node to use to transmit a request for a timing advance (TA) command for the communication link between the first IAB node and a second IAB node; and
receiving, in the time interval, the request for the TA command from the second IAB node using at least one of the indicated resources and the resource format.

16. The method of claim 15, further comprising:
transmitting at least one TA command in response to the received request for the TA command.

17. The method of claim 15, wherein the request for the TA command is received before expiration of a timing alignment timer for the communication link between the first IAB node and the second IAB node.

18. The method of claim 15, wherein receiving the request for the TA command comprises:
receiving a random access communication from the second IAB node after expiration of a timing alignment timer, wherein the random access communication comprises the received request for the TA command.

19. The method of claim 15, further comprising:
receiving, from the second IAB node on resources of a first communication link of the wireless communications network, the request for the TA command, wherein the communication link comprises a second communication link of the wireless communications network for transmitting the indication of resources and the resource format; and
transmitting, to the second IAB node, a response to the request for the TA command.

20. The method of claim 19, wherein the first communication link uses a first radio access technology (RAT), and the second communication link uses a second RAT different from the first RAT.

21. The method of claim 19, wherein transmitting the response to the request for the TA command comprises:
transmitting, over the first communication link or the second communication link, the TA command or an indication that the first IAB node is to continue to communicate with the second IAB node using the second communication link.

22. The method of claim 15, further comprising:
identifying the resources and the resource format for the second IAB node to transmit, over a first communication link of the wireless communications network, the request for the TA command wherein the communication link comprises a second communication link of the wireless communications network for transmitting the indication of resources and the resource format; and
transmitting the indication of the identified resources and the resource format to the second IAB node over the second communication link.

23. The method of claim 22, wherein the identified resources and the resource format for the second IAB node are to transmit the request for the TA command to a third IAB node of the wireless communications network.

24. The method of claim 22, wherein the identified resources and the resource format are for the second IAB node to transmit the request for the TA command to the first IAB node.

25. The method of claim 22, wherein the first communication link uses a first radio access technology (RAT), and the second communication link uses a second RAT different from the first RAT.

26. The method of claim 22, wherein the indicated resources and the resource format comprise periodic contention free random access (CFRA) resources and a resource format, or physical uplink control channel (PUCCH) resources and a resource format, or a combination thereof.

27. An apparatus for wireless communication at a first integrated access and backhaul (IAB) node of a wireless communications network, comprising: a processor, memory coupled with the processor; and instructions stored in the memory and operable, when executable by the processor, to cause the apparatus to:
communicate with a second IAB node via a communication link between the first IAB node and the second IAB node;
communicate, during a time interval, with at least one child IAB node or user equipment (UE) via a communication link between the first IAB node and the at least one child IAB node or UE;
receive, from a second IAB node of the wireless communications network, an indication of resources and a resource format for the first IAB node to use to transmit a request for a timing advance (TA) command for the communication link between the first IAB node and the second IAB node; and
transmit, in the time interval, the request for the TA command to the second IAB node using at least one of the indicated resources and the resource format.

28. The apparatus of claim 27, wherein the instructions are further executable by the processor to cause the apparatus to:
receive, over a first communication link of the wireless communications network, the indication of resources and the resource format for the first IAB node to use to transmit the request for the TA command, wherein the communication link comprises a second communication link of the wireless communications network; and
transmit, over the first communication link or the second communication link of the wireless communications network, the request for the TA command using at least one of the indicated resources and the resource format.

29. An apparatus for wireless communication at a first integrated access and backhaul (IAB) node of a wireless communications network, comprising: a processor, memory coupled with the processor; and instructions stored in the memory and operable, when executable by the processor, to cause the apparatus to:
communicate with a second IAB node via a communication link between the first IAB node and the second IAB node, the second IAB node configured to communicate, during a time interval, with at least one child IAB node of the second IAB node or user equipment (UE) via a communication link between the second IAB node and the at least one child IAB node or UE;
transmit, to the second IAB node of the wireless communications network, an indication of resources and a resource format for the second IAB node to use to transmit a request for a timing advance (TA) command for the communication link between the first IAB node and a second IAB node; and
receive, in the time interval, the request for the TA command from the second IAB node using at least one of the indicated resources and the resource format.

30. The apparatus of claim 29, wherein the instructions are further executable by the processor to cause the apparatus to:
receive, from the second IAB node on resources of a first communication link of the wireless communications network, the request for the timing TA command, wherein the communication link comprises a second communication link of the wireless communications network for transmitting the indication of resources and the resource format; and
transmit, to the second IAB node, a response to the request for the TA command.

* * * * *